United States Patent [19]

Price

[11] Patent Number: 6,145,124

[45] Date of Patent: Nov. 7, 2000

[54] SOFTWARE OPTIMIZATION SYSTEM

[75] Inventor: Thomas J Price, Golden Valley, Ariz.

[73] Assignee: Veronex Technologies, Inc., Santa Ana, Calif.

[21] Appl. No.: 08/910,015

[22] Filed: Aug. 12, 1997

[51] Int. Cl.[7] .................................................. G06F 9/445
[52] U.S. Cl. .................. 717/9; 717/1; 717/2; 717/3; 717/4; 717/5; 717/6; 717/7; 717/8
[58] Field of Search ..................... 395/709, 708, 395/707, 706; 717/2, 1, 3, 4, 5, 6, 7, 8, 9

[56] References Cited

U.S. PATENT DOCUMENTS

| | | | |
|---|---|---|---|
| 5,274,815 | 12/1993 | Trissel et al. | 395/567 |
| 5,586,020 | 12/1996 | Isozaki | 395/707 |
| 5,652,865 | 7/1997 | Rawlings, III | 711/171 |
| 5,699,310 | 12/1997 | Garloff et al. | 395/701 |

OTHER PUBLICATIONS

Bowen et al., "A Compendium of Formal Techniques for Software Maintenance", Software Engineering Journal, pp. 253–262, Sep. 1993.
Ory, "An Integrating Common Framework for Measuring Cognitive Software Complexity", Software Engineering Journal, pp. 263–272, Sep. 1993.
Aho et al., "Compilers Principles, Techniques, and Tools", Addison Wesley Publishing, pp. 1–15, 1986.
Bennet et al., "A transformation System for Maintenance—Turning Theory into Practice", IEEE, pp. 146–155, 1992.
Yang et al., "Extension of A Transformation System for Maintenance—Dealing With Data–Intensive Programs", IEEE, pp. 344–353, 1994.
Seltzer et al., "Read Optimized File System Designs: A Performance Evaluation", IEEE, pp. 602–611, 1991.
Mutka et al., "Managing Personal Files Across Independent File Management Units", IEEE, pp. 245–261, Jul. 1992.

Primary Examiner—Tariq R. Hafiz
Assistant Examiner—Ted T. Vo
Attorney, Agent, or Firm—Henry G. Kohlmann

[57] ABSTRACT

A system for reading existing program source codes which may be initially stored in computer memory, hard disk storage devices, on floppy disk storage device, diskettes, or virtually any other computer readable medium. A table lookup may be used to convert the native source code into a into a pseudo code form for writing out of such code as an interim source code file into virtual memory to be used for conversion and manipulation. The source code in the pseudo format is processed in five (I–V) phases resulting in a new program source code with appropriate instructions to call library common functions for the new system stored in the system library as created by the optimization system. In addition, various files, data elements and work space allocations each of which occupy the same space with other such files, elements and work space allocations are normalized, i.e. referred to by the same names by all source code. During the optimization process, the user may interactively change the names of files, any of the attributes of the data elements which will be reflected for all occurrences of the element and workspace definitions. In addition, work space allocations are given a unique name by the system.

25 Claims, 73 Drawing Sheets

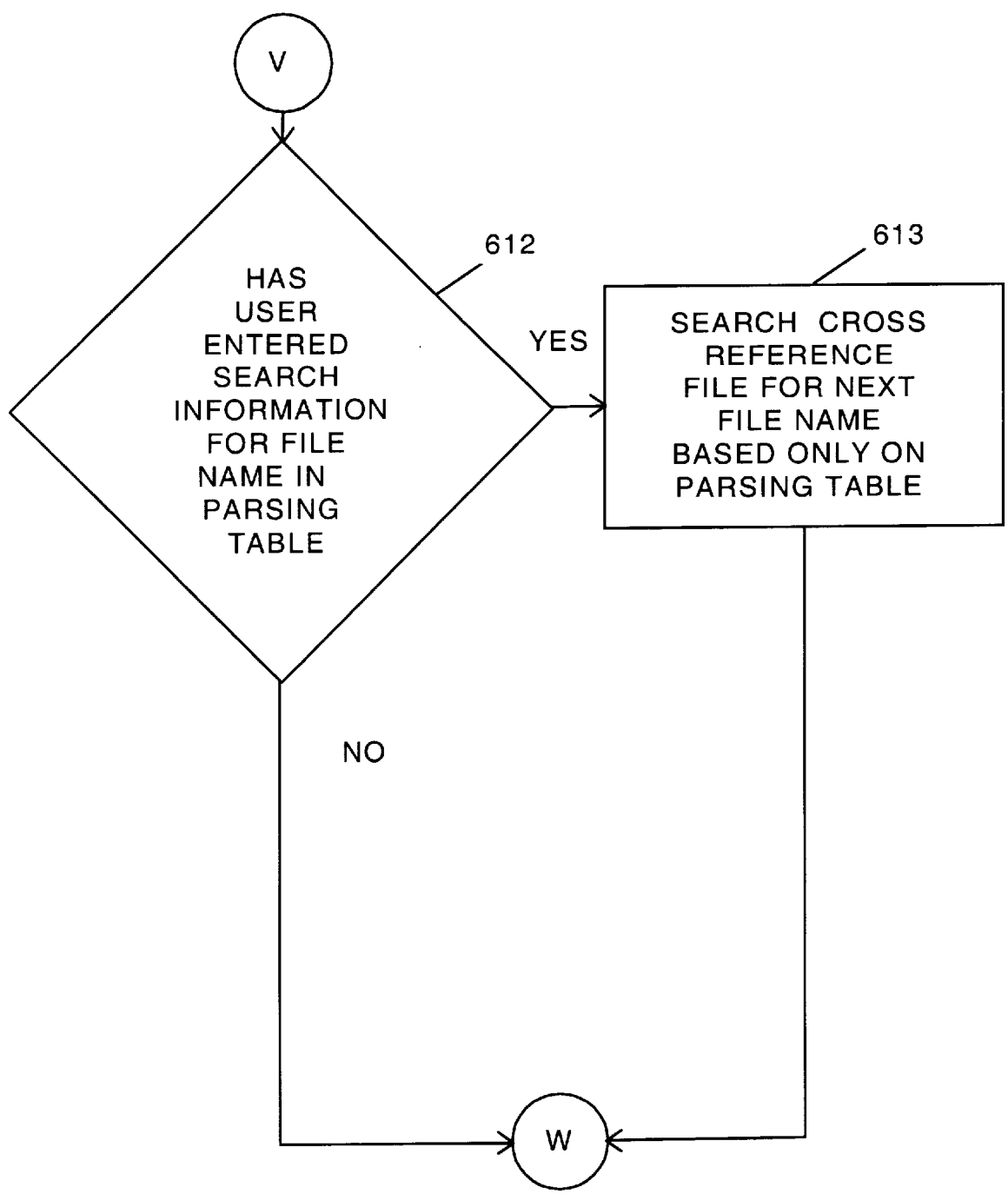
FIGURED 9C

I/O ELEMENT AND COMMON I/O FILE STRUCTURE

| INDXMAIN - DETAIL I/O ELEMENT RECORD | |
|---|---|
| 'E' | 1 |
| (data base number) | 3 |
| (start position) | 4 |
| (end position) | 4 |
| (element name) | 30 |
| (element length) | 3 |
| (element type) | 1 |
| (element edit) | 2 |
| (new length) | 3 |
| (not used) | 46 |
| (new element name) | 30 |
| (parse type) | 1 |
| (parseid) | 3 |

FIGURE 15A

| INDXMAIN - DETAIL FILE RECORD | |
|---|---|
| 'D' | 1 |
| (system assignment) | 30 |
| (file name) | 30 |
| (record name) | 30 |
| (record size) | 4 |
| (block size) | 4 |
| (label type) | 1 |
| (assigned database number) | 3 |
| (new file) | 30 |

FIGURE 15B

COMMON PROFILE WORKING STORAGE FILE STRUCTURE

| INDXWKS - DETAIL WORKING STORAGE RECORD | |
|---|---|
| 'W1' | 2 |
| (old 01 name) | 30 |
| (program used) | 8 |
| (sequential number) | 4 |
| (total 01 size) | 4 |
| (sub-level name) | 30 |
| (sub-level number) | 2 |
| (sub-level size) | 4 |
| (new name) | 30 |
| (new size) | 4 |
| (value if any) | 66 |
| (parse type) | 1 |
| (parseid) | 3 |

FIGURE 16A

| COMMON PROFILE WORKING STORAGE FILE STRUCTURE | |
|---|---|
| 'W2' | 2 |
| (total 01 size) | 4 |
| (total line) | 4 |
| (occurrence) | 3 |
| (program used) | 8 |
| (old 01 name) | 30 |
| (sequential number) | 3 |
| (sub-level number) | 2 |
| (sub-level name) | 30 |
| (new name) | 30 |
| (old size) | 4 |
| (new size) | 4 |
| (parse type) | 1 |
| (parseid) | 3 |

FIGURE 16B

COMMON PROFILE WORKING STORAGE FILE STRUCTURE

| INDXWK3 - WORKING STORAGE SUMMARIZED W2+W1 | |
|---|---|
| 'W3' | 2 |
| (program used) | 8 |
| (new name) | 30 |
| (sub-level number) | 2 |
| (original name) | 30 |
| (new size) | 4 |
| (value if any) | 66 |
| (parse type) | 1 |
| (parseid) | 3 |
| (old 01/77 name) | 30 |

FIGURE 16C

| INDXWK4 - PROCEDURAL LOGIC WORKING STORAGE CHANGE RECORD | |
|---|---|
| 'W4' | 2 |
| (program used) | 8 |
| (original name) | 30 |
| (original size) | 4 |
| (new name) | 20 |
| (new size) | 4 |
| (parse type) | 1 |
| (parseid) | 3 |

FIGURE 16D

COMMON FUNCTION FILE STRUCTURES

| INDXCOM - COMMON FUNCTION RECORD | |
|---|---|
| 'D' | 1 |
| (procedural logic instruction) | 66 |
| (number lines) | 4 |
| (sequential number) | 4 |
| (function number) | 5 |

FIGURE 17A

| INDXS - COMMON FUNCTION RECORD BY FUNCTION NUMBER | |
|---|---|
| 'D' | 1 |
| (function number) | 5 |
| (number lines) | 4 |
| (sequential number) | 4 |
| (procedural logic instruction) | 66 |

FIGURE 17B

| INDXPRGCR - PROGRAM FUNCTION ID FILE | |
|---|---|
| 'D' | 1 |
| (program name) | 8 |
| (function number) | 5 |
| (number lines) | 4 |
| (beginning line number) | 8 |
| (ending line number) | 8 |

FIGURE 17C

| INDXFUNCTCT FUNCTION USED FILE | |
|---|---|
| 'D' | 1 |
| (function number) | 5 |
| (program name) | 8 |
| (number lines) | 4 |
| (beginning line number) | 8 |
| (ending line number) | 8 |

FIGURE 17D

| PARSE TABLE | |
|---|---|
| (parse type) | 1 |
| (partial parse word) | 20 |
| (edit word) | 16 |
| (length) | 2 |

FIGURE 18

SOFTWARE OPTIMIZATION SYSTEM

BACKGROUND OF THE INVENTION

1. Field of the Invention

The Field of this invention relates to a computer program optimization system which results in code reduction and standardization. More specifically, the instant invention relates to a computer system which evaluates existing software and performs vertical, horizontal and sequential synchronization on the source code, utilizing an interim pseudo code to create new systems library and a program source code file.

2. Related Art

Prior art systems relate to code conversion systems, including compilers and language translators. However, such programs take data as it is and in sequence without an evaluation of the use of individual variables. Usually such conversions are performed in sequence one program at a time. Thus, there is no evaluation of the several programs used in a systems group against each other.

It is an object of the instant invention to provide a computer program optimization system which evaluates multiple program source code files as a whole.

It is a further object of this invention to provide a computer program optimization system which generates uniformly named variables which occupy the same physical location or possess the same value profile.

It is a further object of this invention to provide a computer program optimization system which permits interactive modification of element attributes during the optimization process.

It is a further object of this invention to provide a computer program optimization system which consolidates all repeated program code segments into a library.

The instant invention addresses the usage of various elements, variables and structures in an entire software system and consolidates all redundant information. In addition, other elements are identified by physical location and uniformly named.

BRIEF DESCRIPTION OF THE INVENTION

The instant invention reads existing program source codes which may be initially stored in computer memory, hard disk storage devices, on floppy disk storage device, diskettes, or virtually any other computer readable medium. A table lookup may be used to convert the native source code into a into a pseudo code form for writing out of such code as an interim source code file into virtual memory to be used for conversion and manipulation. The source code in the pseudo format is processed in five (I–V) phases resulting in a new program source code with appropriate instructions to call library common functions for the new system stored in the system library as created by the optimization system. In addition, various files, data elements and work space allocations each of which occupy the same space with other such files, elements and work space allocations are normalized, i.e. referred to by the same names by all source code. During the optimization process, the user may interactively change the names of files, any of the attributes of the data elements which will be reflected for all occurrences of the element and workspace definitions. In addition, work space allocations are given a unique name by the system.

The first phase of the computer optimization system is a vertical synchronization process which identifies all individual file name references, data element references and workspace allocations within every record type, within every file representative of program source code. A common name is assigned to each file, element or workspace by physical position within a record within each of the files. The process also creates various cross-reference files that are structured to be accessed either sequentially or randomly as required. The file, common element and workspace names replace the original names used in the original program source code. During vertical synchronization a user may interactively specify specific file names and definitions for a particular element which then becomes the standard for all the source codes examined by the system. If no specific designation is made, the system automatically selects the first unique name it encounters within the software to identify the physical position of a file or specific data element as the new standard definition. The system then generates data structures in the form of a file name, cross-reference file and an element cross-reference file to identify each file and data element and the assigned name.

Work space allocations are also identified and each unique location assigned a specific name.

In phase II the system implements a horizontal synchronization process which formats all program instructions in the interim code into standard or common syntax format. This permits an exact match between given instructions within the source code according to a uniform or standard syntax format. The program source code written in the standard syntax of the interim format is temporarily stored in virtual memory for later use during the optimization process.

In phase III, a sequential synchronization process scans all interim program source code instructions to determine if there are at least two or more source code instructions in any program source code that qualifies as a potential common function. Potential common functions are identified as that code which resides between program labels although it is clear that other designations could be used, such as instruction sequences that are bounded by instruction pairs, e.g. start and end of a restoring system conditional statement. Codes so identified are qualified as a potential common function, and then matched against other potential common functions within a potential library common function file. If not present, the functions are then stored in the Potential Library Common Function File with all other potential library common functions.

In phase IV, the temporary copy of each of the modified program source codes for each program source code file in the system is written into new files by a source code modification system with all redundant instructions as stored in the potential library common function file replaced with a call to the particular function in the common library file. The particular potential library functions so identified are then stored in a current systems library file. The selection of which potential common library functions are to be replaced with a call and stored in the current systems library file is accomplished by comparing the function against a Function Sequence File to determine if the particular common function being analyzed is used more than once. A Program Function Identification File contains data which determines where duplication occurs in a program and, more particularly, at what position within the program such duplication occurs. Thus, the location of the call and removal of the code segment can be accomplished for all segments which are used more than once. Segments which are not used more than once remain in place and are not moved to the current library.

In Phase V, when the modified source code has been restructured, and it is vertically, horizontally and sequentially standardized, redundant program functions are identified and added to the new system library file. This results in source code which has no redundancy. That is, no two or more instructions that are identical exist more than once anywhere within any program in the system.

A significant increase in efficiency and reduction of code are achieved. Similarly, all of the various data elements which occupy the same location use a common identifier in each of the various source code files in which they are referenced. Phase V concludes with a conversion of the interim program code into its native format.

Alternatively, the user may automate the change of element attributes. That is the user may command the system to automatically make the changes input by the user and automatically post the changes to the interim source code or automatically make its own name changes as determined by the System. As to those elements where the user has not made any changes the system automatically selects the attributes of the first occurrence of the element and posts that elements attributes to all other references to the same location. If an interim code was used, the system then automatically converts the interim code to native code and an audit trail report of all changes made during the automatic change process is printed.

On completion of the optimization of the computer code, database specifications, screen and print specifications, and conditional logic specification from the interim source code are determined and these specifications are stored in separate databases.

The system provides additional options, including a review of file and element definitions and the option to selectively convert, scan or repair programs analyzed.

BRIEF DESCRIPTION OF THE DRAWINGS

FIGS. 9A through 9K are flow charts of the manual repair of file, element and workspace element definitions.

FIG. 15A through 15B are schematics of I/O Records.

FIG. 16A through 16D are schematics of working storage Records.

FIG. 17A through 17D are schematics of common function Records.

FIG. 18 is a schematic of the Parse Table.

PREFERRED EMBODIMENT

Overview of Preferred Embodiment

All software programs comprise three basic parts. These include an I/O Area, Working Storage Area's and Procedural Logic. Within each of these there are various elements used by the programming Program. In each of these parts there are logical file names, work area allocations, and data elements such as variables and constants which are stored in data files, temporarily stored in Working Storage Area's, and referenced in the procedural logic. The instant system standardizes names of files, data elements and work storage references and stores common procedural program code segments in a library. The instant invention is implemented on an IBM P.C. with disk storage and memory. It is distributed on diskette or other computer readable memory.

Figure 1:
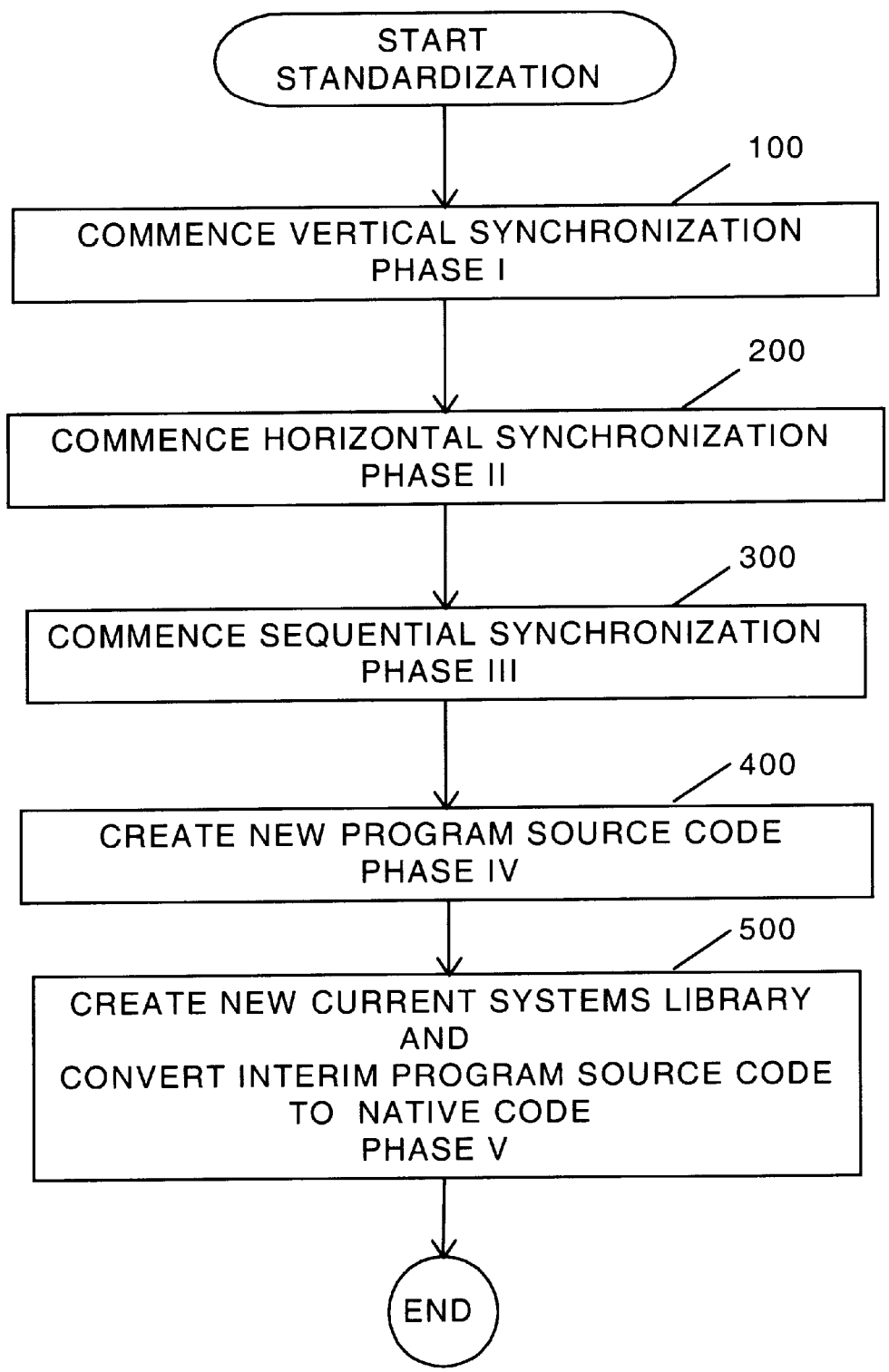
FIG. 1 is a flow chart of the overall optimization system.

With reference to the drawings, FIG. 1 is a flow chart illustrating the various phases of operation of the preferred embodiment of the invention. There are five basic phases of operation commencing with vertical synchronization, step 100, Phase I. On completion of Phase I, Horizontal synchronization, step 200, Phase II, is commenced. On completion of Phase II, Sequential Synchronization 300, Phase III is commenced. On completion of Phase III, new program source code is created 400, Phase IV. On completion of Phase IV, a new current systems library is created 500, Phase V, and new program source code is stored as new native code.

Figure 2A:
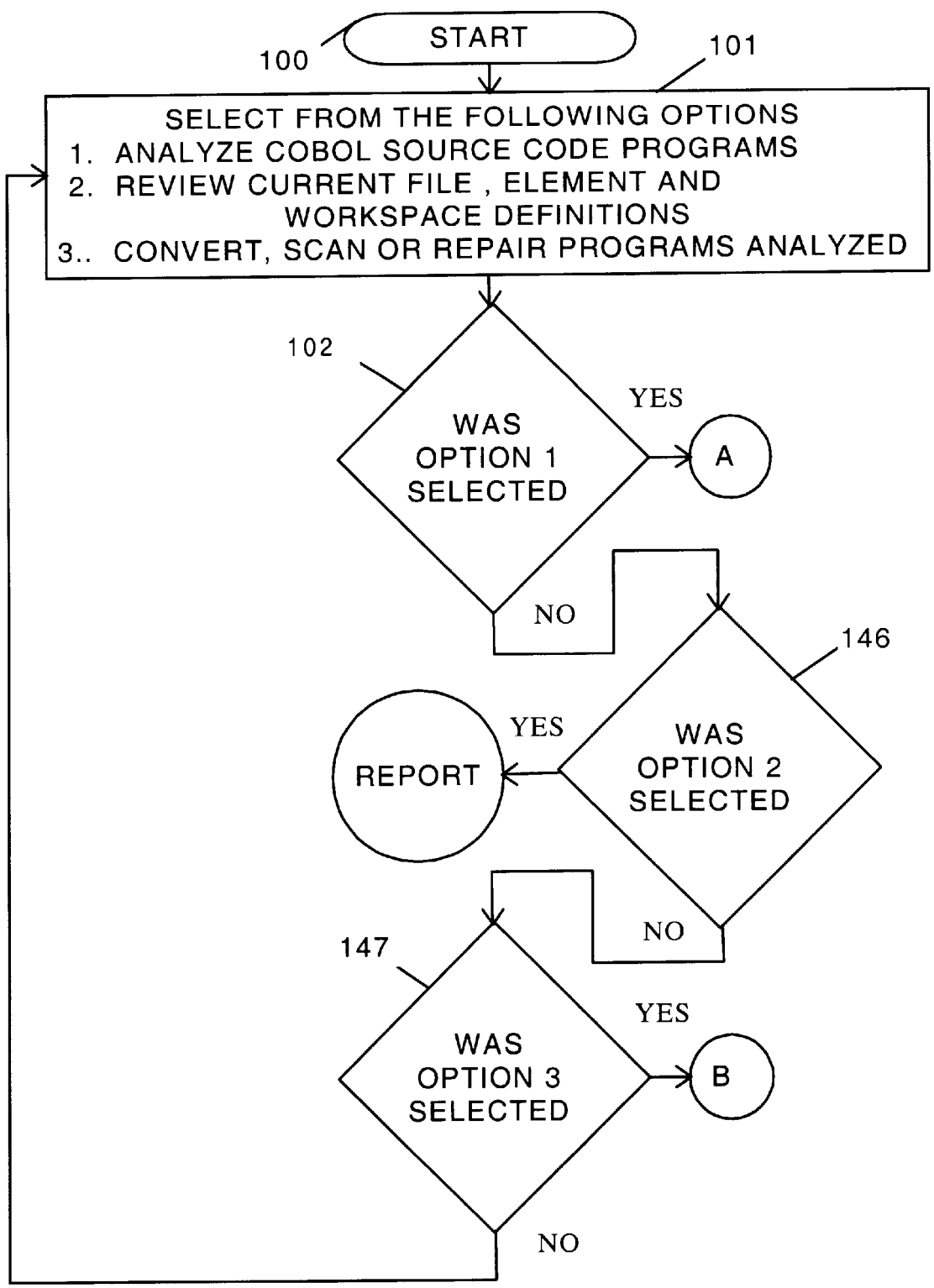
FIGS. 2A through 2L are a flow charts of the Vertical Synchronization System.
Figure 2B:
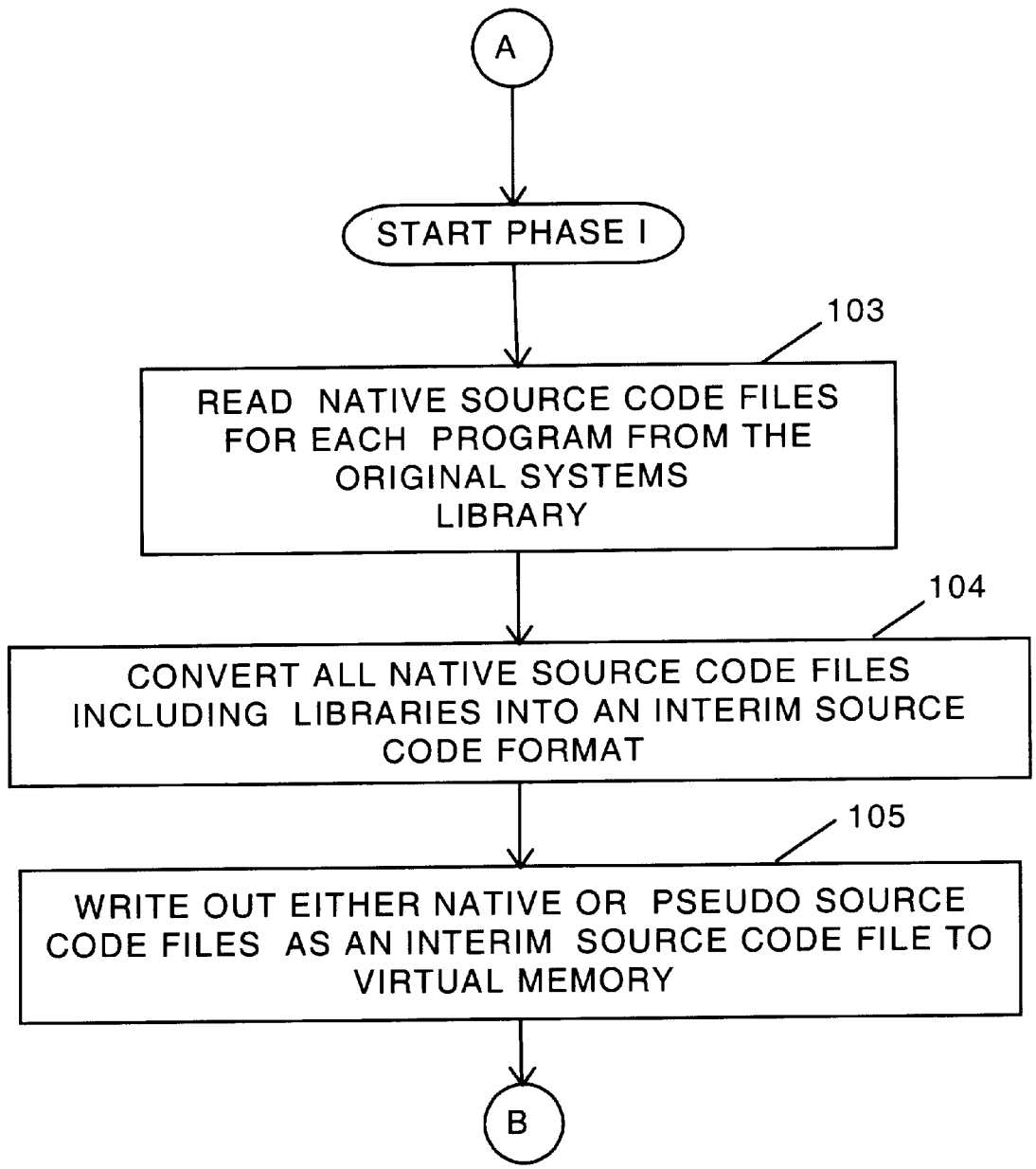

FIGS. 2A through 2L illustrate in more detail the various steps of Phase I. The system operates on program source code files which are related in some manner, such as a financial management system which includes an accounts payable module, an accounts receivable module and so on. The relationship exists in that each of the program source code modules access common data files or use identically formatted work areas. These common data files can include client data files, customer data files, inventory data files, and the like each of which contains various data fields and the defined work area structures. The programs access data elements by defining variables and constants by name and by various attributes such as length, type and so on. In the case of working storage, formatting may also be included such as when a display or printout of data is required. The optimization commences by selecting an option as shown in FIG. 2A, step 101. If Option 1 is selected, step 102 the optimization process commences by reading the program source code files from the current system library for the related group of program files, step 103. Each of the source code files including the function libraries are converted into an interim code which may be in either a native or a pseudo format, step 104 as shown in FIG. 2B.

A pseudo format has been selected in the preferred embodiment as an interim step to simplify the program code for the instant invention. This permits the software of the instant invention to read different program languages convert the instructions to the pseudo code and perform the optimization on the pseudo code without the necessity of rewriting the instant software for the optimization of different program code languages. It should be noted that the invention disclosed herein can operate directly on the native source code without the need to convert to a pseudo code by simply writing the software to include operations on the native language reserved words.

The pseudo code is code which substitutes the keyword or reserved words of any language instruction with a token word. For example a MOVE instruction is converted in the pseudo code to MV. Several different kinds of MOVE instructions are converted sequentially in order of complexity as MV1, MV2, etc. It is clear that a corresponding token must be established for each instruction keyword or reserved word and placed in a table for use in the conversion from native to pseudo code for the target native code. This is accomplished by simply replacing each reserved word on reading the native code with the corresponding pseudo code word for that function and writing the revised code as a new file. In the event the pseudo code is not used, the original source code is written out to a new interim file in the native code for optimization to avoid corruption of the original native code during the optimization process.

As shown in FIG. 2B, the system writes out all pseudo code files into an interim source code file into virtual memory, step 105. This places all source code instructions and data in a specific physical location in such memory which is accessible either sequentially or randomly.

Figure 2C:
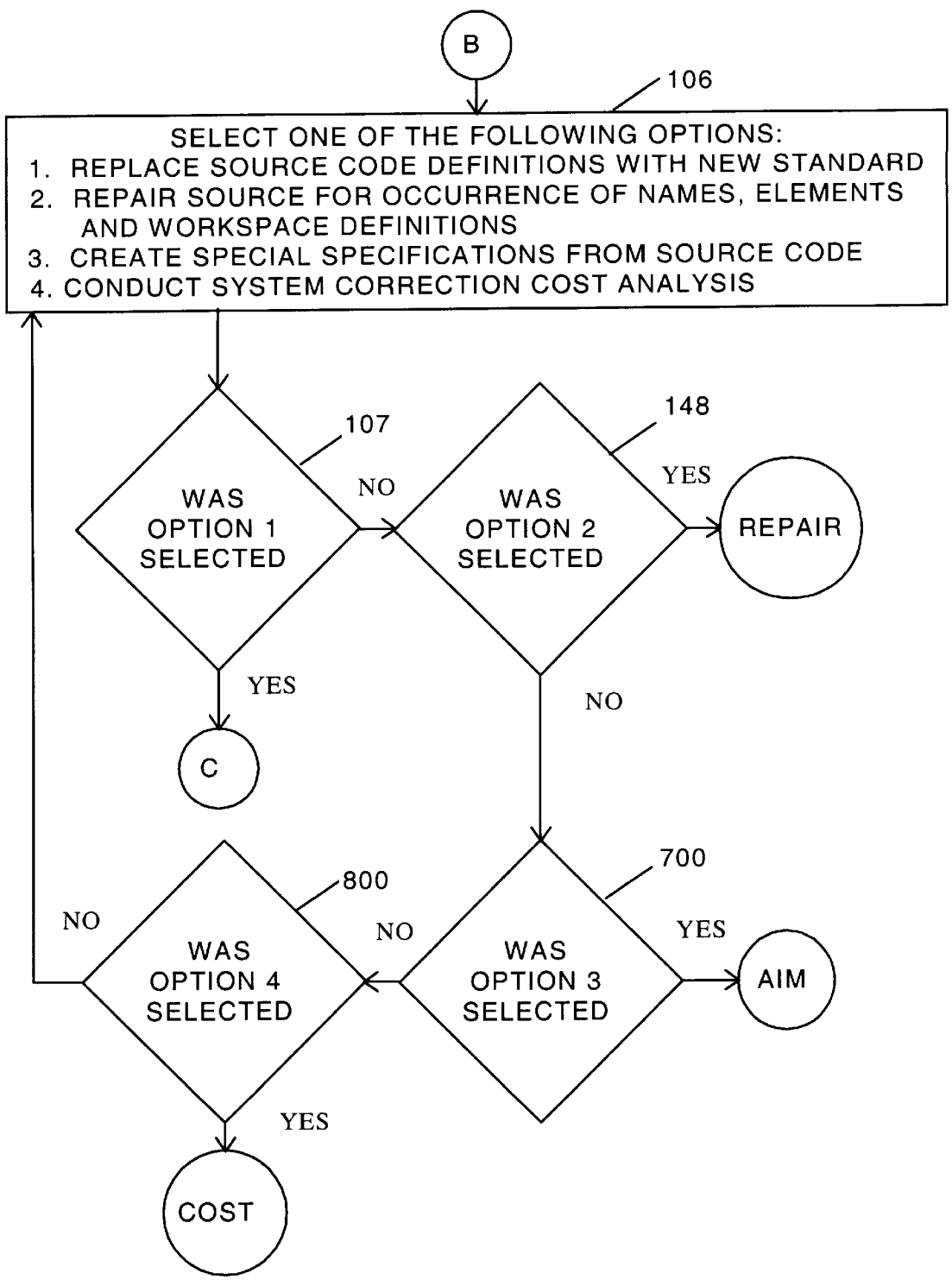
Figure 2D:
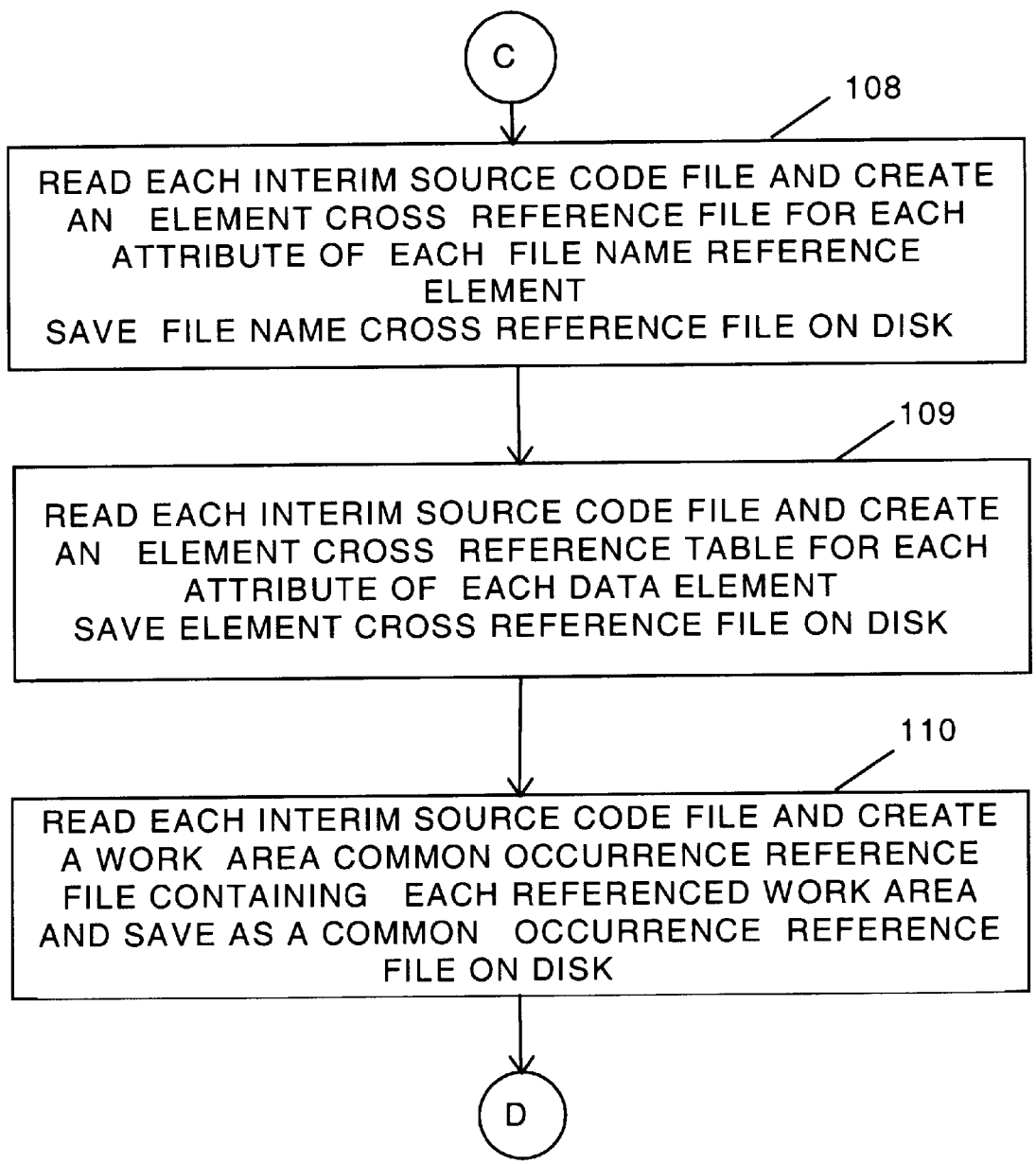

After converting all source code files the user is presented with the additional options as shown in FIG. 2C, step 106. Option 1 is a continuation of the Optimization process. The remaining options permit the user to select an intermediate option as will be discussed hereafter. If Option 1 is selected, step 107, the system commences reading the interim source code files, steps 108–110. Referring to FIG. 2D, the system reads the source code files and determines the logical file name used to access each file and creates a File Name Cross Reference File of logical names and related physical file names. The File Name Cross Reference File is stored on disk, step 108. The user may as an option modify the logical name used by the system for any file. This modified name is stored as the logical name for the first occurrence of the reference to the physical file as set forth in the File Name Cross Reference File.

Each instruction in each source code file or module is again read from the interim source code files and its type determined. Those instructions which operate on a data element are analyzed and the data element identified. The name and other attributes of the data element are determined and an Element Cross Reference File containing each data element by name and its associated attributes is created, step 109. The Element Cross Reference File is stored on disk and contains at least the following information regarding each data element:
1. SOURCE FILE NAME
2. RECORD TYPE
3. ELEMENT NAME
4. ELEMENT LENGTH Each instruction in each source code file or module is again read from the interim source code file and its type determined. Those instructions, which define work space allocations are analyzed and the work space identified. The workspace is analyzed by structure and a Work Space Common Occurrence File for each workspace definition is created, step 110. The Work Space Common Occurrence File contains at least the following information regarding each work space allocation:
1. THE OCCURRENCE NUMBER
2. THE SIZE OF THE WORK SPACE IN CHARACTERS
3. THE NUMBER OF LINES ALLOCATED FOR THE WORKSPACE
4. THE SEQUENCE OF EACH IDENTICALLY DEFINED WORK SPACE
5. ANY SPECIAL FORMAT INFORMATION The system provides for interactive communication with a user, who may indicate that a Where Used Report is or is not to be generated.

Figure 2E:
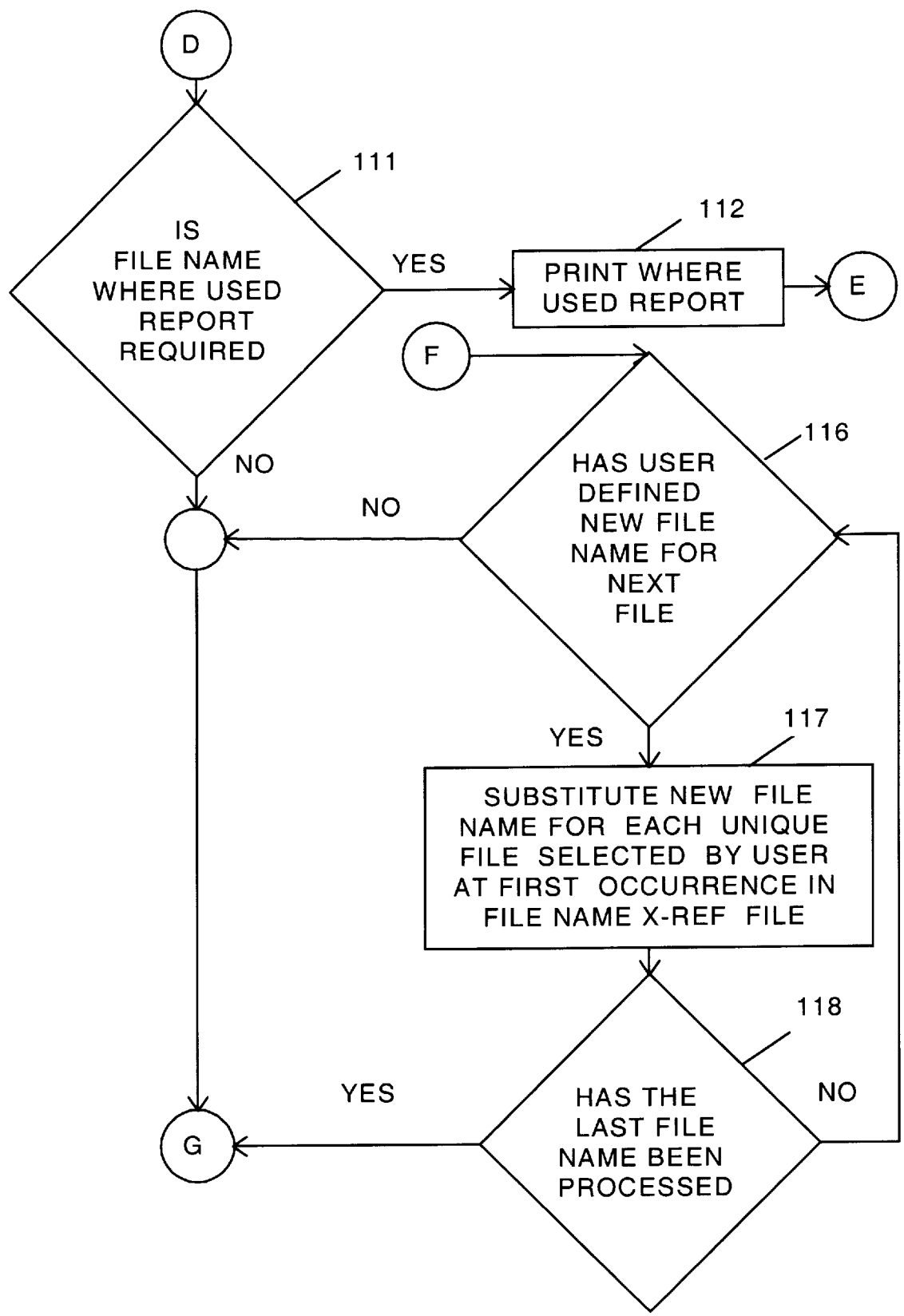
Figure 2F:
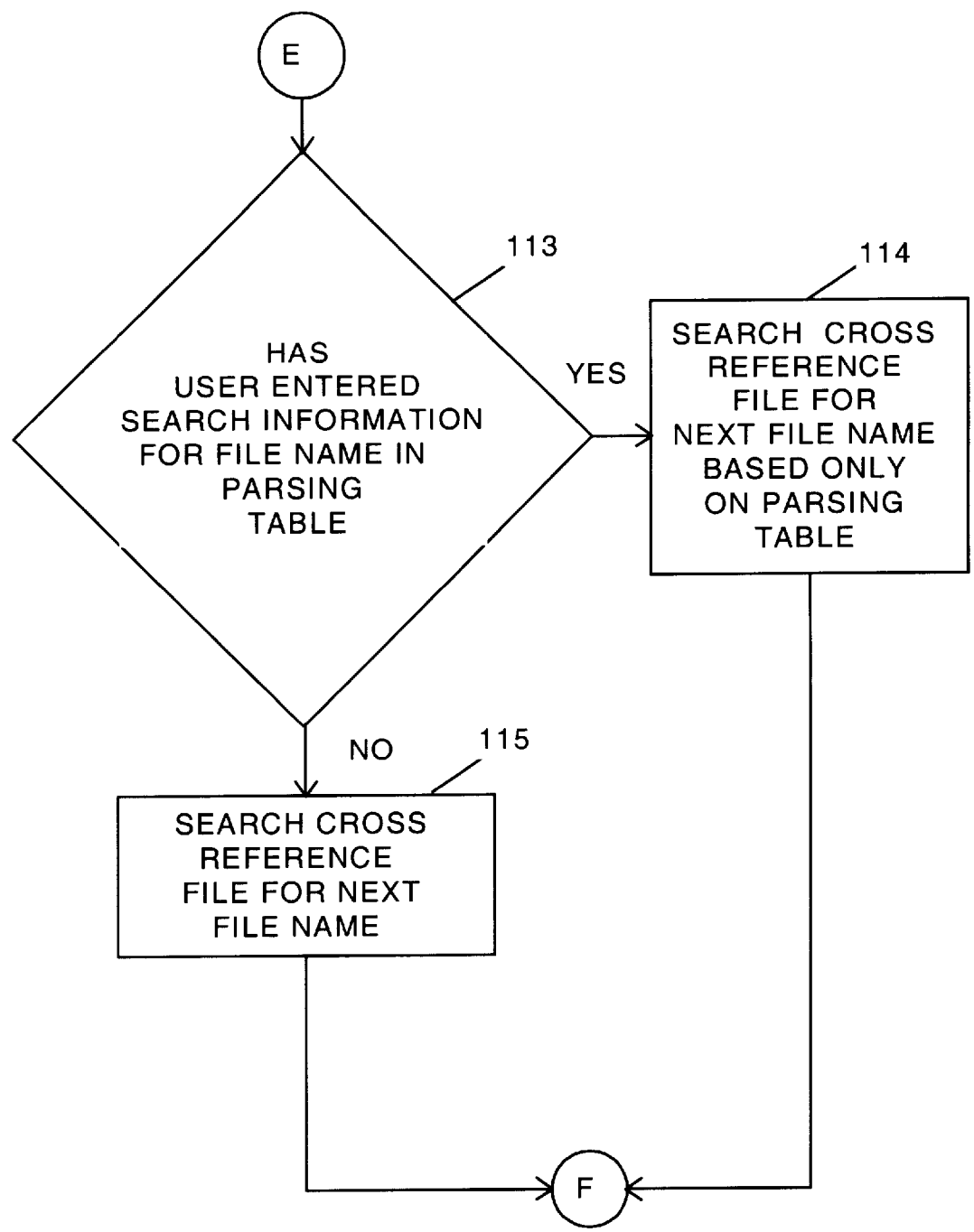

With reference to FIG. 2E, a File Where Used Report for logical file names, may be selected for display or print by the user. A File Where Used Report is a report of the contents of the File Name Cross Reference File with information sorted by physical location. This permits the user to evaluate which of the various logical file name references refer to the same physical file. If the user indicates that such a report is required, step 111, the system prints out a report, step 112. The user may then examine the report and define new logical names for selected physical files. On review of the File Name Where Used Report the user may enter search information in a Parse Table, FIG. 2F. If such information, step 113, is entered the system searches for files matching the Parse Table, step 114. The system also searches for files by name for those files which are not selected by the Parse Table, step 115. If the user defines a new logical name, step 116, the new name is substituted for the first occurrence of each unique file in the File Name Cross Reference File, step 117. Uniqueness is determined by the actual name of the file referred to by the logical file name. Multiple unique logical file names may be selected by the user for change and the user is given the opportunity to change the next physical file name step 118. On processing the last file name, the system goes to the next stage, step 118.

Figure 2G:
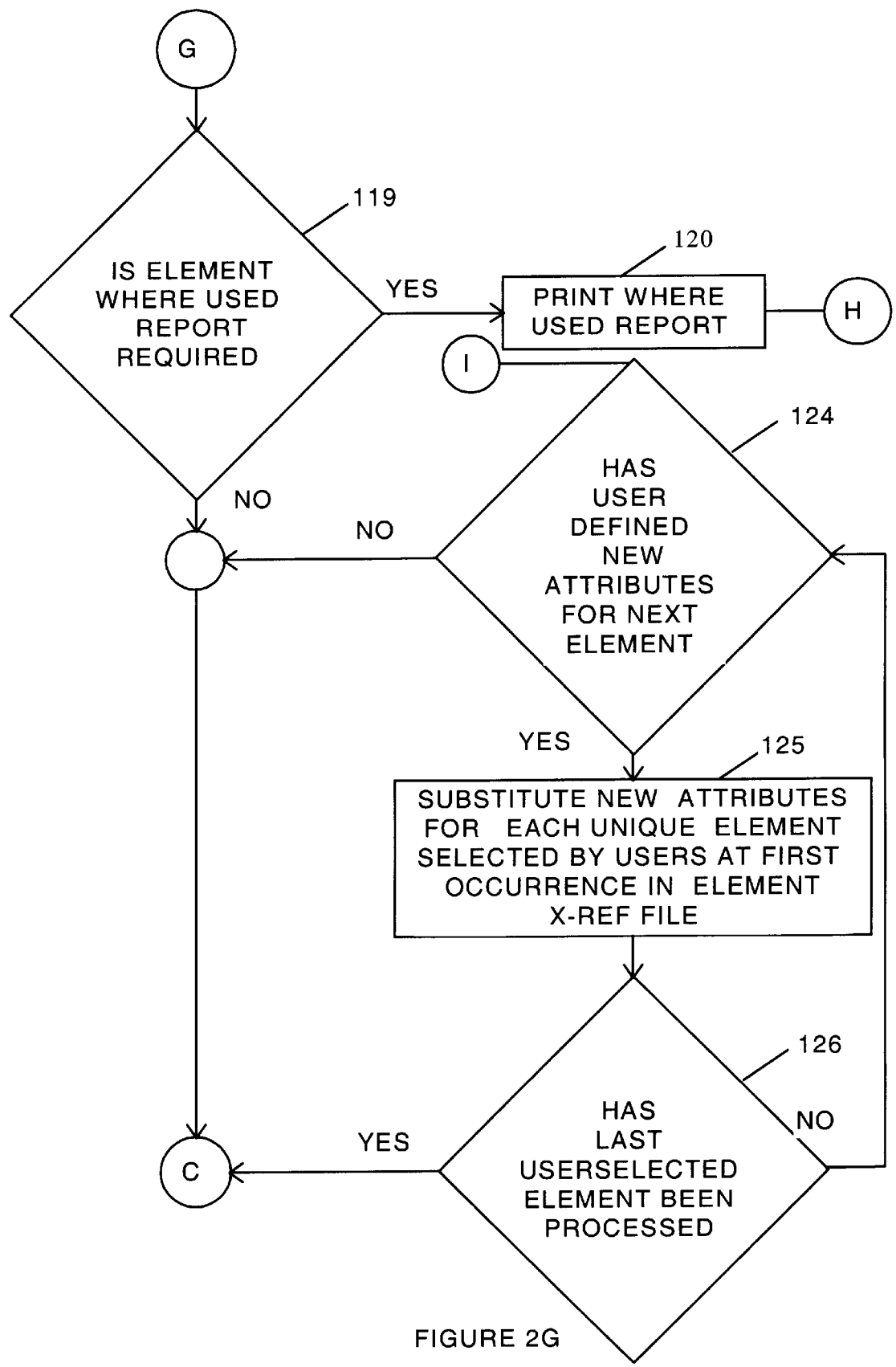
Figure 2H:
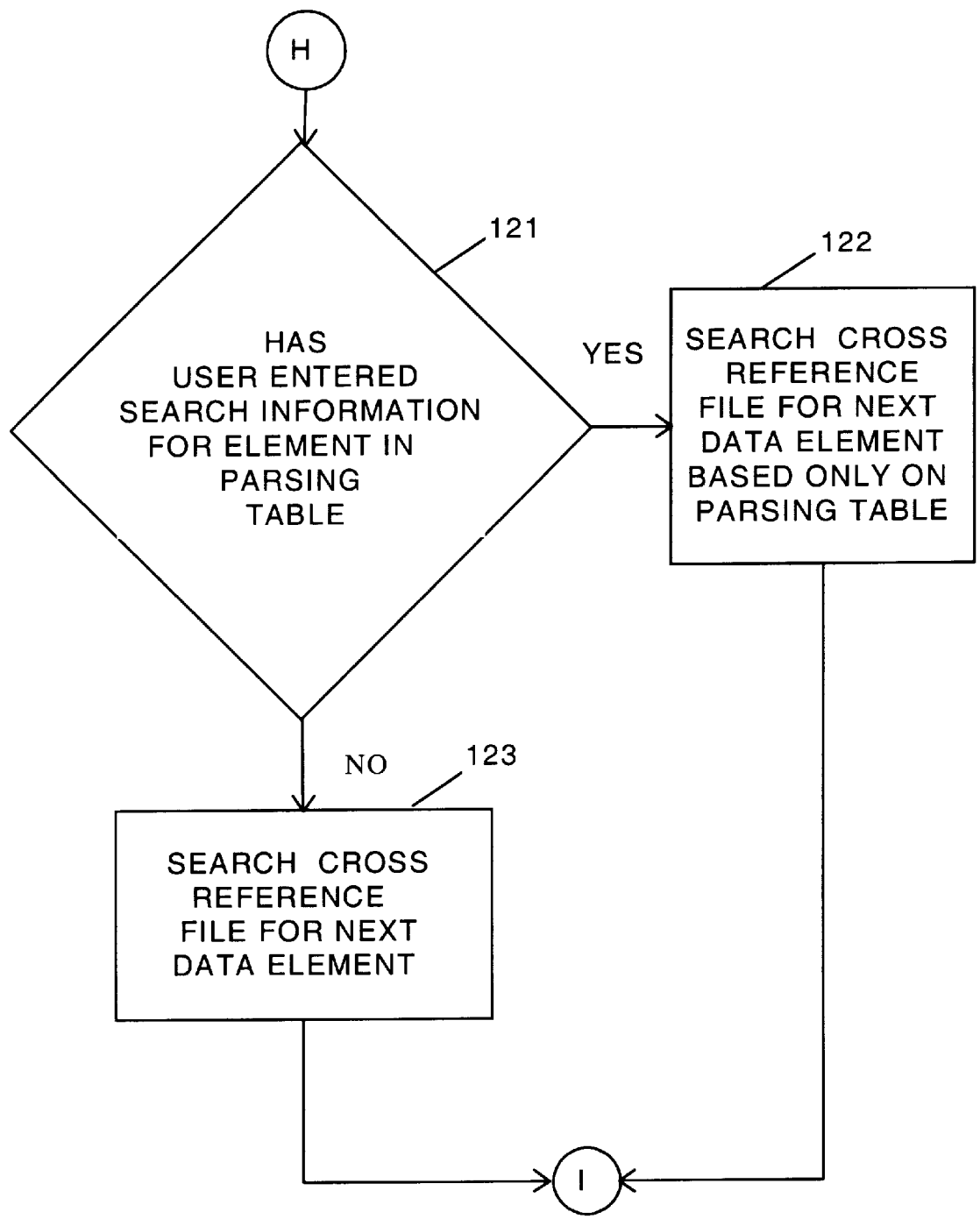

An Element Where Used Report, FIG. 2G, may be selected for print by the user, step 119. An Element Where Used Report is a report of the contents of the Element Cross Reference File with information sorted by physical location. This permits the user to evaluate which of the various data elements are stored in the same physical location. If the user indicates that such a report is required, the system prints out a report, step 120. The user may then examine the report and define new attributes for selected variables. On review of the Element Where Used Report the user may enter search information in Parse Table, step 121, as shown in FIG. 2H. If such information is entered, the system searches the Element Cross Reference File for the data elements which match the Parse Table, step 122. The system also searches for any data elements for which no selection was made by the user, step 123. These element definitions may be a change by the name, type or length or any other attribute of the data element. In the case of a six byte date, for example, the user may wish to change the length to eight bytes in order to accommodate a four byte year such as the year 2000. If the user defines a new name or new attributes, step 124, the new data is substituted for the first occurrence of each unique data element in the Element Cross Reference File, step 125. Uniqueness is determined by the physical location of the data element in the virtual memory. Multiple unique data elements may be selected by the user for change and the user is given the opportunity to change the next element name or attributes, step 126. On processing the last file name, the system goes to the next stage, step 126.

Figure 2I:
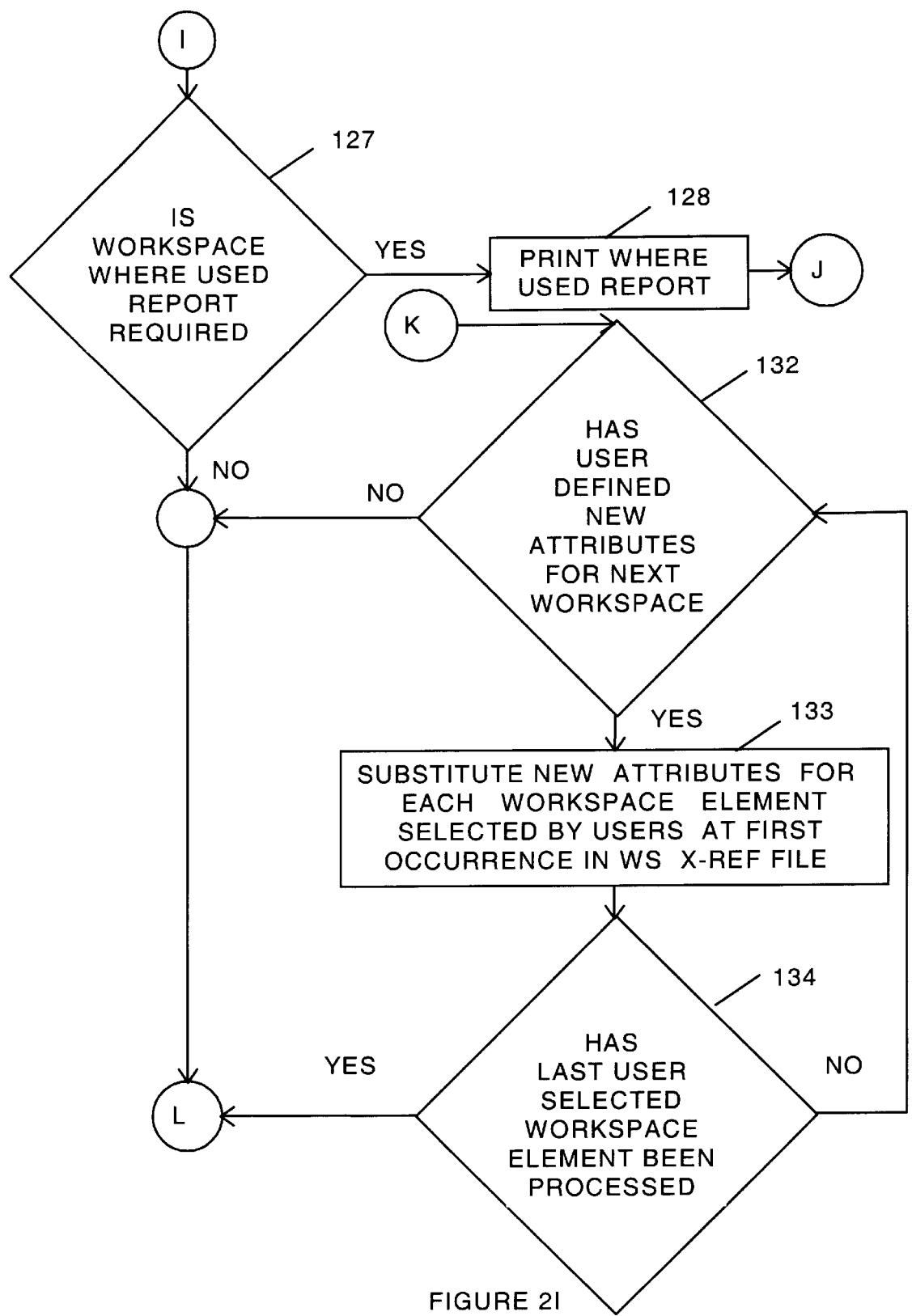

As shown in FIG. 2I, a Work Space Where Used Report for work space information, may be selected for display or print by the user, step 127. A Work Space Where Used Report is a report of the contents of the Work Space Common Occurrence File with information sorted by physical location. This permits the user to evaluate which of the various work space allocation parameters require change. For example, if a data element size is changed, the corresponding size of a work space may also require change.

Figure 2J:
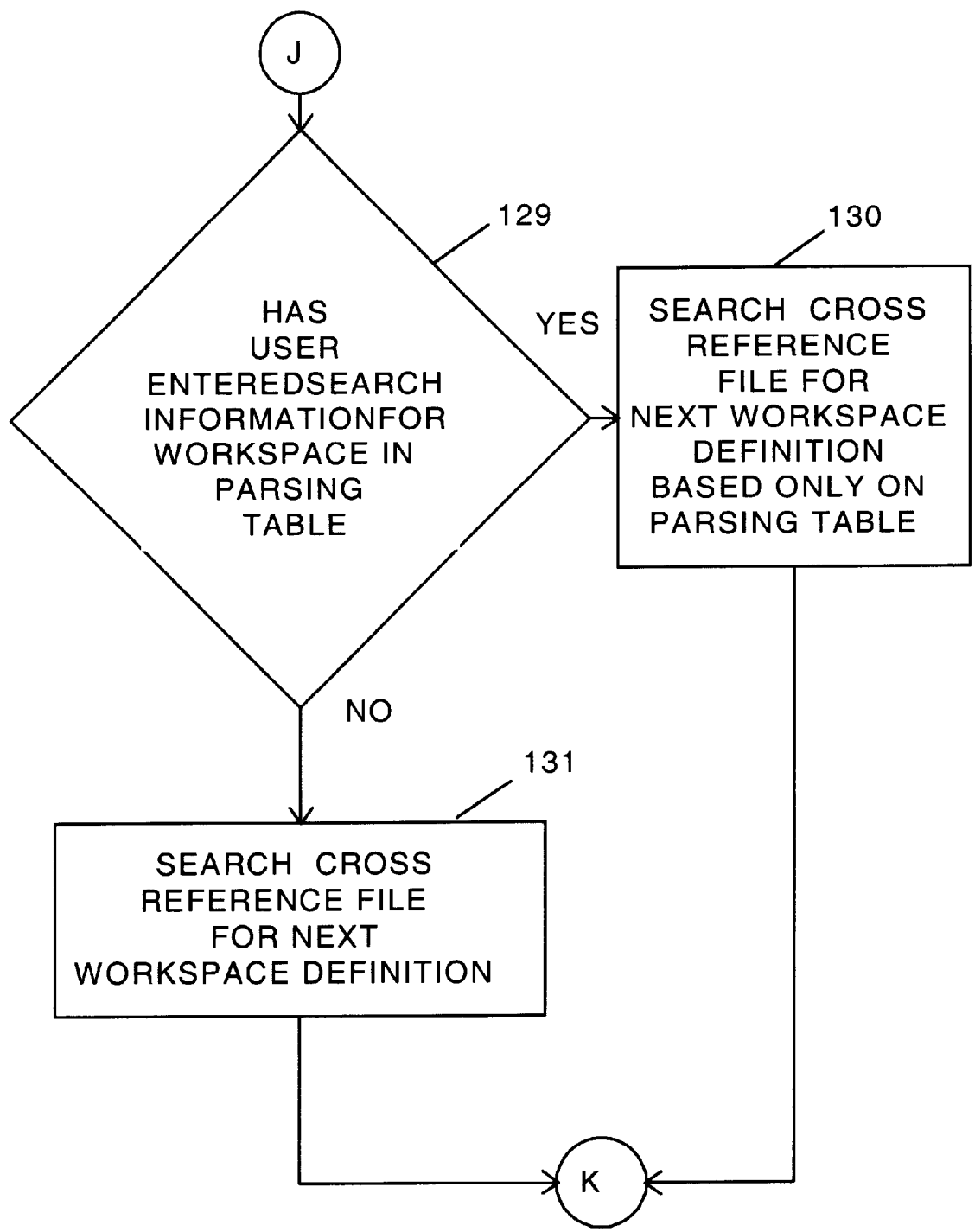

If the user indicates that such a report is required, step 127, the system prints out a report, step 128. The user may then examine the report and define new attributes for selected workspace parameters. On review of the Work Space Where Used Report the user may enter search information in a Parse Table, step 129, as shown in FIG. 2J. If such information is entered, the system searches the Work Space Common Occurrence file for common work spaces which match the Parse Table, step 130. The system also searches for any other Common workspace definitions for any workspace allocations for which no selection was made by the user, step 131. The essential difference is that work space is searched by its profile. These new definitions may be a change in the format, type or length or any other attribute of the workspace parameters. If the user defines a new name or new attributes, step 132, the new data is substituted for the first occurrence of each unique work space in the Work Space Common Occurrence File, step 133. Uniqueness is determined by the form of the workspace allocation. Multiple unique workspace definitions may be selected by the user for change and the user is given the opportunity to change the next work space definition, step 134. On processing the last work space definition, the system goes to the next stage, step 134.

Figure 2K:
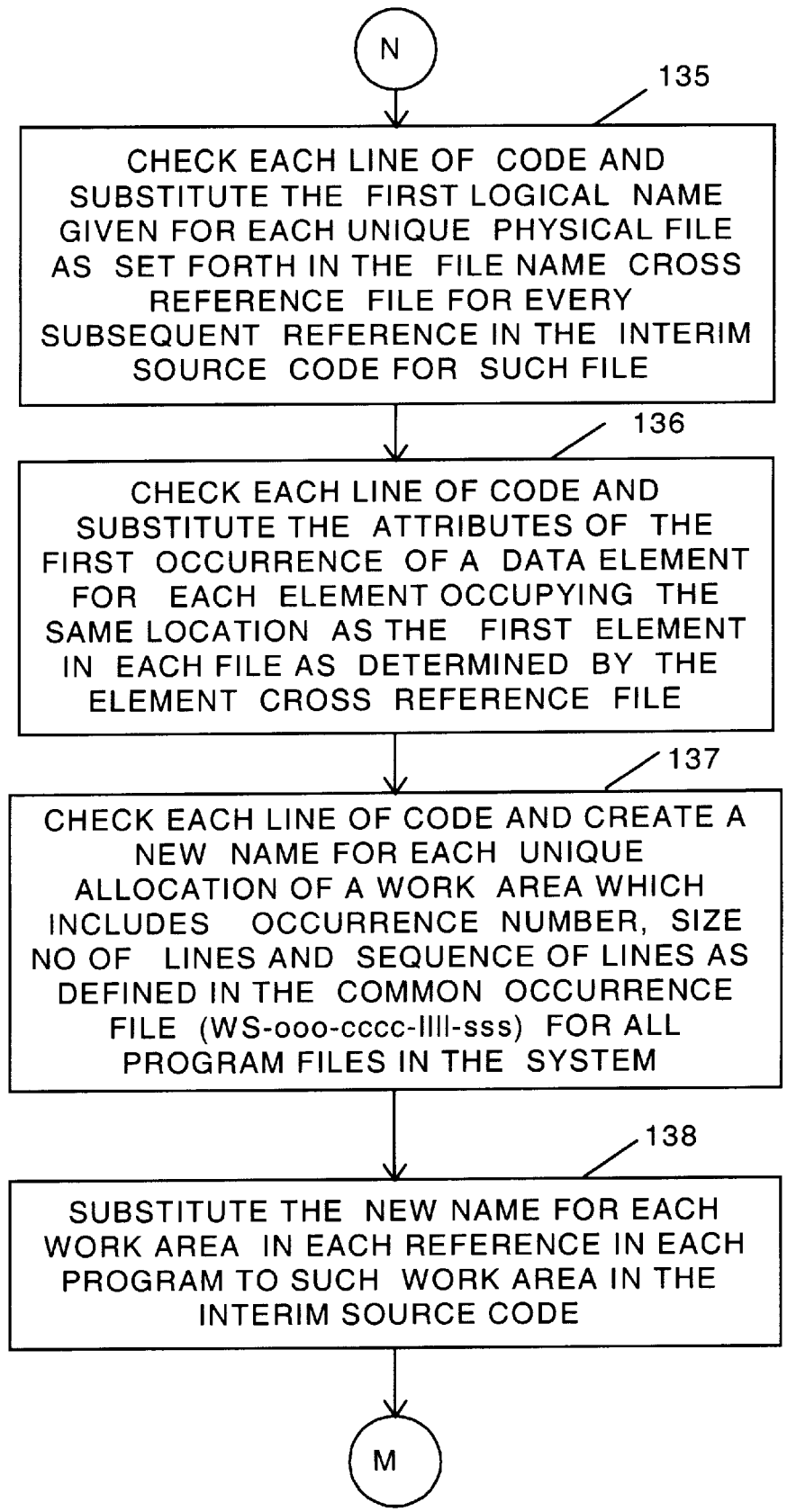

Referring to FIG. 2K, the interim source code is checked and each logical file name is compared with the File Name Cross Reference File. Each reference to the same physical file name is changed to the logical name of the first occurrence of the logical file name associated with the same physical file as set forth in the File Name Cross Reference File, step 135, as determined by the system or selected by the user.

The interim source code is again checked and each data element name is compared with the Element Cross Reference File. Each reference to the same element in the same physical location is changed to reference the name and attributes of the first occurrence of the data element as set forth in the Element Cross Reference File, step 136 as determined by the system or selected by the user.

The interim source code is again checked and each work space allocation is compared with the Work Space Occurrence File. Each reference to the same work space in the same format is changed to reference the parameters of the first occurrence of the work space definitions as set forth in the Work Space Occurrence File, step 137 as determined by the system or selected by the user.

However, the user cannot select a new workspace name. The system creates a new reference name for each unique Work Area, step 137, in the following format: WS-ooo-cccc-llll-sss, where "ooo" is the occurrence number, i.e., the first occurrence of the same work space allocation (ooo=001 and so on), "cccc" is a four digit number representing the size of the work space in characters, "llll" is a four digit number representing the number of lines of work area, and "sss" is a three digit number representing the sequence of lines of workspace allocated. That is, the order of identical work space allocations defined in sequence. The information required regarding the format of the Work Area is derived from the Work Space Common Occurrence file which defines each such area. The maximum sequence number is an indication of the largest number of work space allocations in any program sequence. Certain programs may overlap in all or part of the Work Area allocations. This means that if program 1 uses work space allocated in sequence 001 through 006, and program 2 uses workspace allocated in sequence 001 through 003, each program will utilize the same physical space in sequence 001 through 003. Program 1 of course uses additional space 004 through 006. Since the programs run at different times this use of the same work area does not create any conflict, but simplifies the code with standard definitions with equivalent work space used by different programs. The name created is substituted for each reference allocating the work area in sequence within each program step 138. This means that each work space name has the attributes of the work space built into the name and makes future maintenance less confusing.

The user is provided an option to reprint the File Name Where Used Report for the revised file names, step 139. On an affirmative selection, the revised File Name Where Used Report is printed, step 140, as shown in FIG. 2L.

Figure 2L:
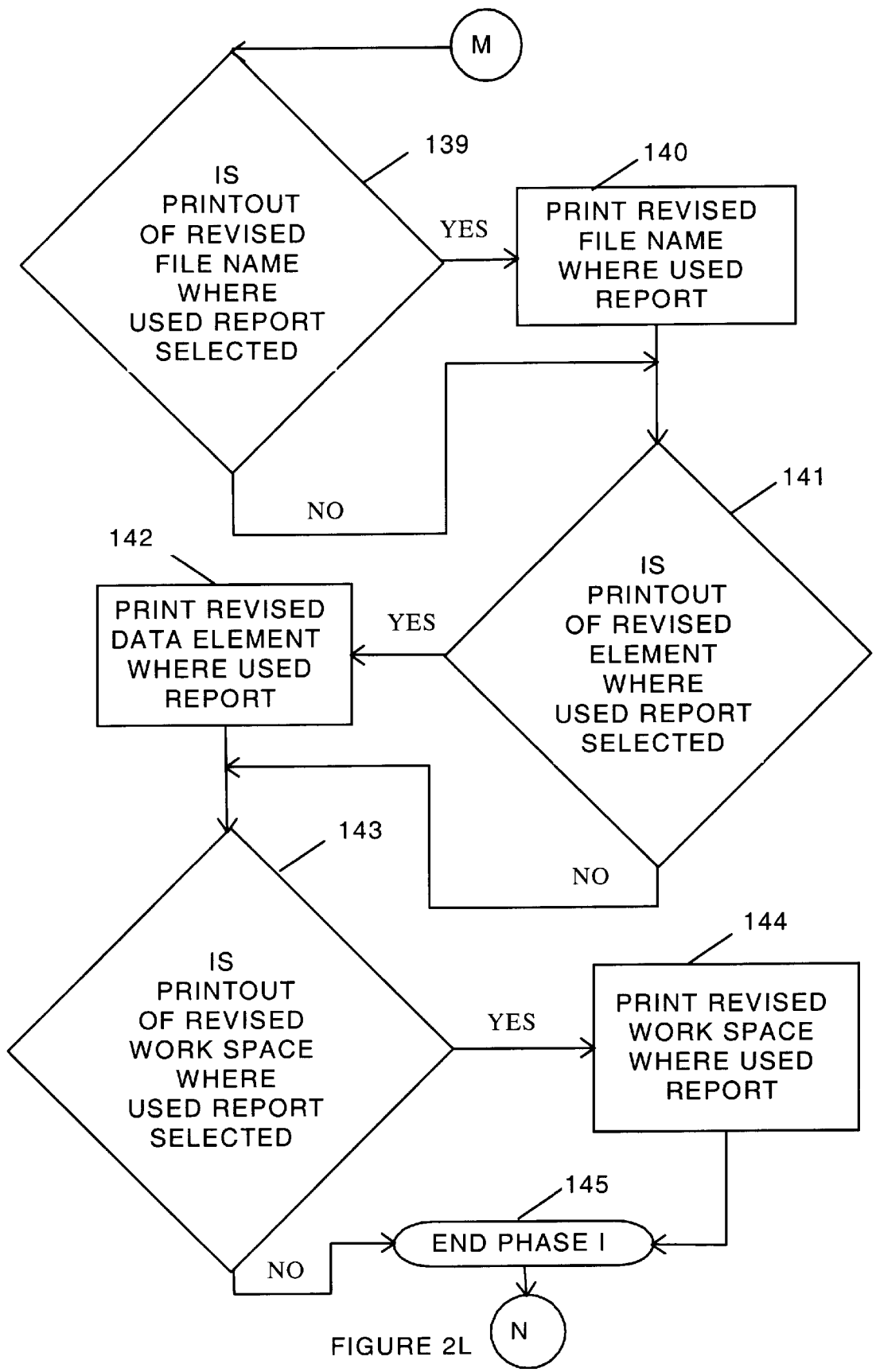

In FIG. 2L, the user is then provided an option to reprint the Element Where Used Report for the revised data element names and attributes, step 141. On an affirmative selection, the revised Element Where Used Report is printed, step 142.

The user is also provided an option to reprint the Work Space Common Occurrence Report for the revised workspace allocations, step 143. On an affirmative selection, the revised Work Space Common Occurrence Report is printed, step 144, and Phase I ends, step 145.

While each Phase is indicated as sequentially following the other, this need not occur at the same time. That is, each Phase may be executed independently as indicated in options to be discussed hereafter. However, to the extent that each independent phase requires data generated by a previous phase, they should be executed in sequence. However, a user could elect to only make the names uniform throughout the programs and thus terminate at Phase I. Alternatively, perhaps only the size of certain variables is to be changed and this can be accomplished by making the appropriate attribute changes in Phase I.

Figure 3:
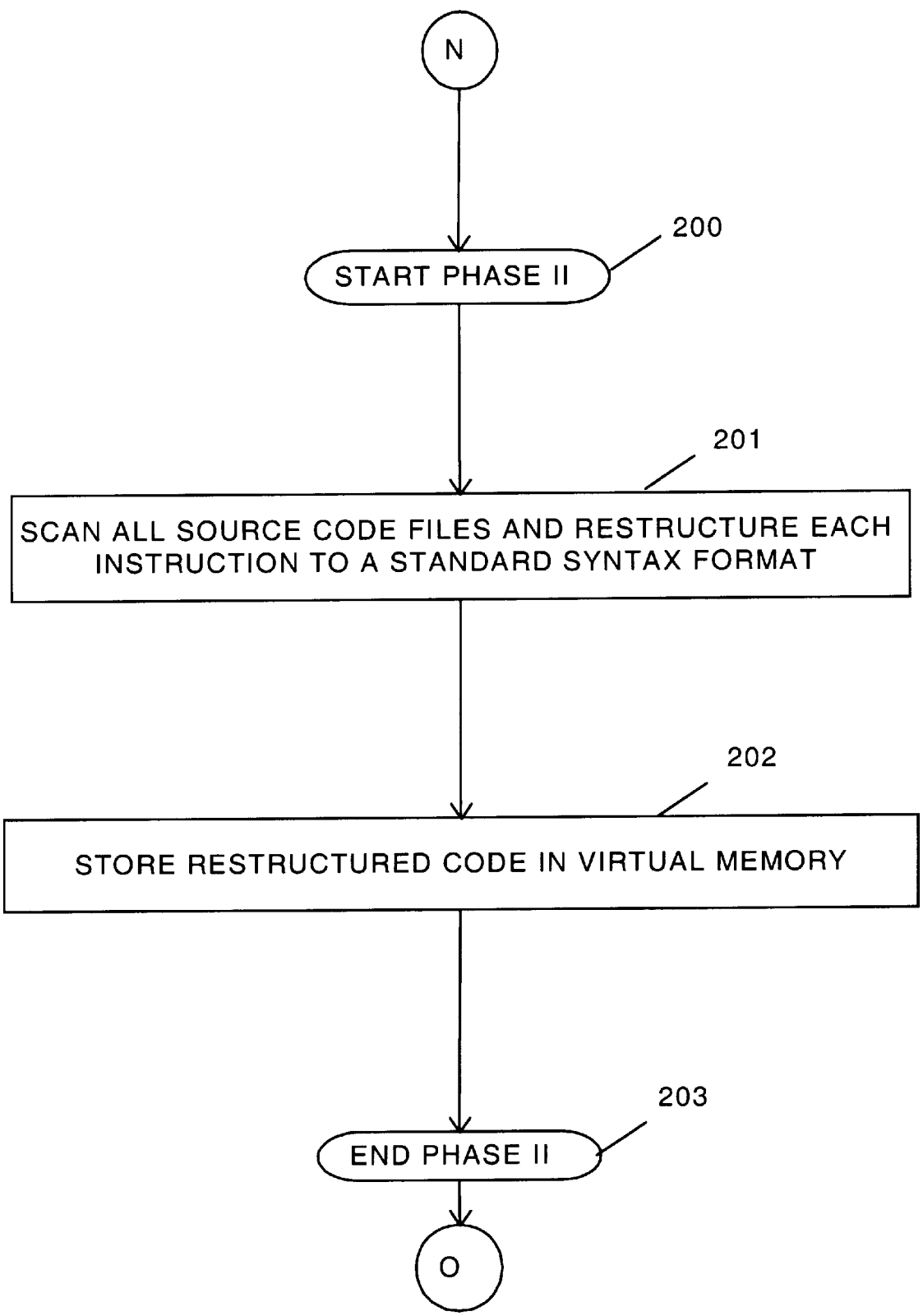
FIG. 3 is a flow chart of the Horizontal Synchronization System.

In Phase II, FIG. 3, all source code files are scanned and restructured to a standard syntax format, step 201. In the preferred embodiment, that format is a single space between instruction words and no spaces between parenthesis and words bound by the parenthesis. Accordingly, excess or multiple spaces are removed so that space formatting is consistent for all words in the source code instructions. This makes comparison of instruction lines faster as syntax need not be examined at each line. The restructured interim code is then stored in virtual memory, step 202. The interim code now has uniform logical file names for the same file, data element names for the same data location, and the same reference name for workspace allocations.

Figure 4:
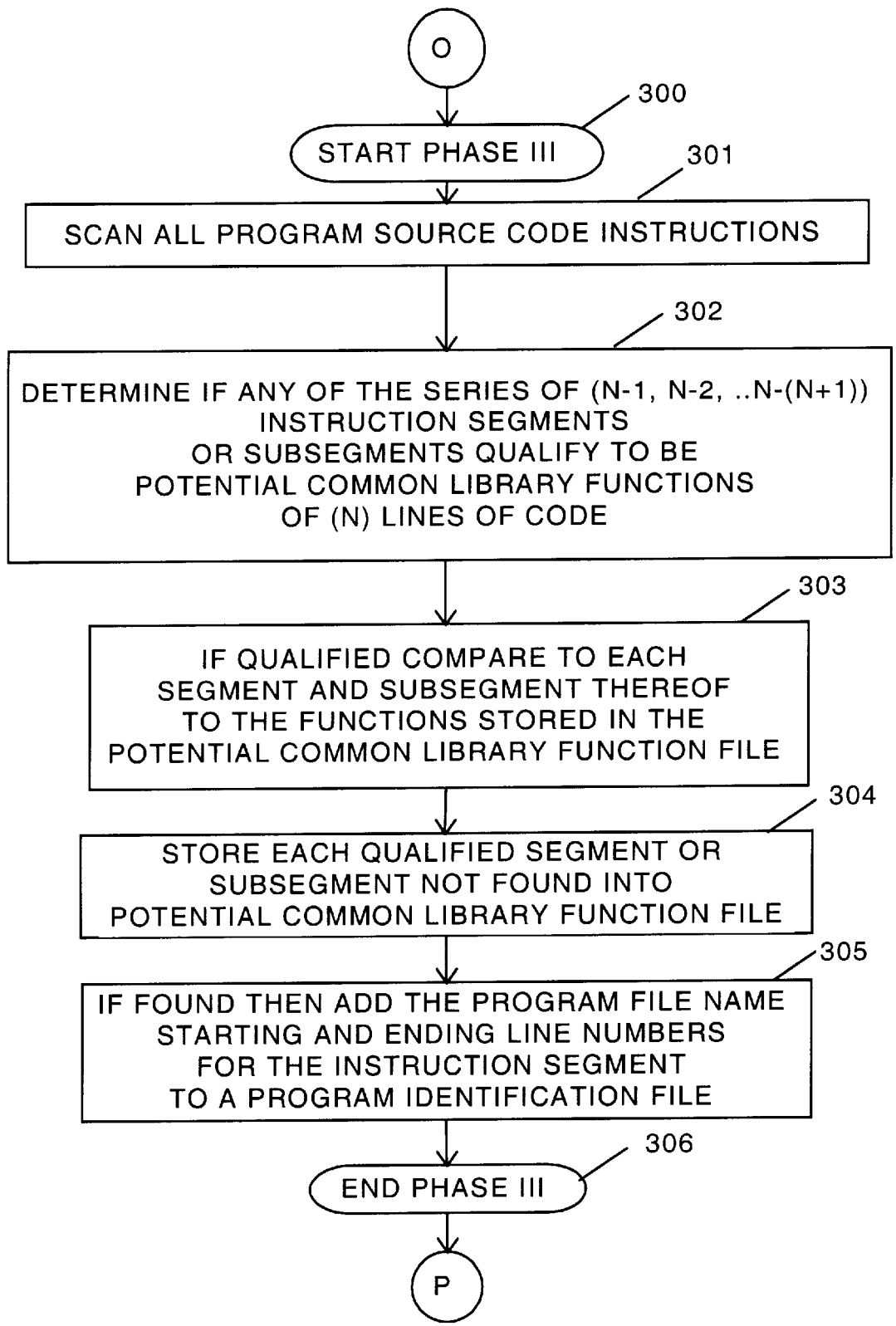
FIG. 4 is a flow chart of the Sequential Synchronization System.

In Phase III, as shown in FIG. 4, all interim program source code instructions are again scanned, step 301. Selected segments of code are examined to determine if the segment or any sub-segments qualify to be potential common library functions, step 302. In the preferred embodiment, the particular code segments examined are all segments which are positioned between program instruction code labels. Such code is parsed into sequential segments based on the series (N−1+N−2..+N−(N+1)) where N is equal to the number of code lines in the original segment and the result is a positive number greater than 0. This includes all sequential lines of code of at least two lines each, that is, as shown in FIGS. 7A through 7D. If a segment of code between two program labels is two instructions long, then one segment 1 qualifies to be a potential common library function, FIG. 7A. If three lines of code are between program labels, then there is one three line segment 2, two of the two line segments 3 and 4, for a total of (2+1) three segments which qualify to be potential common library functions, FIG. 7B. If four lines of code are between program labels, then there is a four line segment 5, two three line segments 6 and 7, and three two line segments 8, 9 and 10, for a total of (3+2+1) six code segments each of which qualify to be potential common library functions, FIG. 7C. Finally, if five lines of code are between program labels, then there is a five line segment 11, two four line segments 12 and 13, three of the three line segments 14, 15 and 16, and four two line segments 17, 18, 19, and 20, for a total of (4+3+2+1)ten segments which qualify to be potential common library functions, FIG. 7D. All code segments must be sequential.

Referring again to FIG. 4, on determination of the various segments which are potential common library functions, each such segment is compared against the segments already stored as potential common library functions in the Potential Common Library Function File, step 303. Each segment which has not been previously stored as a common library function, that is, it is not already present in the Potential Common Library File, is stored in the potential common library file, step 304. Phase III exhibits significant storage activity and the system tends to slow down initially. As more potentially common functions are stored in the library, the speed of the system increases in proportion to the number of segments found in the library.

For each segment which is found, the program file name and the starting and ending line numbers for the instruction segment are determined and stored in a Program Identification File, step 305 and Phase III ends, step 306.

Figure 5A:
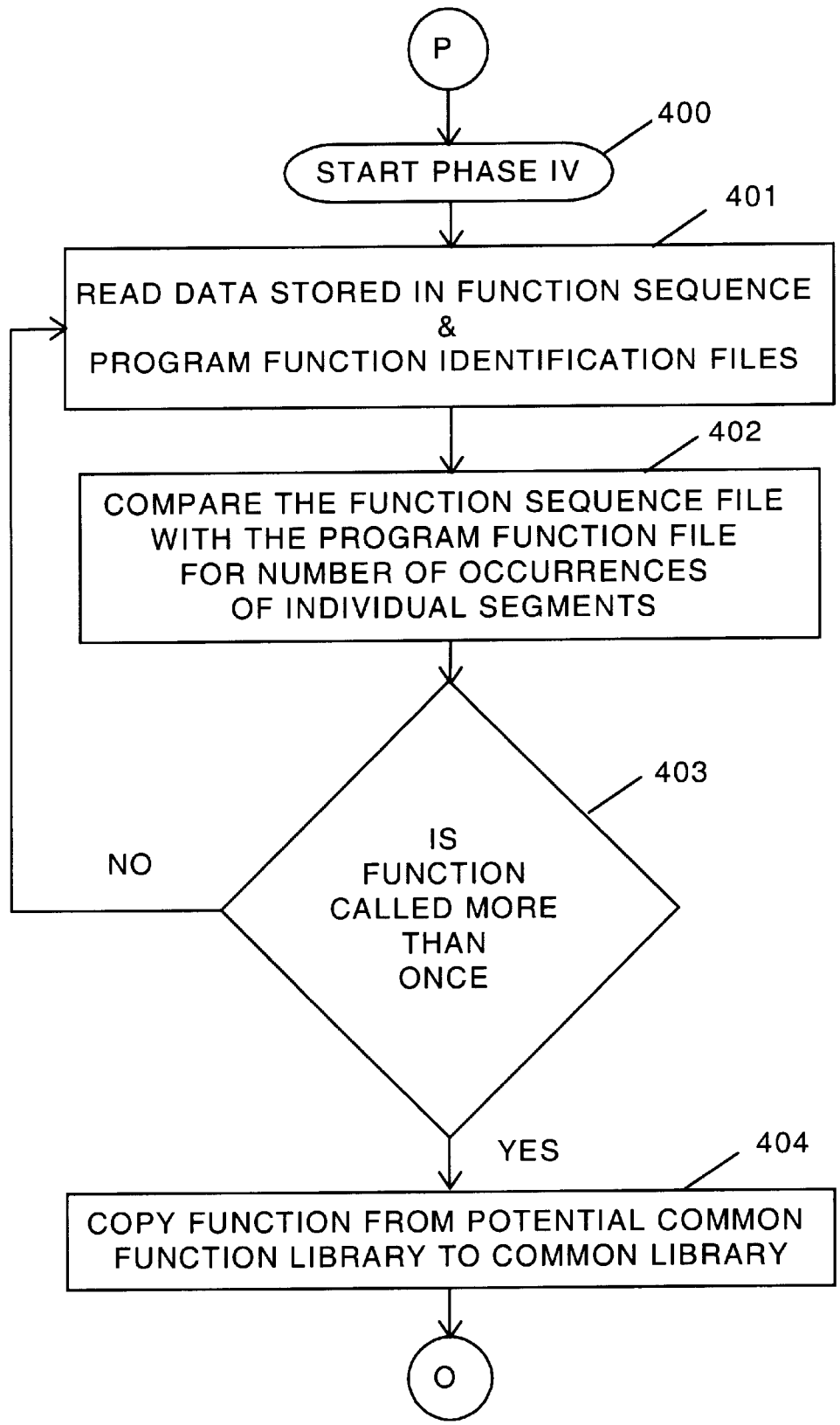
FIGS. 5A and 5B are flow charts of the library common function evaluation.

Phase IV commences, as shown in FIG. 5A, by reading data stored in the Function Sequence File and the Program Function Identification File, step 401. The Function Sequence File is compared with the Program Function Identification File for the number of occurrences of segments which are located in the Potential Common Library Function File, step 402, and a determination made as to those segments which are called more than once. If any segment is called more than once, it qualifies as a common function, step 403.

All common functions are copied from the Potential Common Library Function File to the Common Function Library, step 404.

Figure 5B:
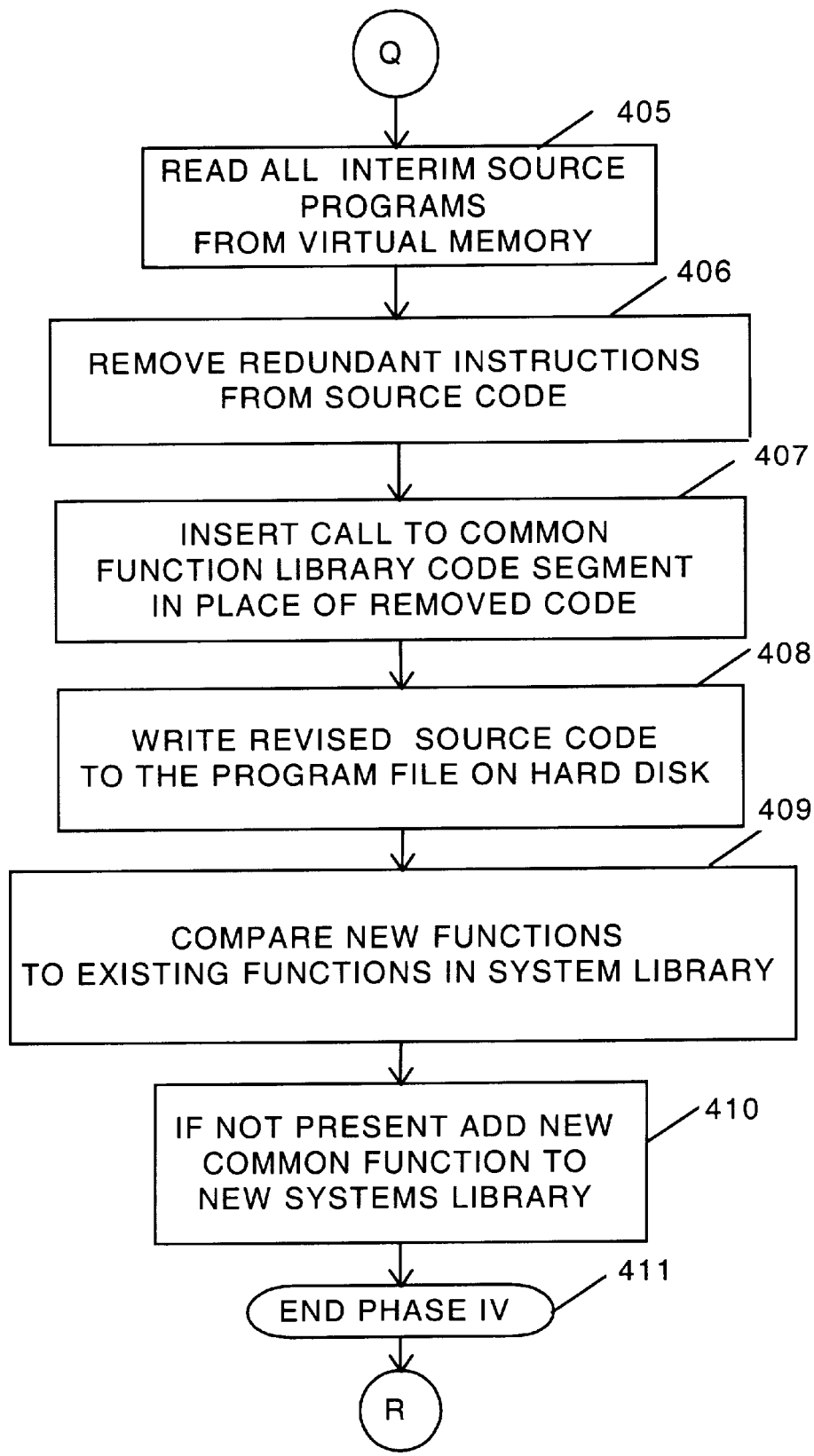

In FIG. 5B, all Interim source code is read from virtual memory, step 405 and redundant instruction segments (i.e., that which are used more than once) are removed from the source code, step 406. A single line of call code is inserted in the place of the removed code to call the respective code segment from the systems library, step 407.

The revised program source code is then written to the program file on hard disk, step 408. The common functions are compared to the system library to determine if the segment was previously saved as a common function, step 409. If not, it is stored in the system library, step 410 and phase IV ends, step 411.

Upon completion of Phases I, II, III and IV, all redundant program source code has been eliminated and only one copy of any unique set of instructions which is used more than once has become a "common library function" and has been stored in a new system library which is resident on disk. Calls to the functions in the system library have replaced redundant code in all interim source code files.

Figure 6A:
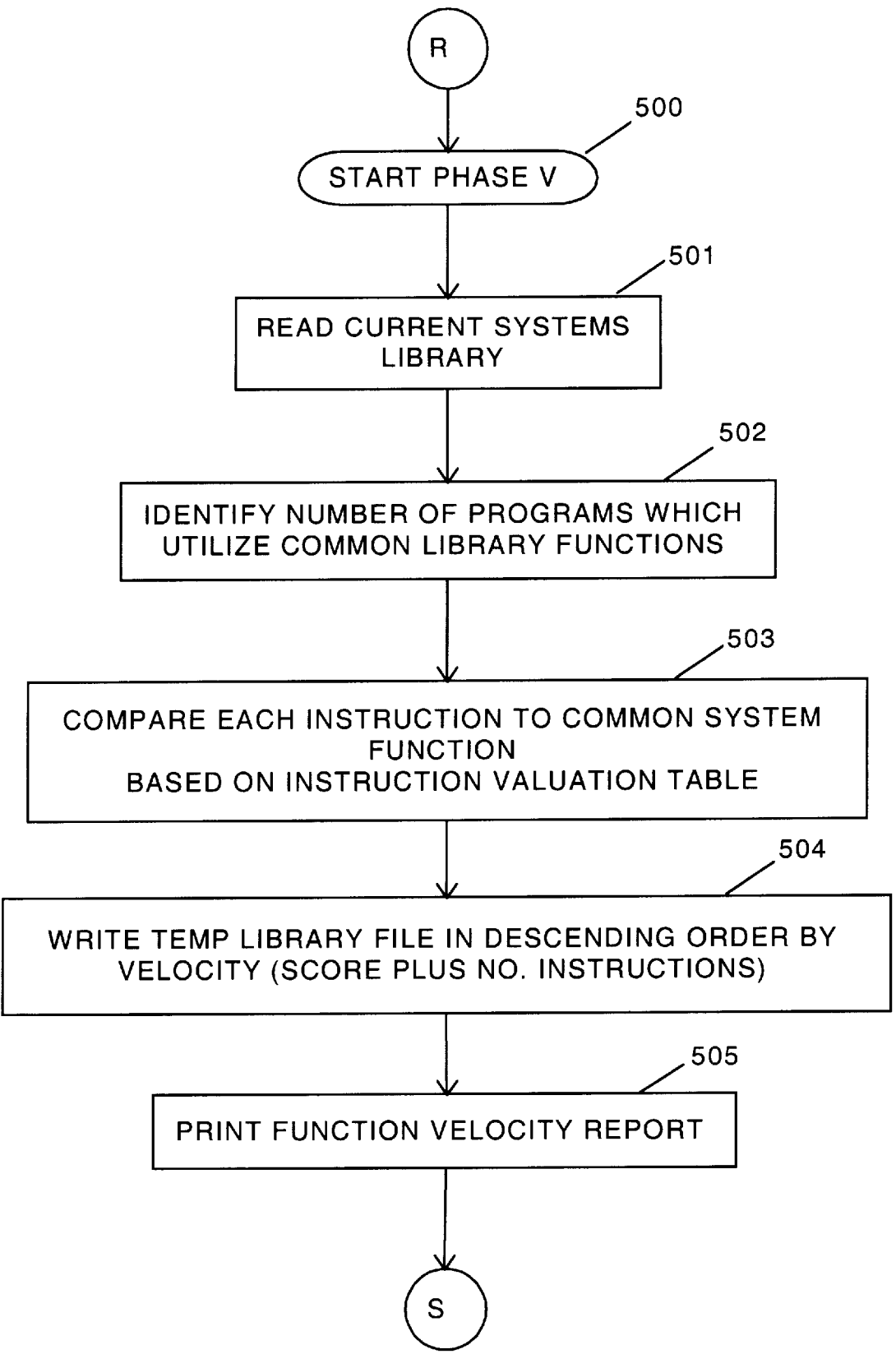
FIGS. 6A and 6B are flow charts of the conversion of the optimized code into native format.
Figure 6B:
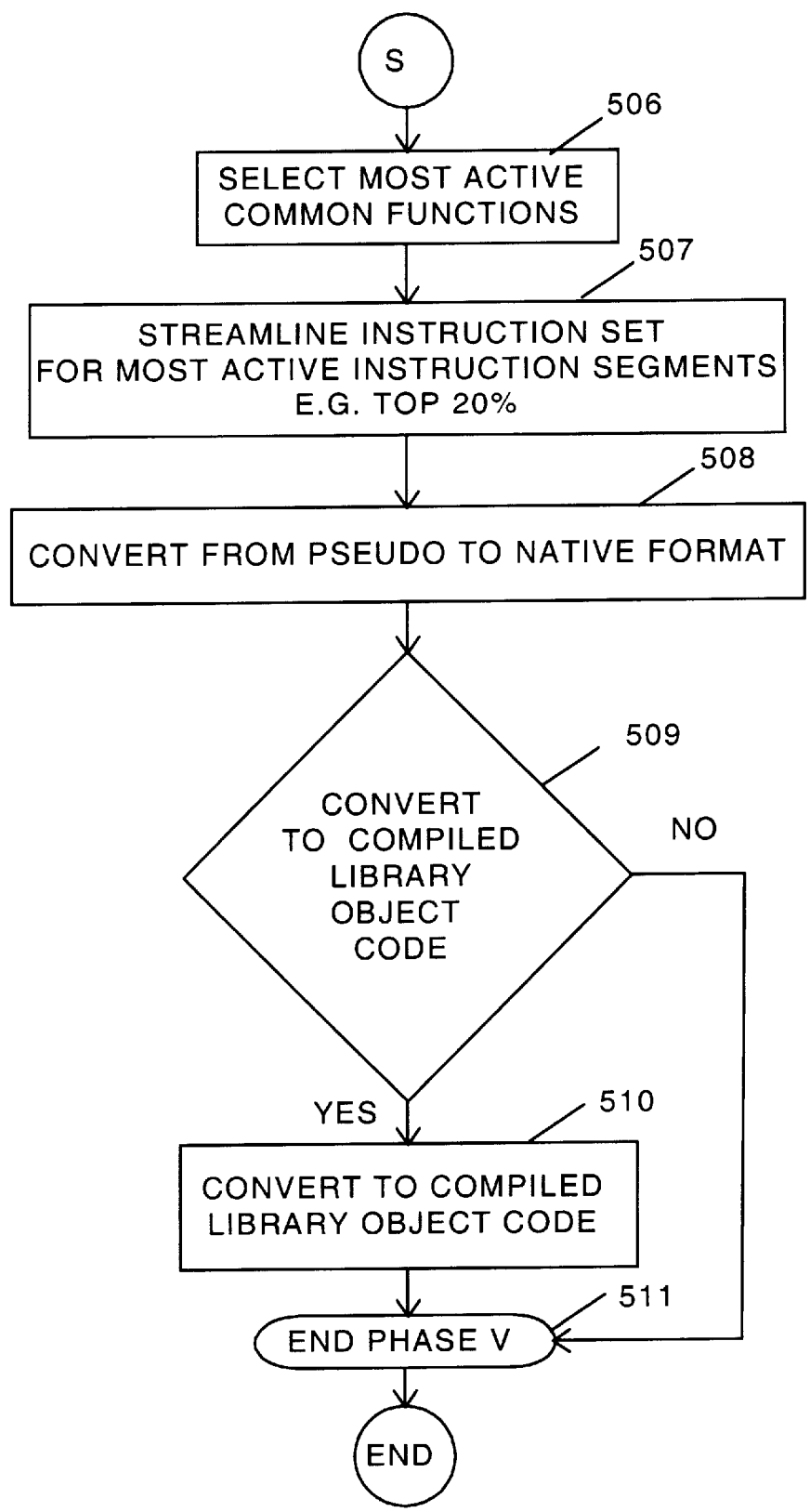
Figure 7A:
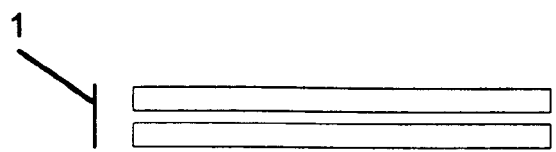
FIGS. 7A through 7D illustrate library common function segmentation.
Figure 7B:
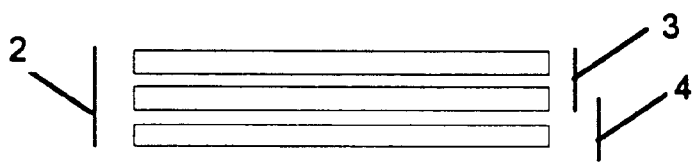
Figure 7C:
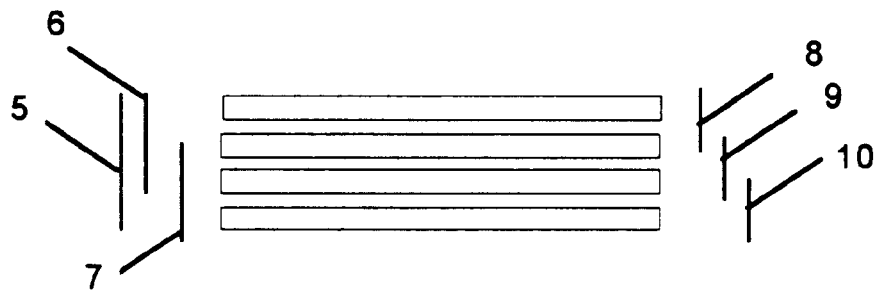
Figure 7D:
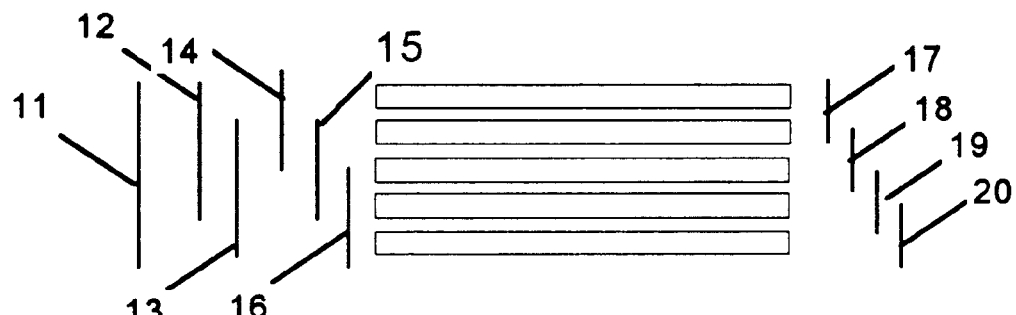

In phase V the systems library is read into memory, step 501, as shown in FIG. 6A. The number of programs which utilize common library functions are identified, step 502. Each instruction is compared to a common system function based on an Instruction Valuation File score, step 503. The score is assigned based on the instruction type. The scale is arbitrary with the more complex instructions having a higher score. A Temporary Library file is created and each instruction segment stored by name and velocity (score plus number of instructions per segment), in descending order by velocity, step 504. The Temporary Library File is stored in a Temporary Library File. A velocity report is printed listing each individual library code segment by name and velocity, in descending velocity order, step 505. As shown in FIG. 6B, a user interactively selects the highest rated common functions based on the value of the velocity set forth in the velocity report, step 506. The instruction set for each of these most active common functions may then be manually optimized by the user, step 507. Thereafter, the system converts all of the interim source code from the pseudo to native code in which it originally existed, step 508. Optionally, the user may elect to compile the library to compiled library object code, step 509 on an affirmative election, the system converts the new source code instructions to call compiled library objects, step 510. In either case Phase V ends, step 511.

Use of the optimized source code as provided by this invention is enhanced not only through the streamlining and optimization of code as described herein, but also due to the fact that the various library objects, once called, remain resident in memory and as such increased speed of operation of the programs is enjoyed due to called portions of the program being accessible at RAM memory speeds.

DETAILED EXPLANATION OF PREFERRED EMBODIMENT

Figure 8A:
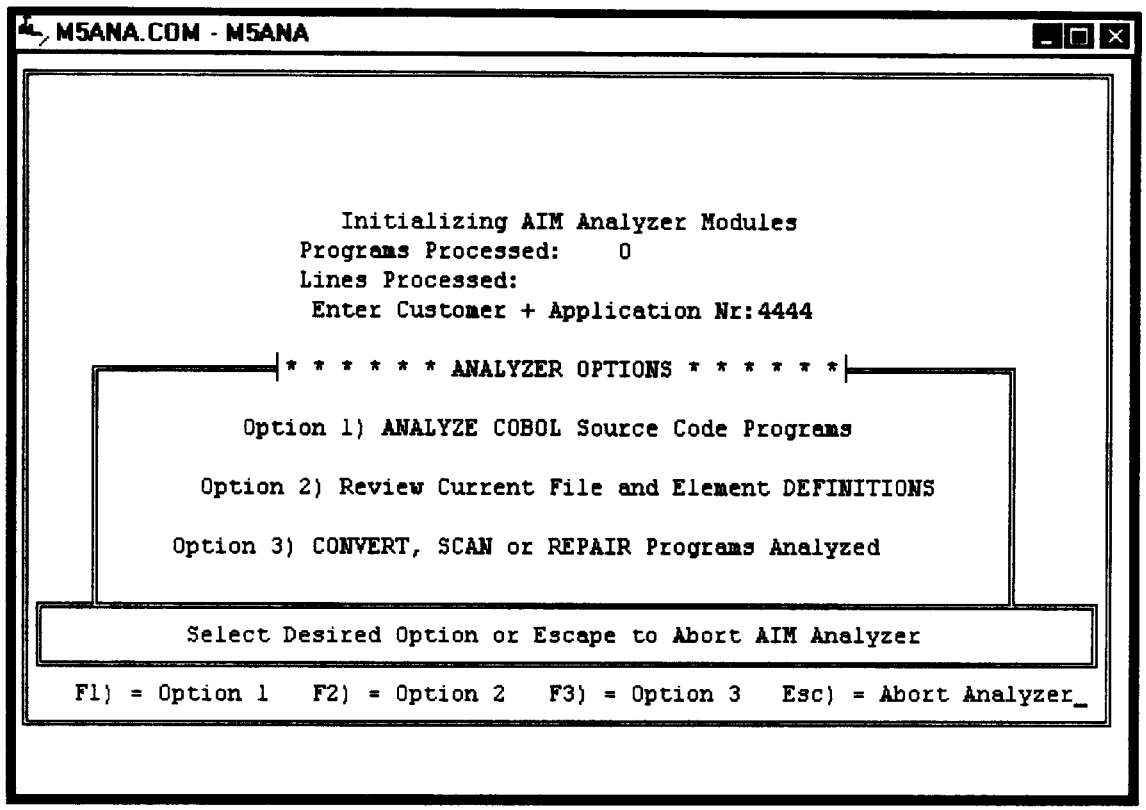
FIGS. 8A through 8Z are selected user screens for the Analyzer option.
Figure 8B:
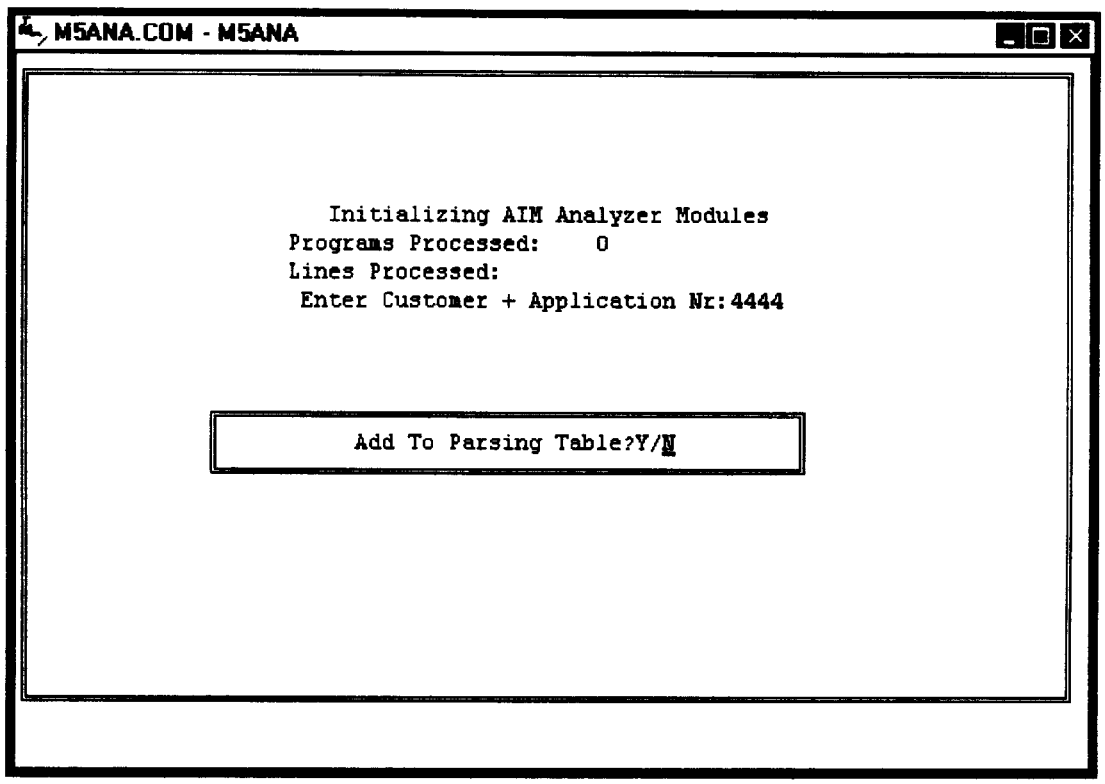
Figure 8C:
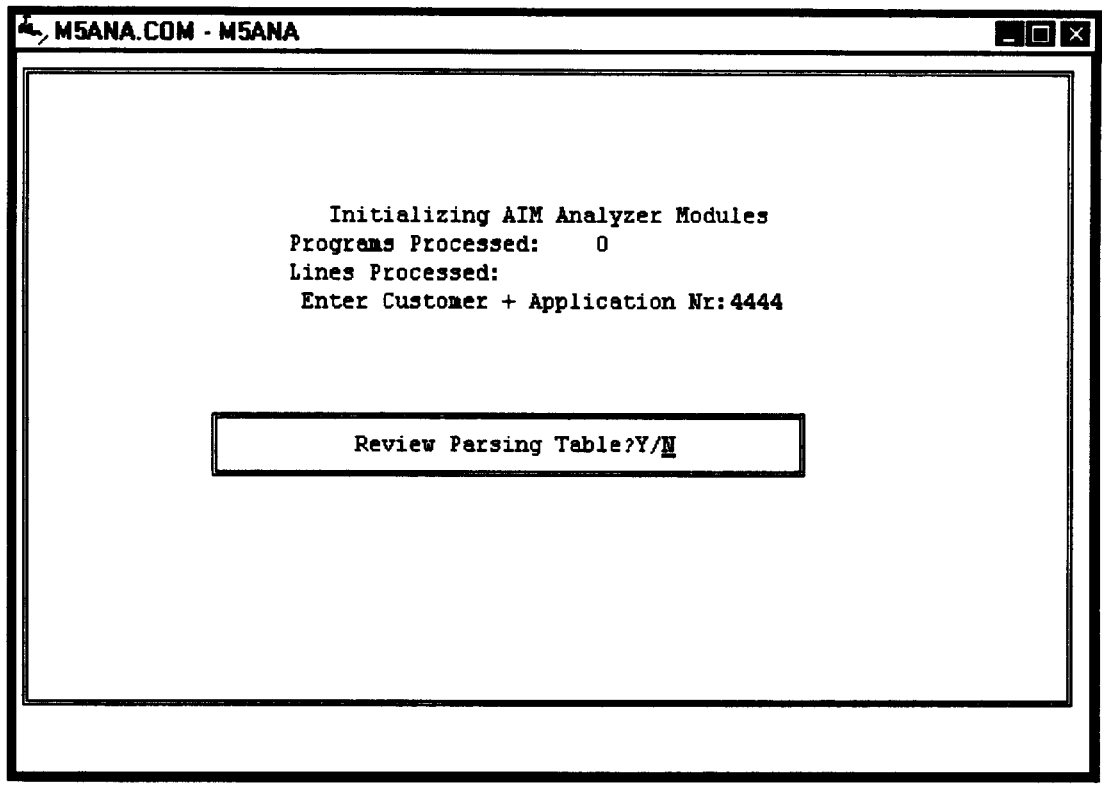
Figure 8D:
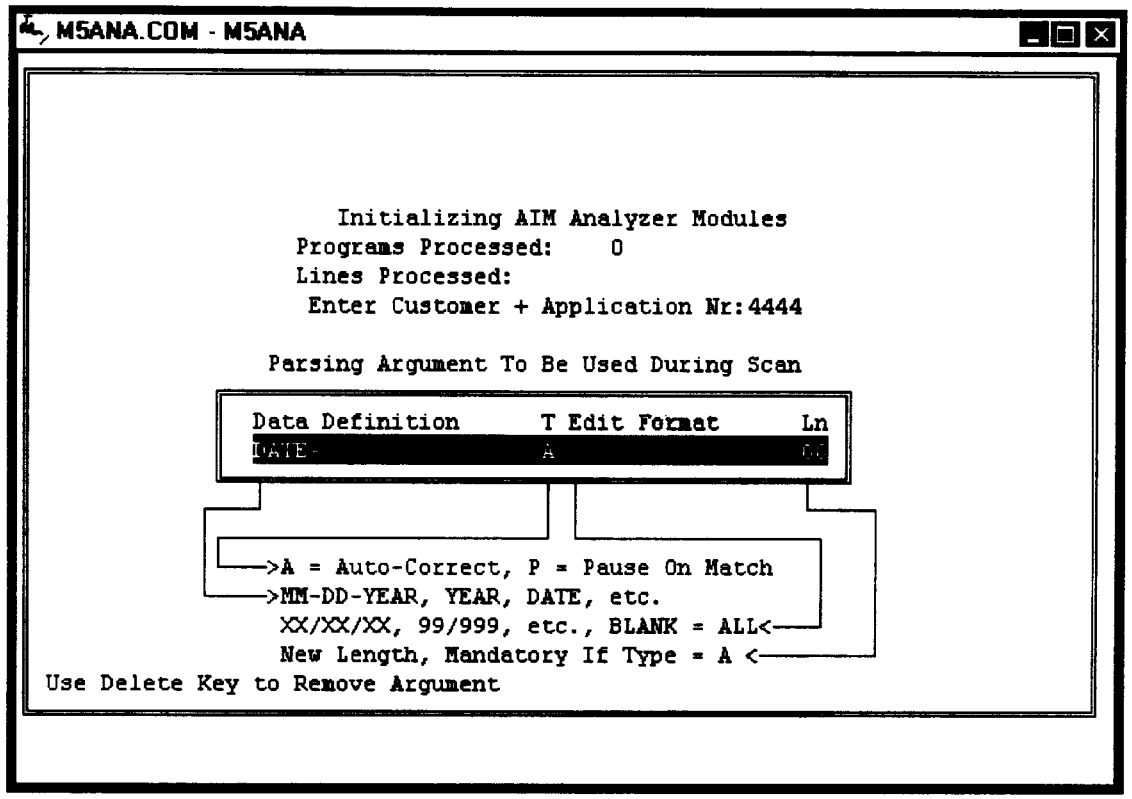
Figure 8E:
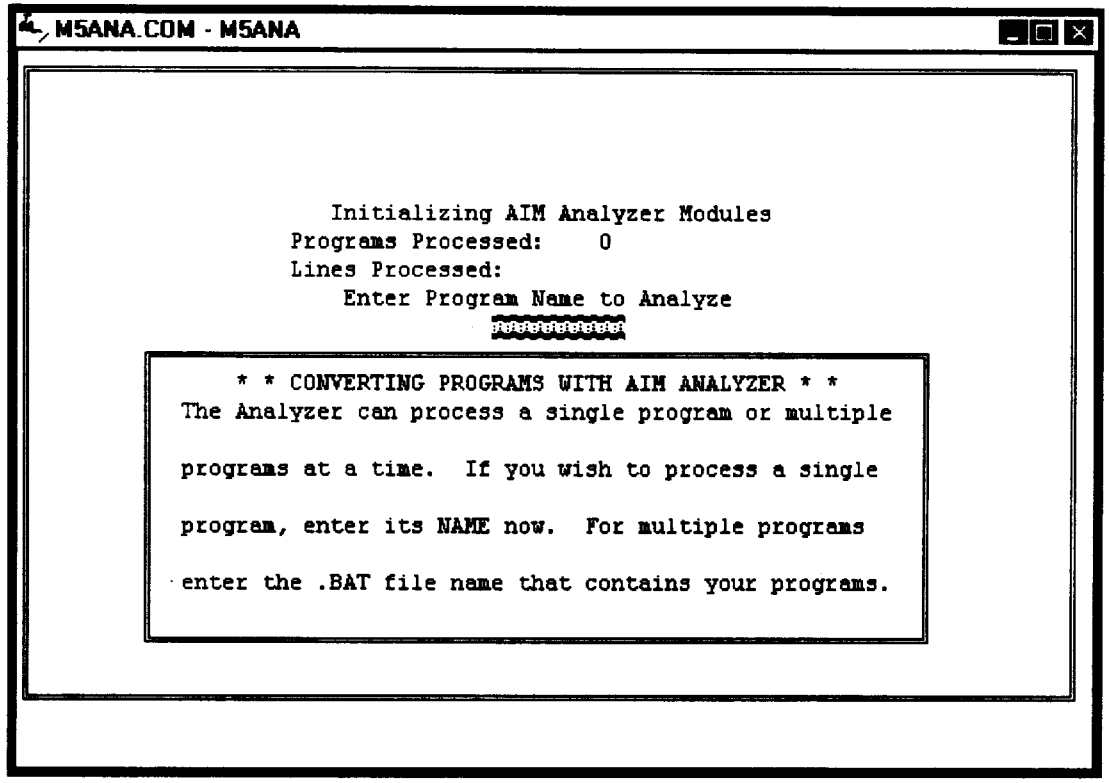
Figure 8F:
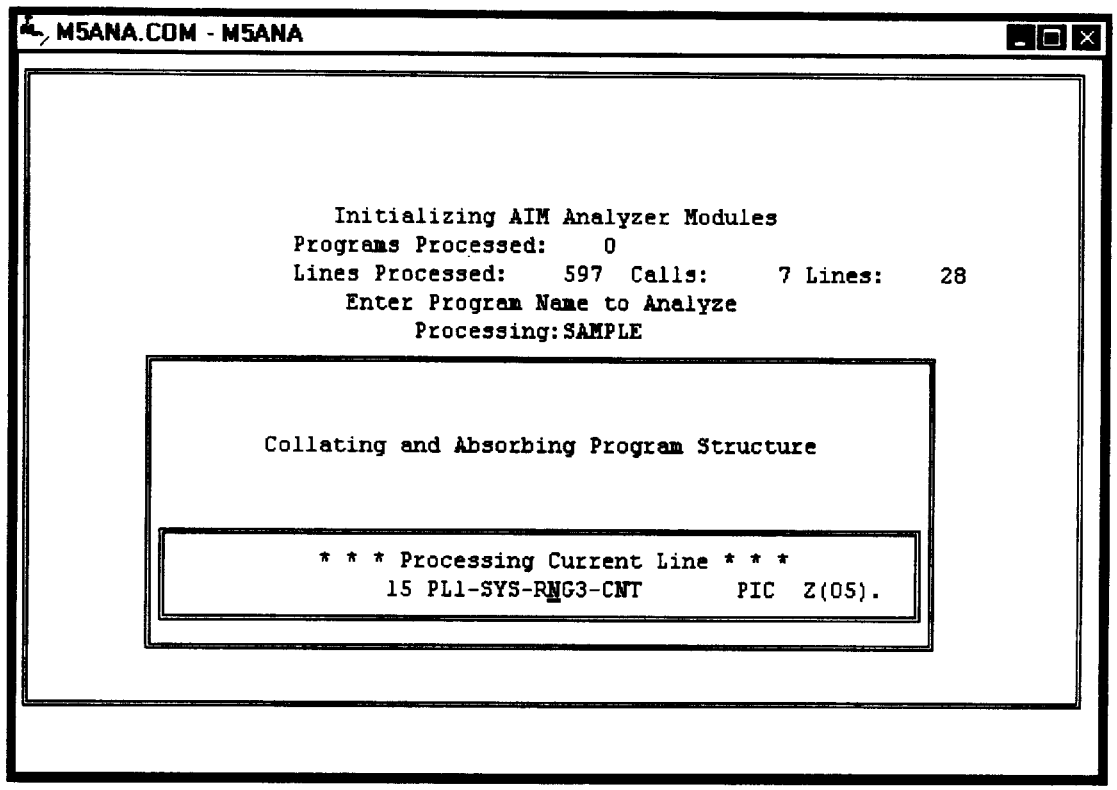
Figure 8G:
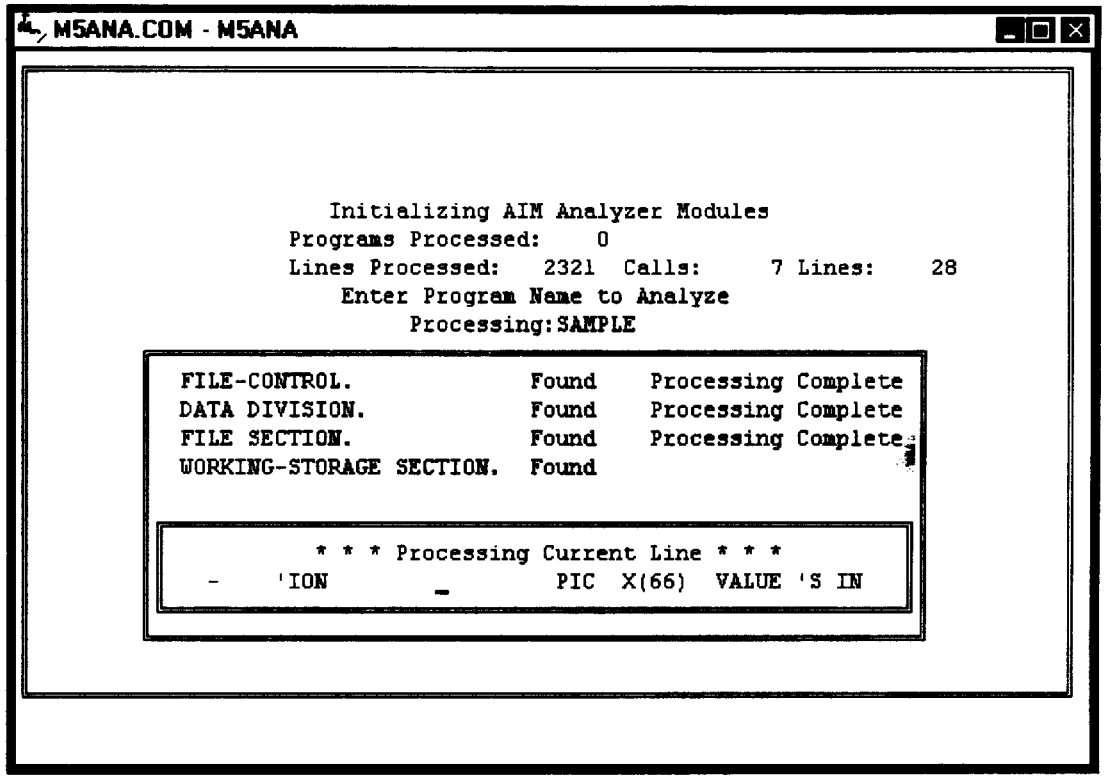
Figure 8H:
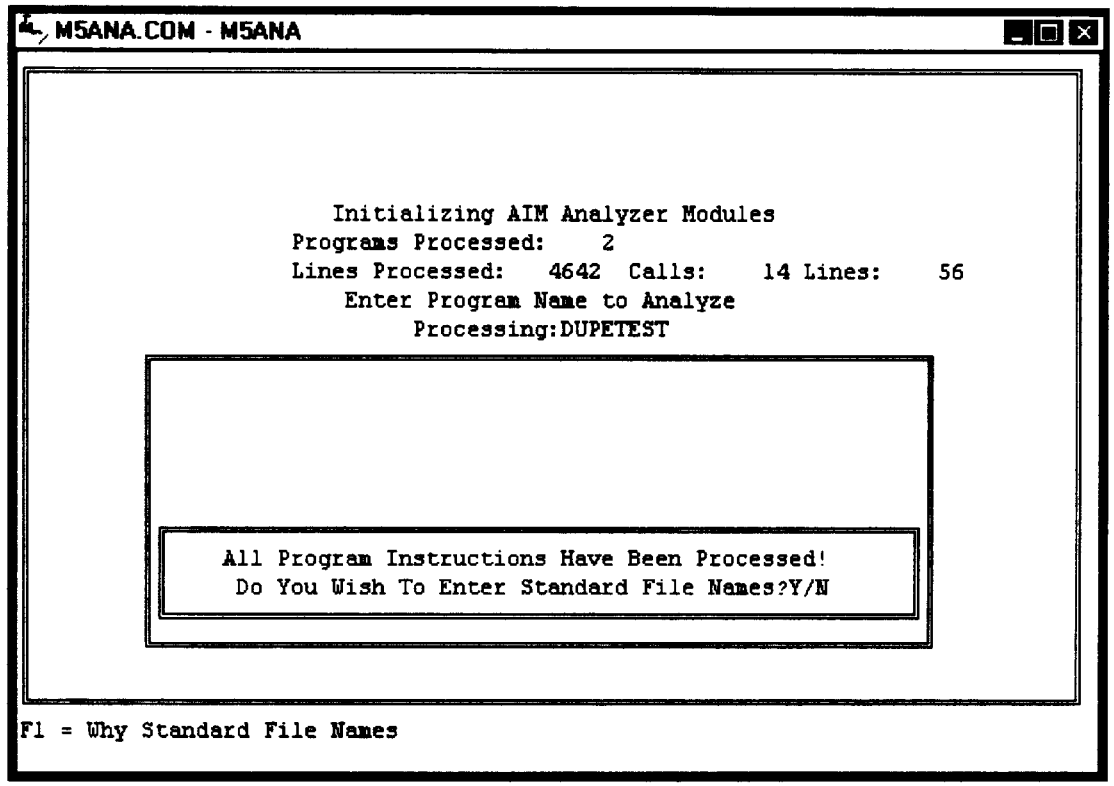
Figure 81:
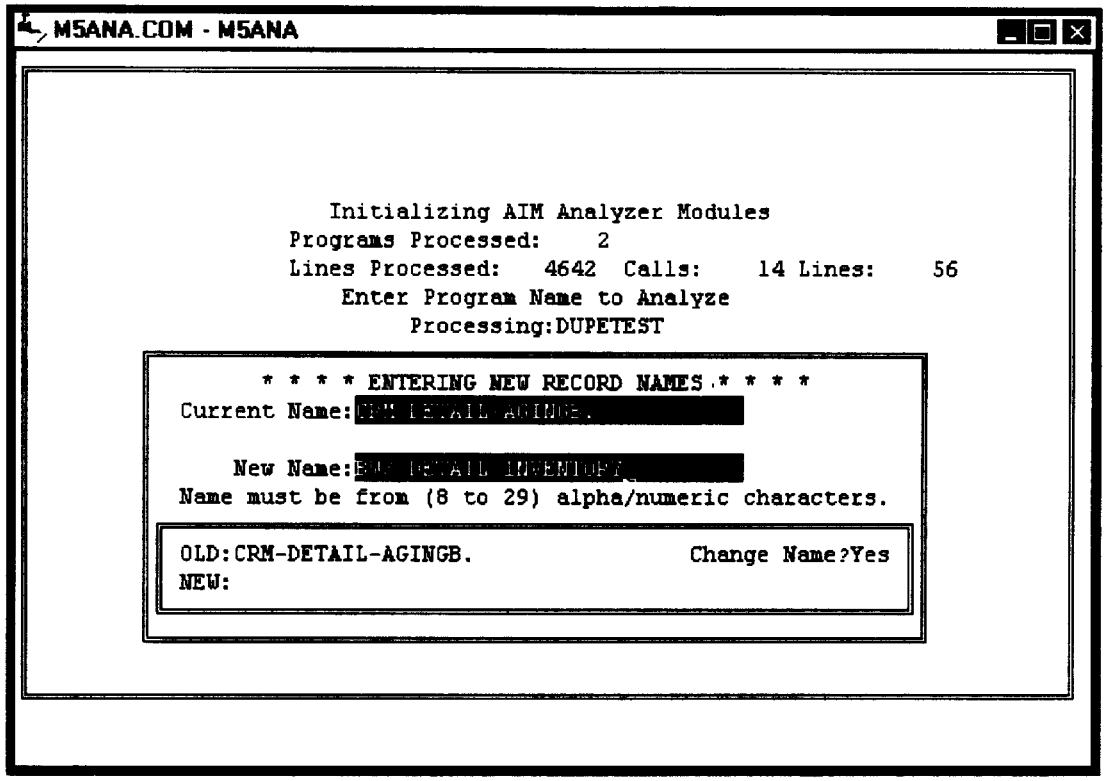
Figure 8J:
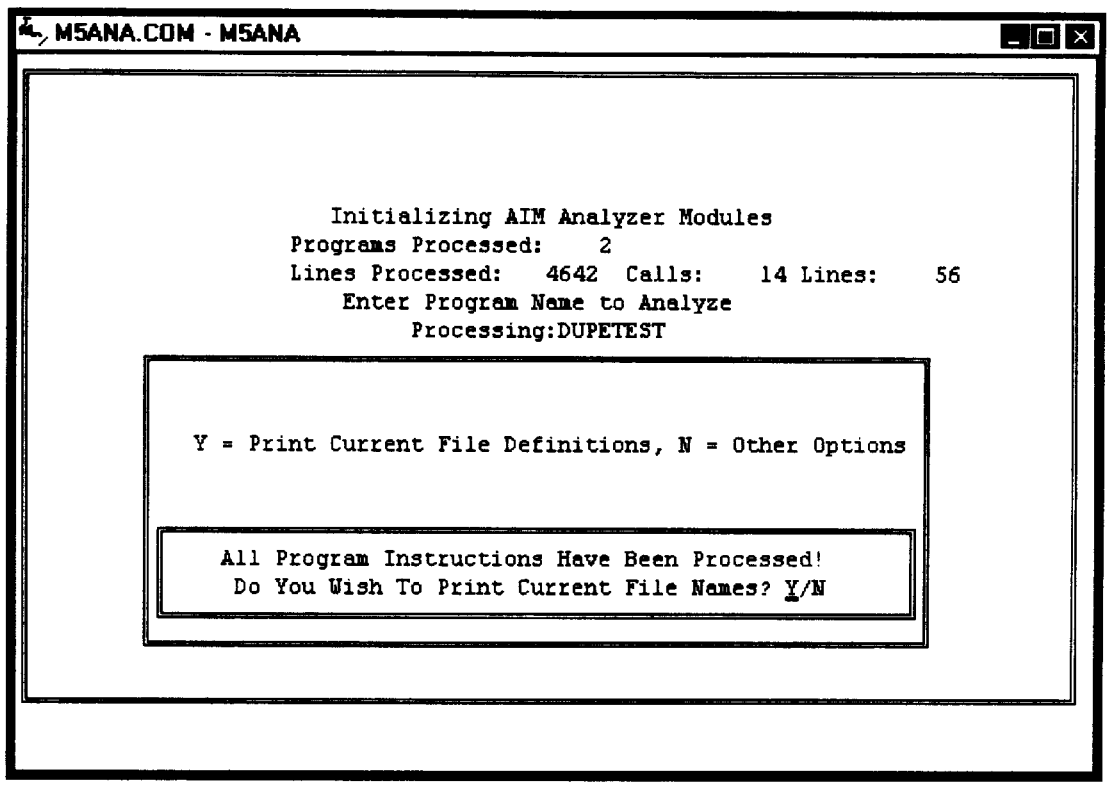
Figure 8K:
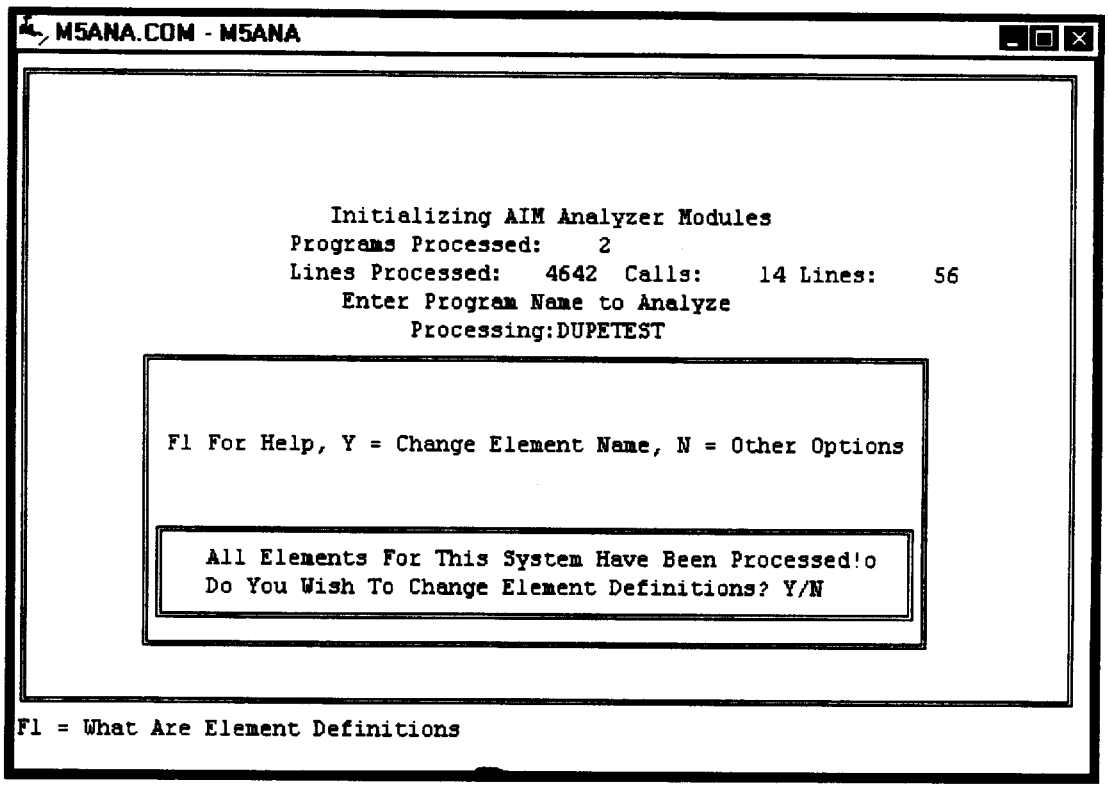
Figure 8L:
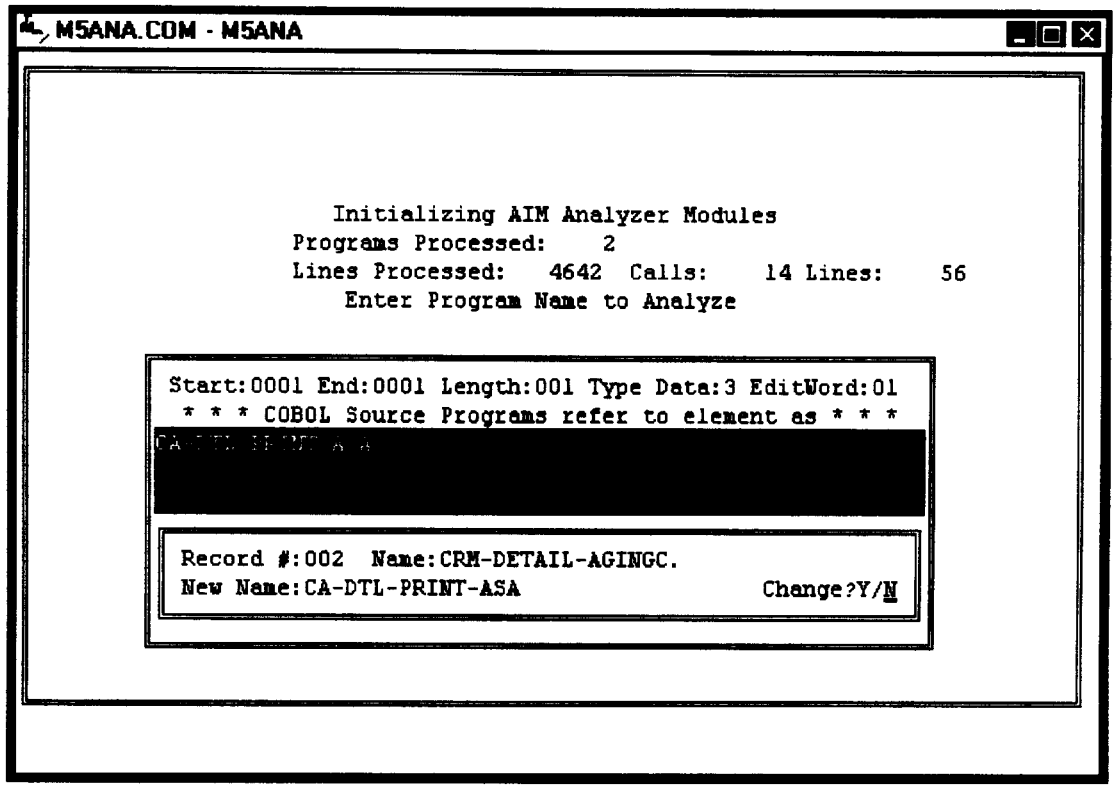
Figure 8M:
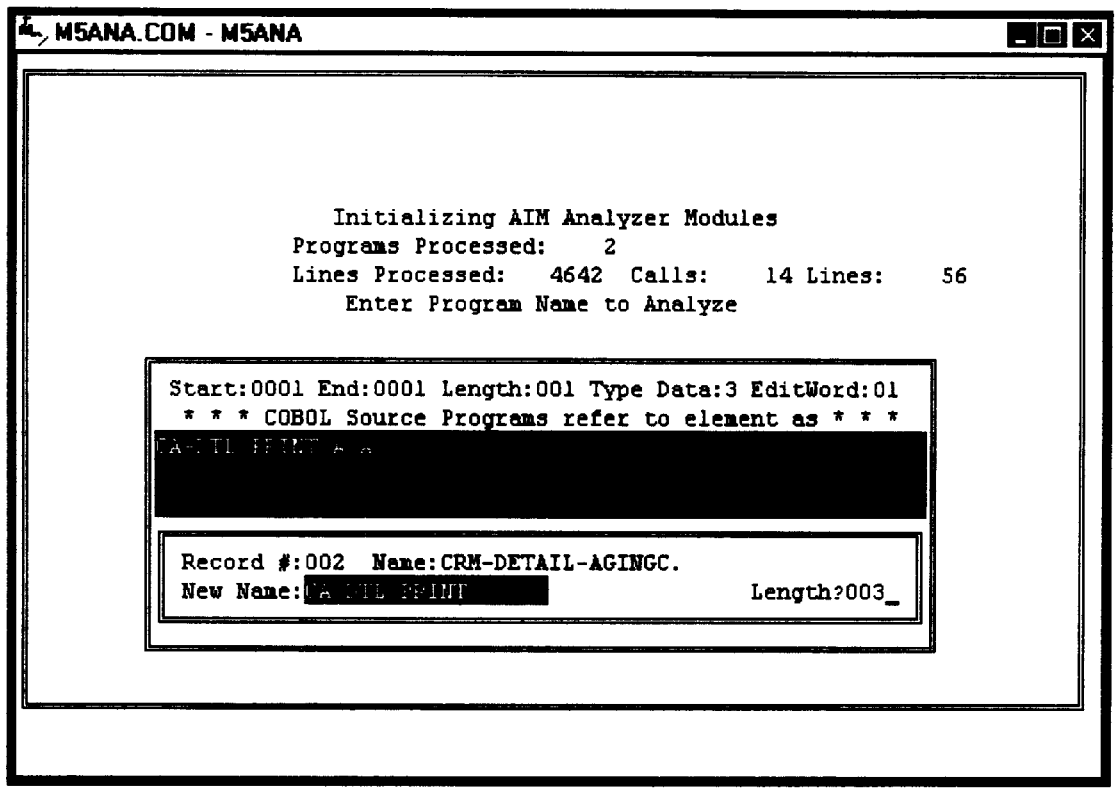
Figure 8N:
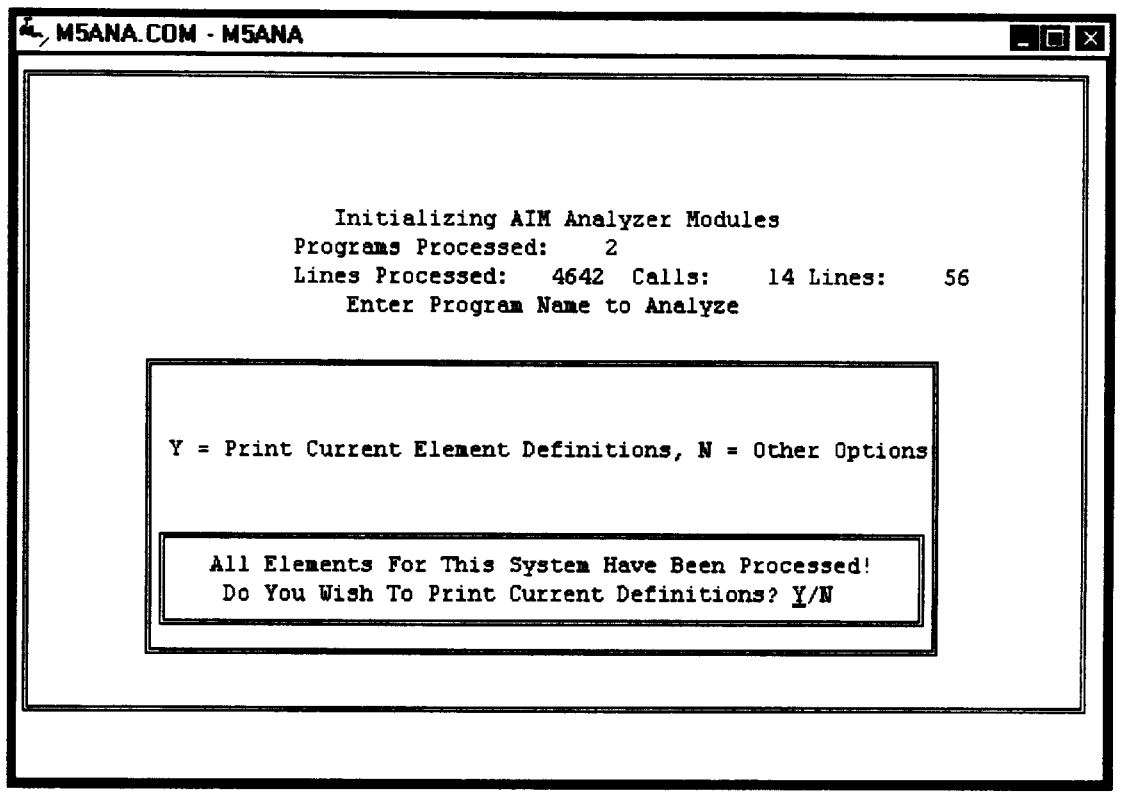
Figure 80:
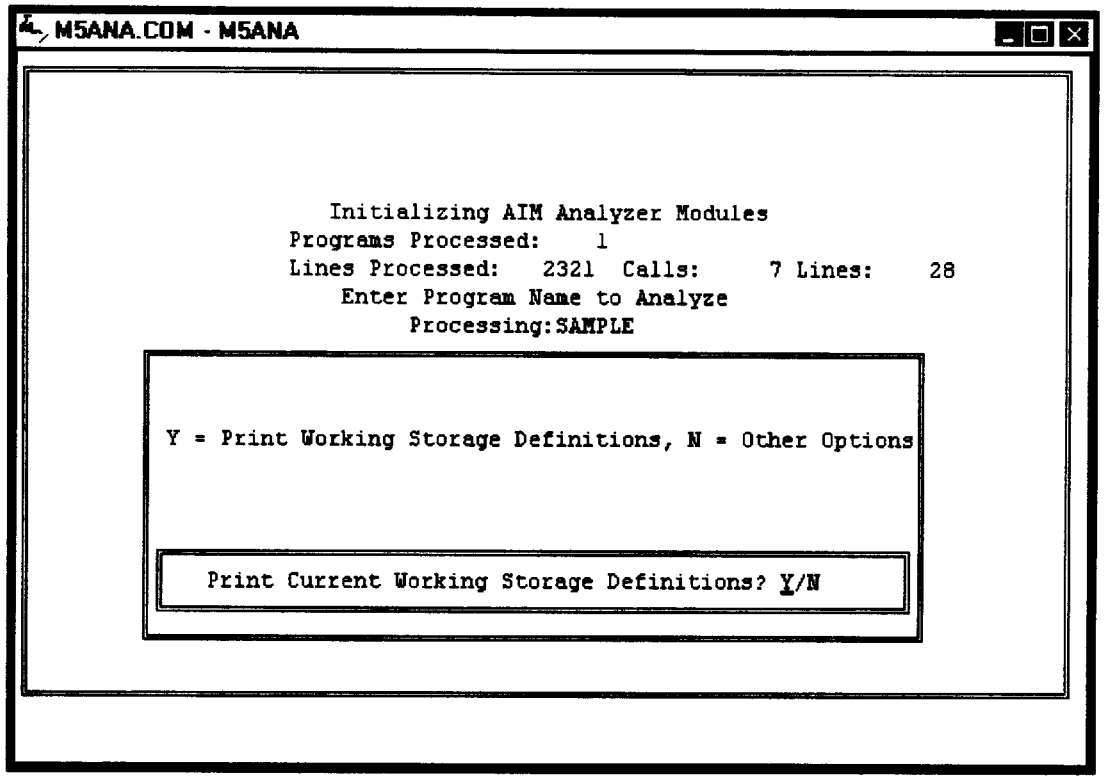
Figure 8P:
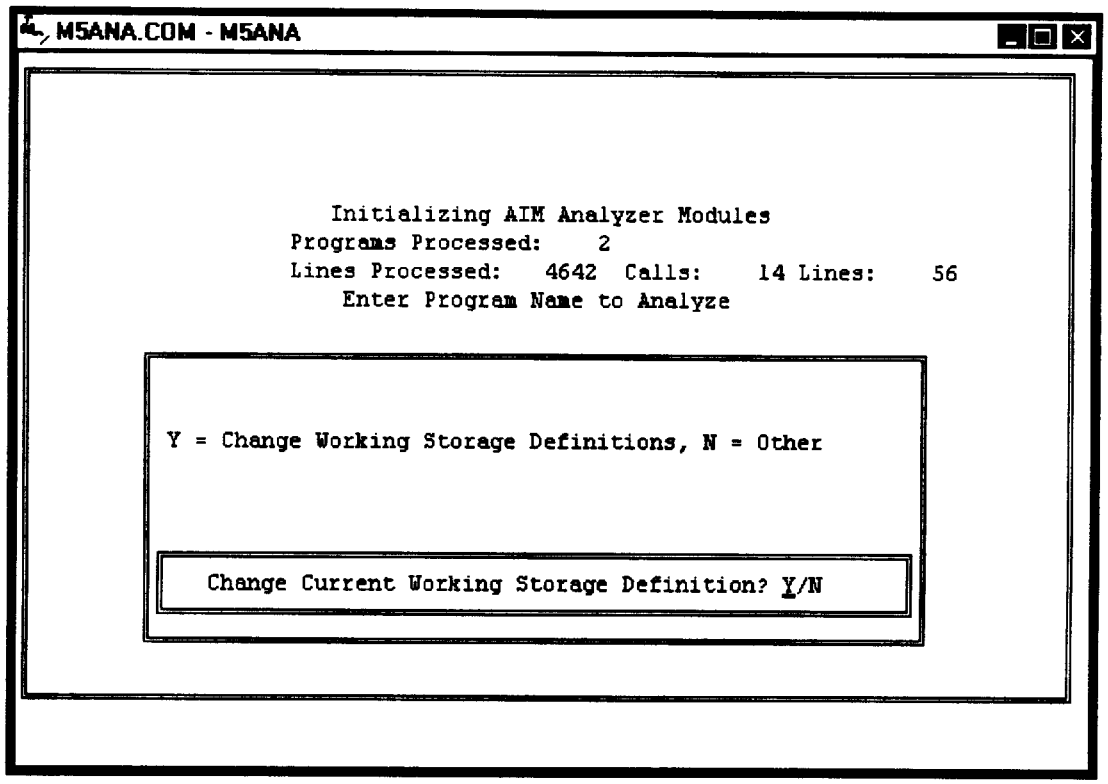
Figure 8Q:
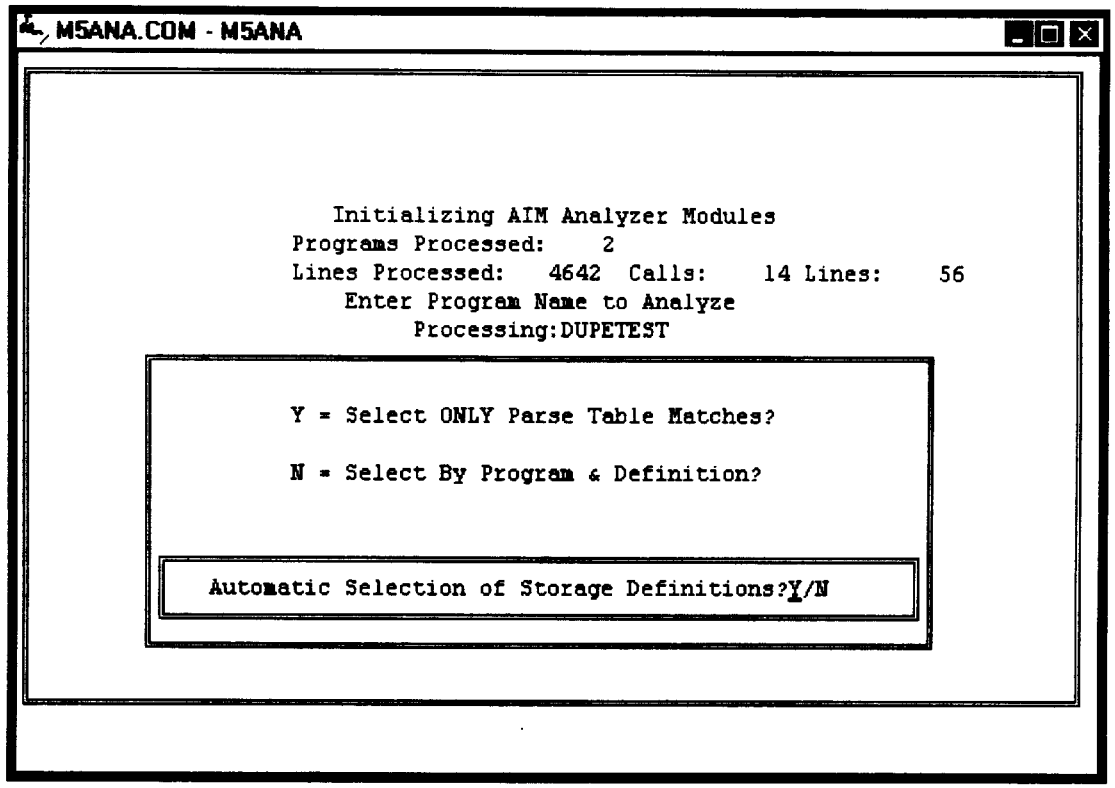
Figure 8R:
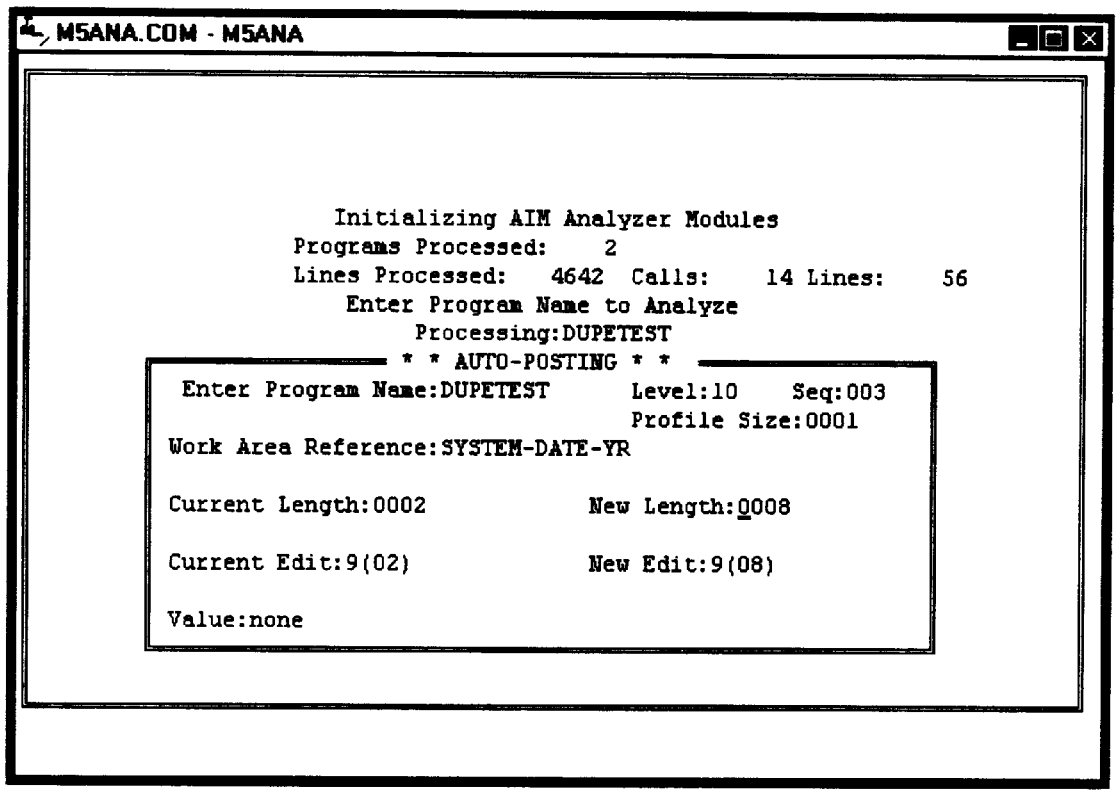
Figure 8S:
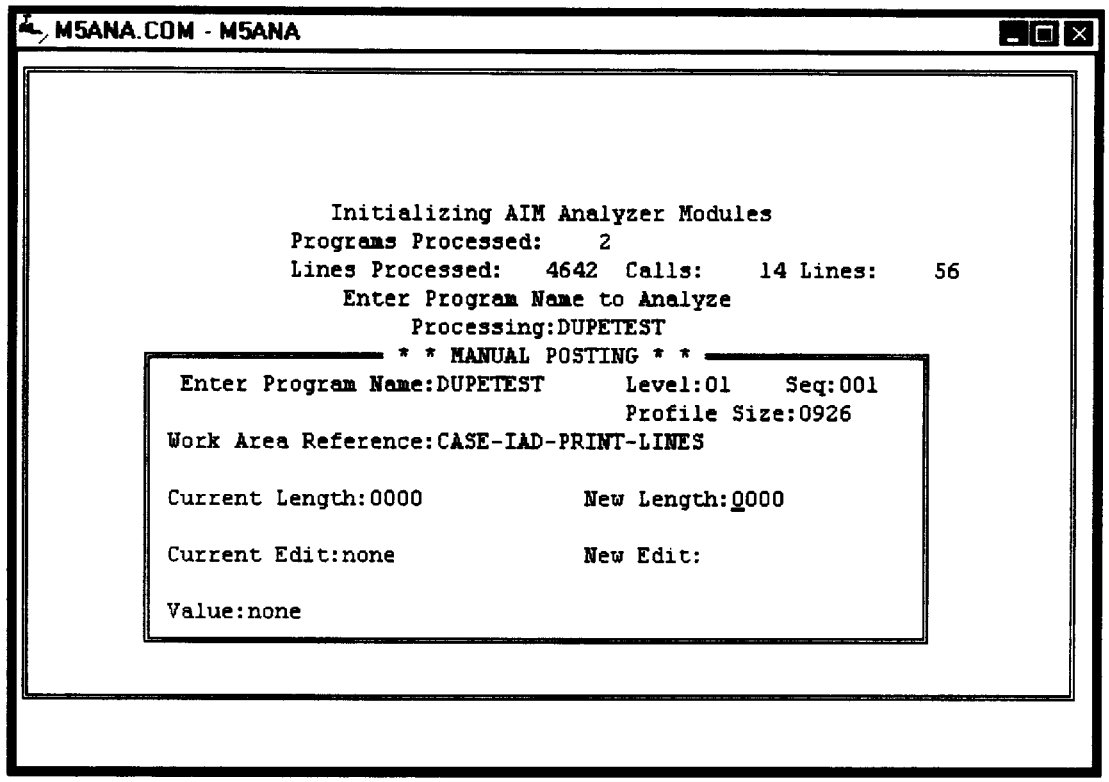
Figure 8T:
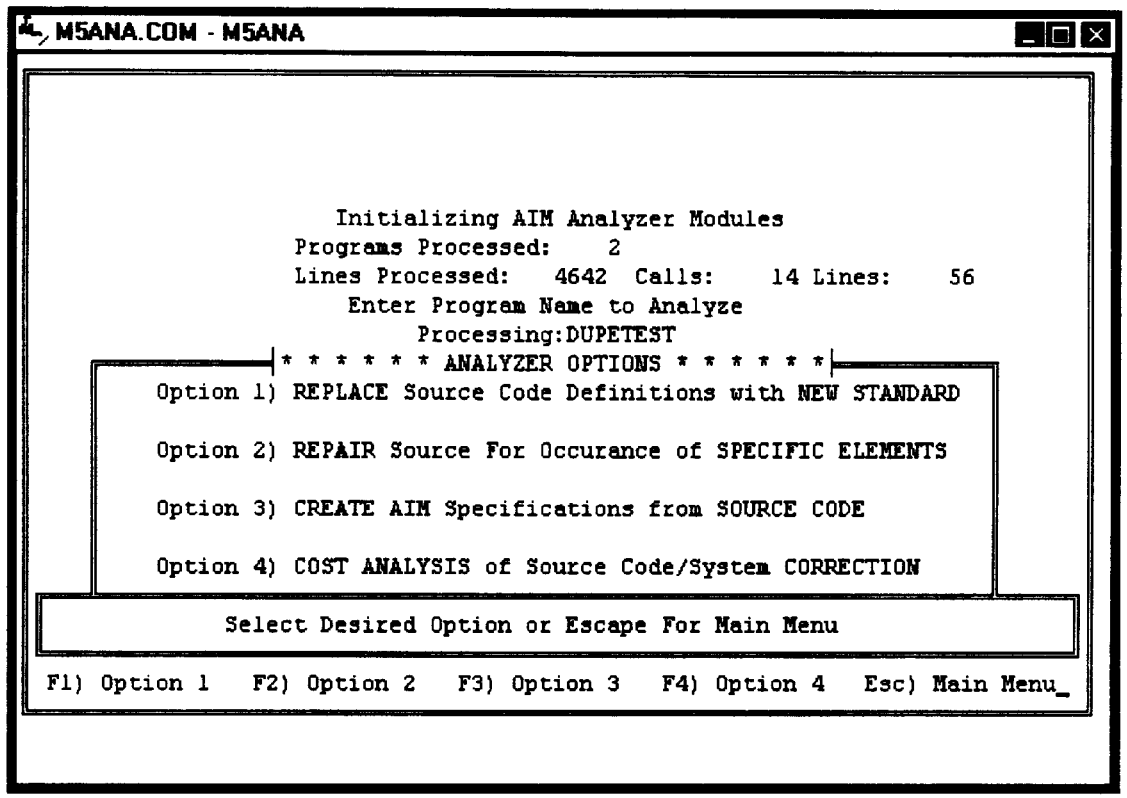
Figure 8U:
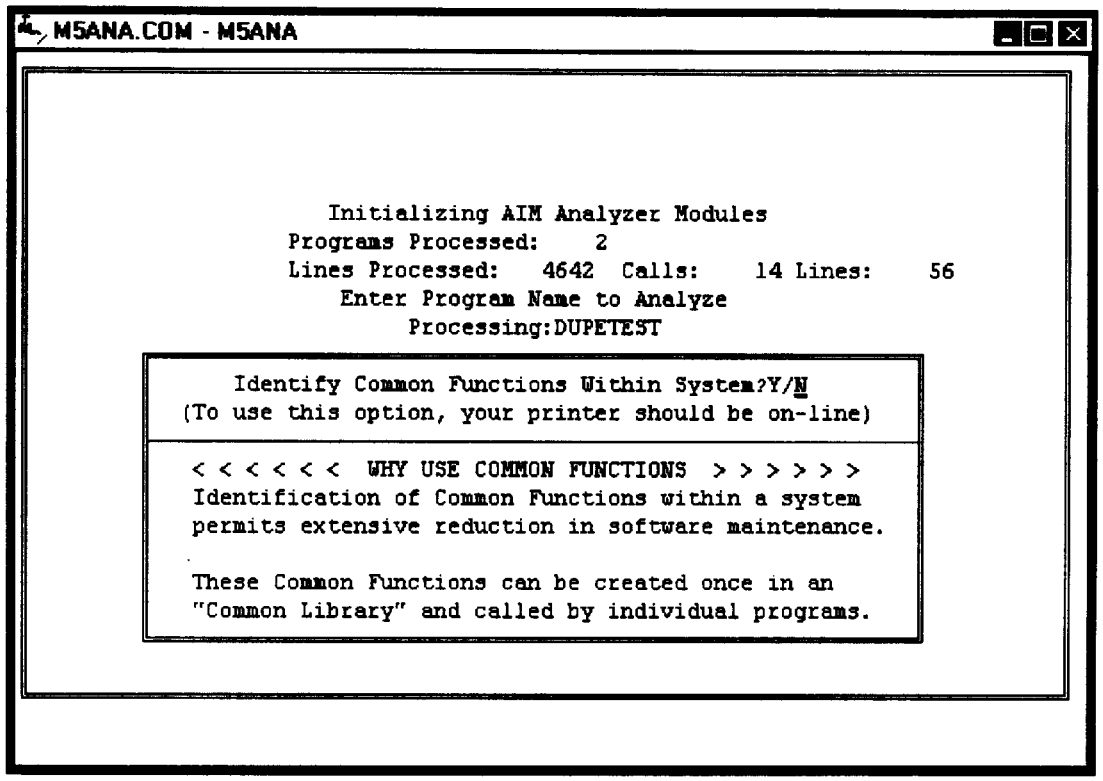
Figure 8V:
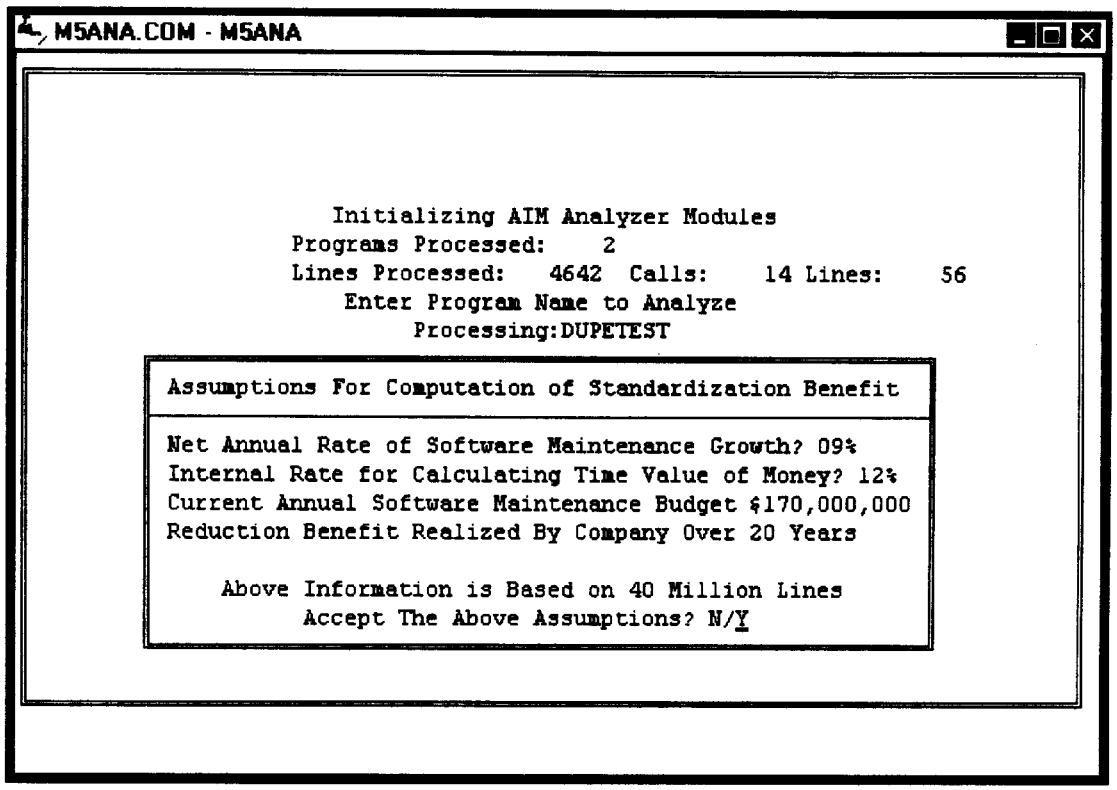
Figure 8W:
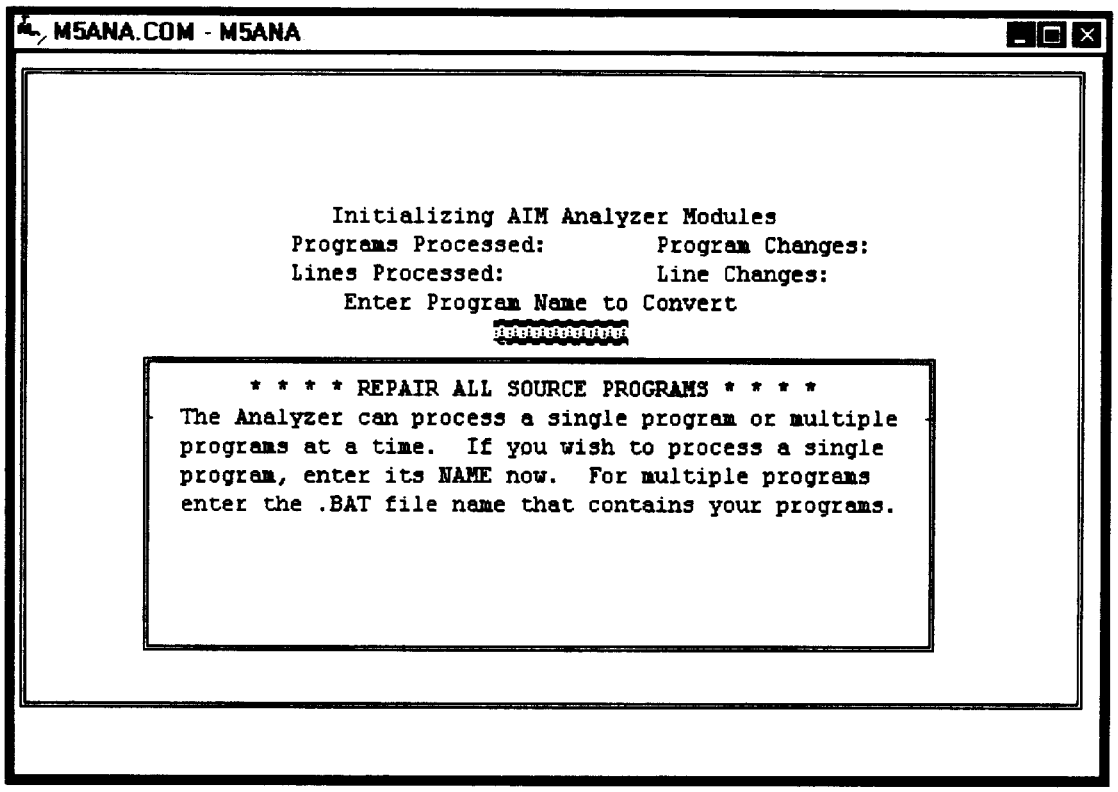
Figure 8X:
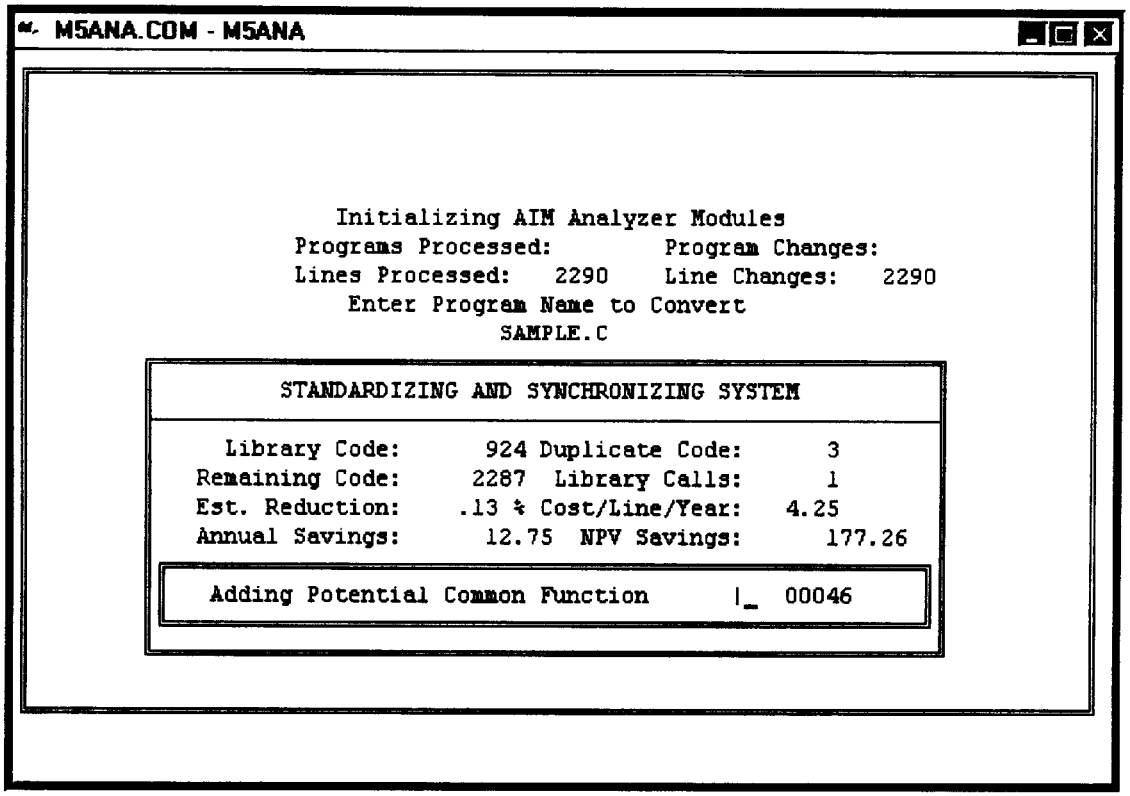
Figure 8Y:
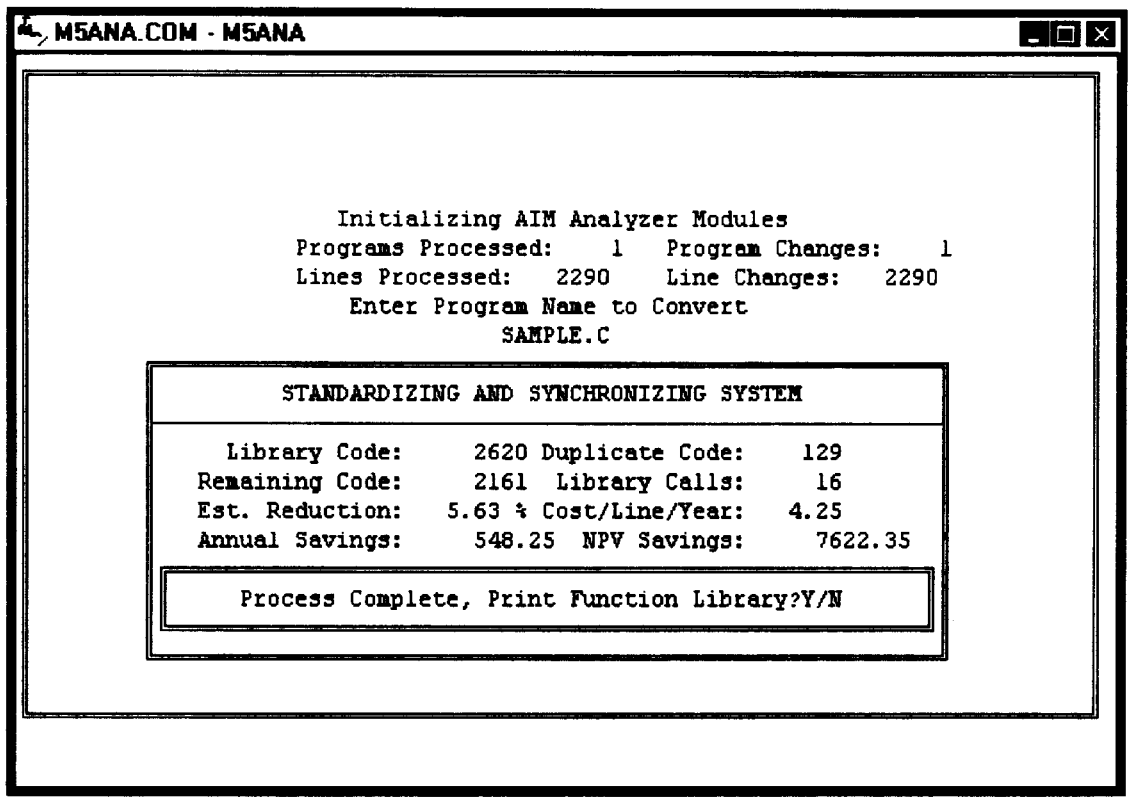
Figure 8Z:
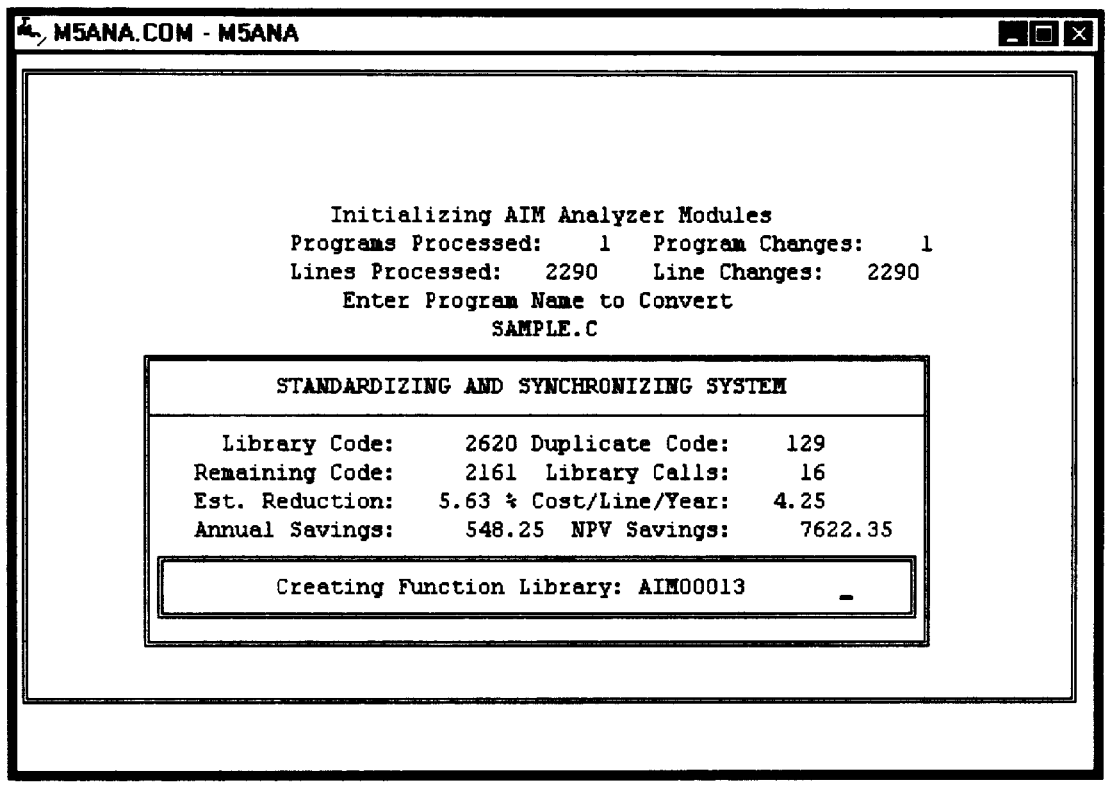

Having thus described the overview of the invention as set forth above, FIGS. 8A through 8Z illustrate by way of selective menus the operating sequence in more detail.

FIG. 8A shows the initial function screen presented to the user. The user is provided with three initial options. In Option (1), the user may select the Source Code Program analysis function. In Option (2), the user may select a review of current File and Element Definitions. In Option (3), the user may Convert, Scan or Repair Programs which have not previously been analyzed.

On selection of Option (1), the user is presented with the screen set forth in FIG. 8B and requested to enter Customer/Application Data in the form of a number (this number is an arbitrary 4 digit number the first two digits representing a customer number and the last two representing the number of the specific group of applications source code to be processed for that customer) The user is also prompted to select whether or not to add search information to a Parsing Table. This could be information regarding a name, or part of a name, or any other data which the system is to present to the user for an examination of its attributes. For example, the user could request the system to find every data element which contains in whole or in part the letters "DATE" and to store the same in the Element Cross Reference File. This would permit the user to examine the date length of each such field and to permit change from a six byte field to an eight byte field, if necessary to accommodate the year 2000. Alternatively, the user may let the system seek out and examine every data element for inclusion in the Element Cross Reference File automatically as described above. On selection of the Parsing Table addition option, the user is prompted by the screen of FIG. 8C to enter Parsing Arguments to be used during the scan process. In the example screen of FIG. 8D, the data element in the parse table is the term DATE-. The resulting Element Cross Reference File will contain every data field with the term DATE- in its name. If left blank every data field will be placed in the Data Element Cross Reference File. In addition, the letter A indicates that an Auto-Correct Parsing Type for the date is to take place although the option to cause the system to Pause on Match is also available (Parsing Type "P"). If the system Pauses on match, the User may manually make the correction, in this case a length correction, or continue. In the case of Auto-Correct as is indicated in FIG. 8D, the new length is mandatory and is automatically entered. In this case, the length is set to 08 characters, which accommodates the entry of years through the year 9999, which obviously, permits correction of the millennium problem of concern at the present time.

The user is then prompted by screen of FIG. 8E to enter either the name of a single program or a .BAT file or batch file containing the names of multiple related programs for processing by the system. On selection of the program or the programs, Phase I as described above commences and the user is continually advised of the status of the program by a status screen as shown in FIG. 8F. The status screen, includes information which identifies the current program being processed and shows the historical data being collected by the system such as Programs Processed, Lines Processed, the number of Calls established and the number of lines called. FIG. 8G shows the same processing screen at an intermediate stage of processing and identifies the various sections of the program being processed. Some of these include FILE-CONTROL, DATA DIVISION, FILE SECTION AND WORKING-STORAGE SECTION.

In FIG. 8H, the user is given the option to Enter Standard File Names. The help function under F1 advises the user that Standard File Names are important because the source code allows logical referencing of any file by any name. Therefore, the same file may be accessed in different programs in the same group by different logical names. This step permits the correction of the name to a uniform name in a manner similar to that provided for in data element names which eliminates confusion where maintenance is required.

On an affirmative selection the user is provided with a data entry screen 81 to select a new name. In the current example, the name CRM-DETAIL-AGINGB has been changed to BWS-DETAIL-INVENTORY. It may be that the logical file name CRM-DETAIL-AGINGB actually an inventory file with inventory age information. The change helps avoid the misconception by maintenance programmers that it is related to accounts receivable.

After selection of the logical file names, the system scans the source code files and restructures each instruction into a standard syntax and stores the restructured interim source code in virtual memory. (steps 201 and 202 of FIG. 3.)

FIG. 8J illustrates the screen provided to the user on completion of the system analysis to prompt for the option to select Y or N as an option for printing the Element Where Used Report (step 108 of FIG. 2B) after change of the various names and elements.

On selection of the printing of the Element Where Used Report, the system prompts the user for a Change Element Definitions selection, FIG. 8K. A help screen is provided defining Element Definitions for the user. These consist as noted above of Name, length, and Type and in the case of workspace allocations, Format.

In this example, the user has been shown a data element "CA-DTL-PRINT-ASA" in the highlighted portion of the screen as shown in FIG. 8L. This data element name was found in file CRM-DETAIL-AGINGC. The user is prompted to indicate whether change of the name is desired or not. In this example, N for no was selected. In FIG. 8M, the screen shows that the name has been changed to CA-DTL-PRINT and the user is prompted for a length change of the same element. In this example, when the new name is entered, and the length is entered, the system then processes the changes and prompts the user for a print of the Where Used Report for the current Definitions, FIG. 8N. This is confirmed by the screen shown in FIG. 8N and the user is prompted again for a print of current definitions, i.e. an updated Where Used Report.

FIG. 8O, prompts the user for a selection of printout of working storage definitions. This is essentially another Where Used Report of working storage allocations and definitions. These include an identification of all of the common work areas according to physical size and value (i.e., profile). The user may decide to change or redefine any data definition and/or change the value and physical size of a specific work area. The report permits the user to evaluate what changes are required. On an affirmative selection, a Working Storage Definitions report is printed.

The user is then prompted to select whether a change in the working storage definitions is required, FIG. 8P. On an affirmative selection, the user is given the option to select only Parsing Table matches (i.e., automatic changes on match) or by Program & Definition (manually step by step), FIG. 8Q. On an affirmative selection, the system automatically selects storage definitions. The progress of changes is monitored in the screen of FIG. 8R which shows a new Length, 0008, and a new Edit, in this case 9(08). (In COBOL PL1 the 9 is a field type code, i.e., "numeric" for a numeric field length of 08 bytes. The system automatically changes all definitions which occupy the same physical location.

If the user selects the negative, the system will provide a prompt for each definition where the user enters Program and Definition information which requires the user to enter the change information during the run. FIG. 8S illustrates the user screen with new length information entered and new edit information awaiting entry.

On completion of all Phase II changes, the user is prompted for additional options as shown in FIG. 8T. These are:

1. REPLACE Source Code Definitions with NEW STANDARD
2. REPAIR Source For Occurrence of SPECIFIC ELEMENTS
3. CREATE AIM Specifications from SOURCE CODE
4. COST ANALYSIS of Source Code/System CORRECTION The user may escape to the main menu FIG. 8A or continue with one of the above options of FIG. 8T. At this point in the example, The source code has been processed through Phase I and Phase II. On selection of Option 1, the system enters Phase III and the user is prompted by the screen in FIG. 8U as to whether or not common functions are to be identified. The user is then presented with the screen of FIG. 8V to display the standardization default parameter used to calculate the benefit derived from the Optimization process. The screen of 8V allows the user to modify the default assumptions, before computation of the benefit. On an affirmative selection, the user is presented with the screen of FIG. 8W to indicate which programs are to be repaired and Phase III, Phase IV and Phase V are completed. The user is presented a status screen as shown in FIG. 8X which shows the system adding the common functions as described in the overview above. FIG. 8Y displays to the user that the common function building process is completed and provides the user an option to print the completed library. The user is advised by the screen of FIG. 8Z that the system is creating the function library. That is, saving all common functions to the system library.

Figure 19:
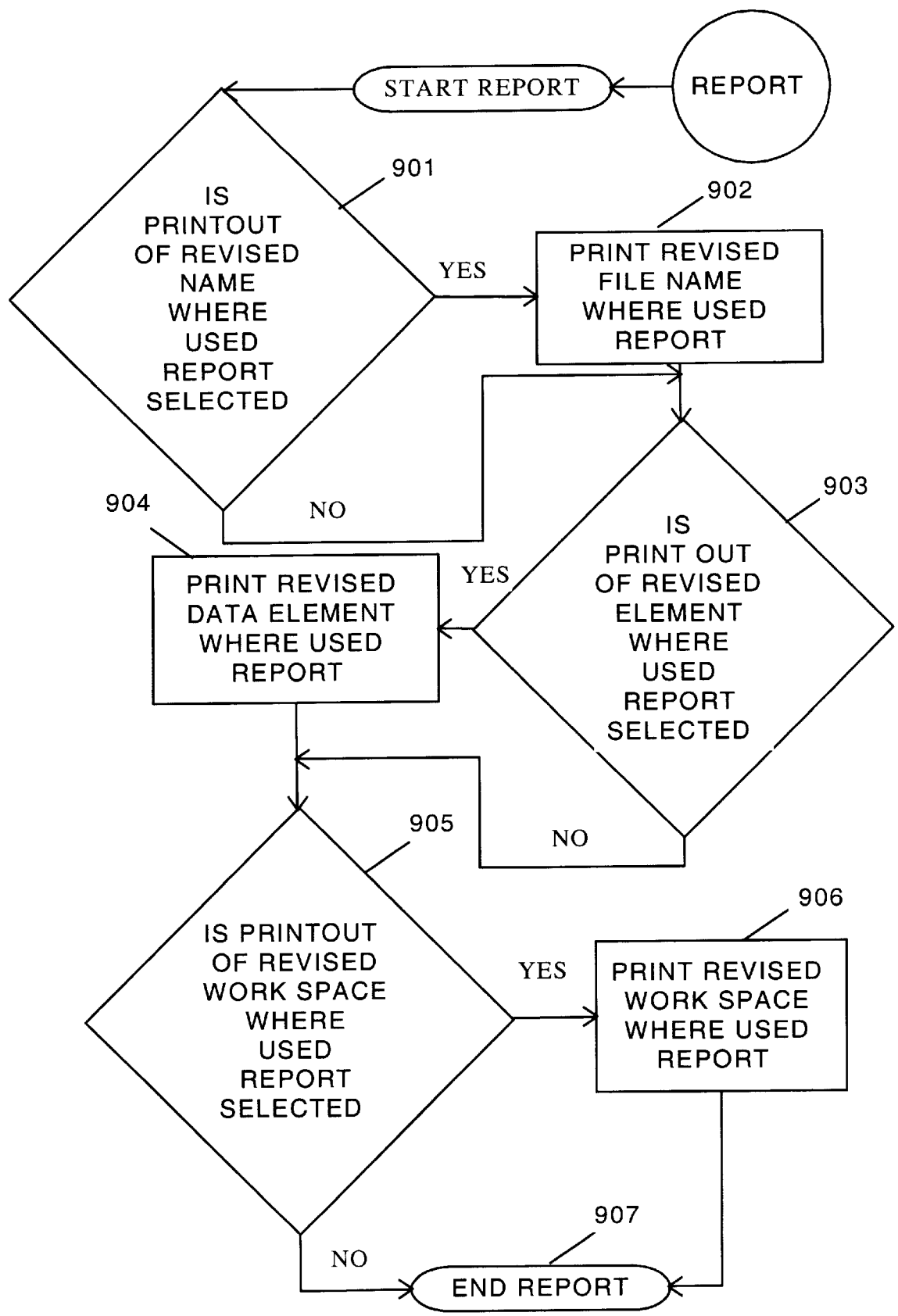
FIG. 19 is a flow chart of the print report option.

Other options are available as indicated in FIG. 8A these include a Review of Current File and Element Definitions (Option 2) which is essentially a printout of the various Where Used Report information as shown in FIG. 19.

In addition, in Option 3, a Convert, Scan or Repair Programs Analyzed Option is available. That is without entering the Analyzer process (Phase 1 through V) described above the user may directly access the program code in any of the program files and perform certain changes. Selection of this option places the user at the screen of FIG. 8T.

Figure 9A:
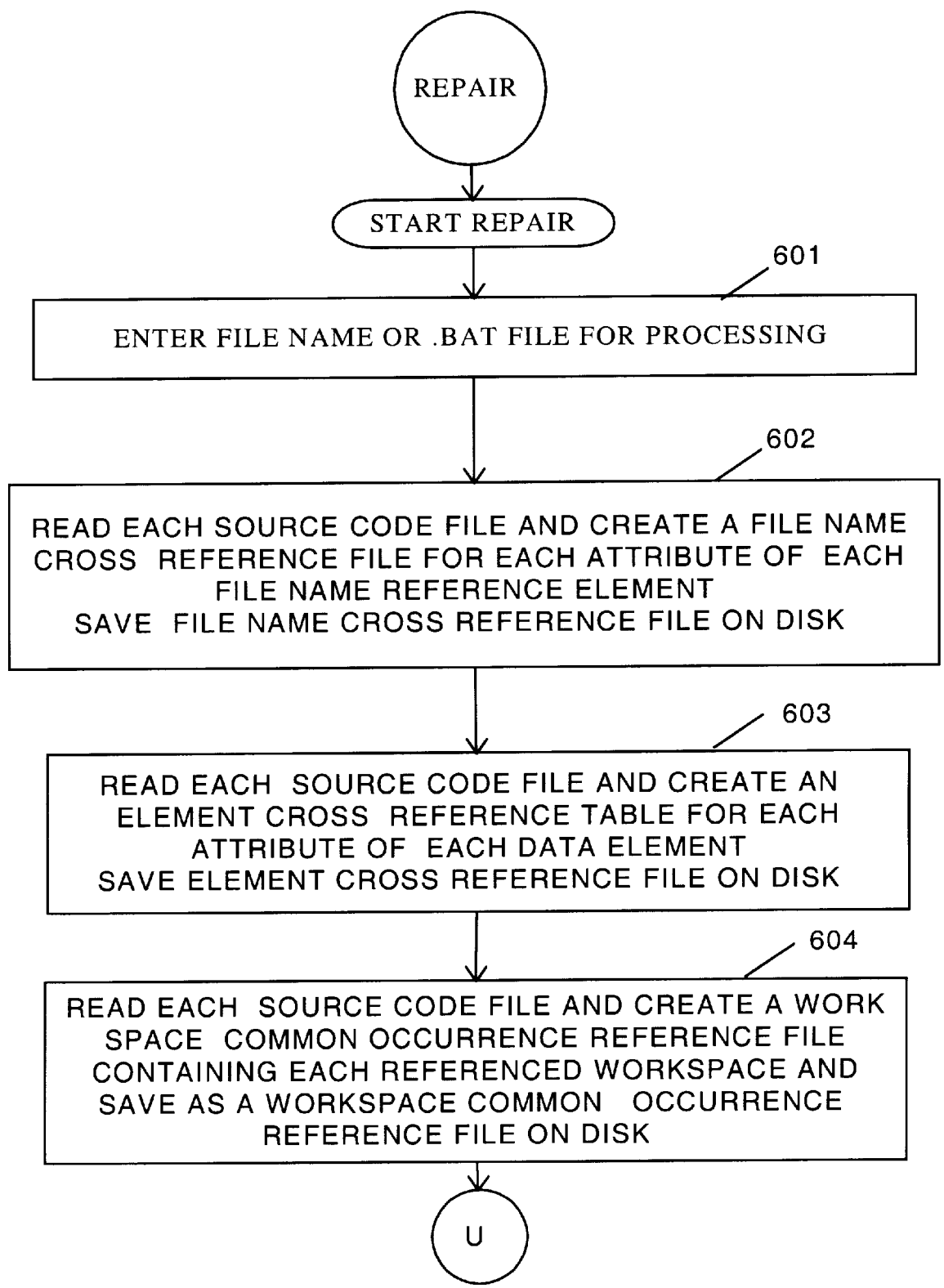

With reference to FIG. 9A, the user may initiate a Repair Option, step 600 by selecting Option 3 of the screen of FIG. 8A and commencing the Repair Function as shown in FIG. 9A. The user enters the file name or .BAT file containing all of the program files which are to be repaired, step 601, and the system commences reading the interim source code files, steps 602–604. Referring to FIG. 9A, the system reads the source code files and determines the logical file name used to access each file and creates a File Name Cross Reference File of logical names and related physical file names, step 602. The File Name Cross Reference File is stored on disk, step 602.

Each instruction in each source code file or module is again read from the interim source code files and its type determined. Those instructions which operate on a data element are analyzed and the data element identified. The name and other attributes of the data element are determined and an Element Cross Reference File containing each data element by name and its associated attributes is created, step 603. The Element Cross Reference File is stored on disk as in automatic processing:

Each instruction in each source code file or module is again read from the interim source code file and its type determined. Those instructions, which define work space allocations are analyzed and the work space identified. The workspace is analyzed by structure and a Work Space Common Occurrence File for workspace definitions is created, step 604. The Work Space Common Occurrence File contains the same information as in automatic processing.

The system provides for interactive communication with a user, who may indicate that a Where Used Report is or is not to be generated.

Figure 9B:
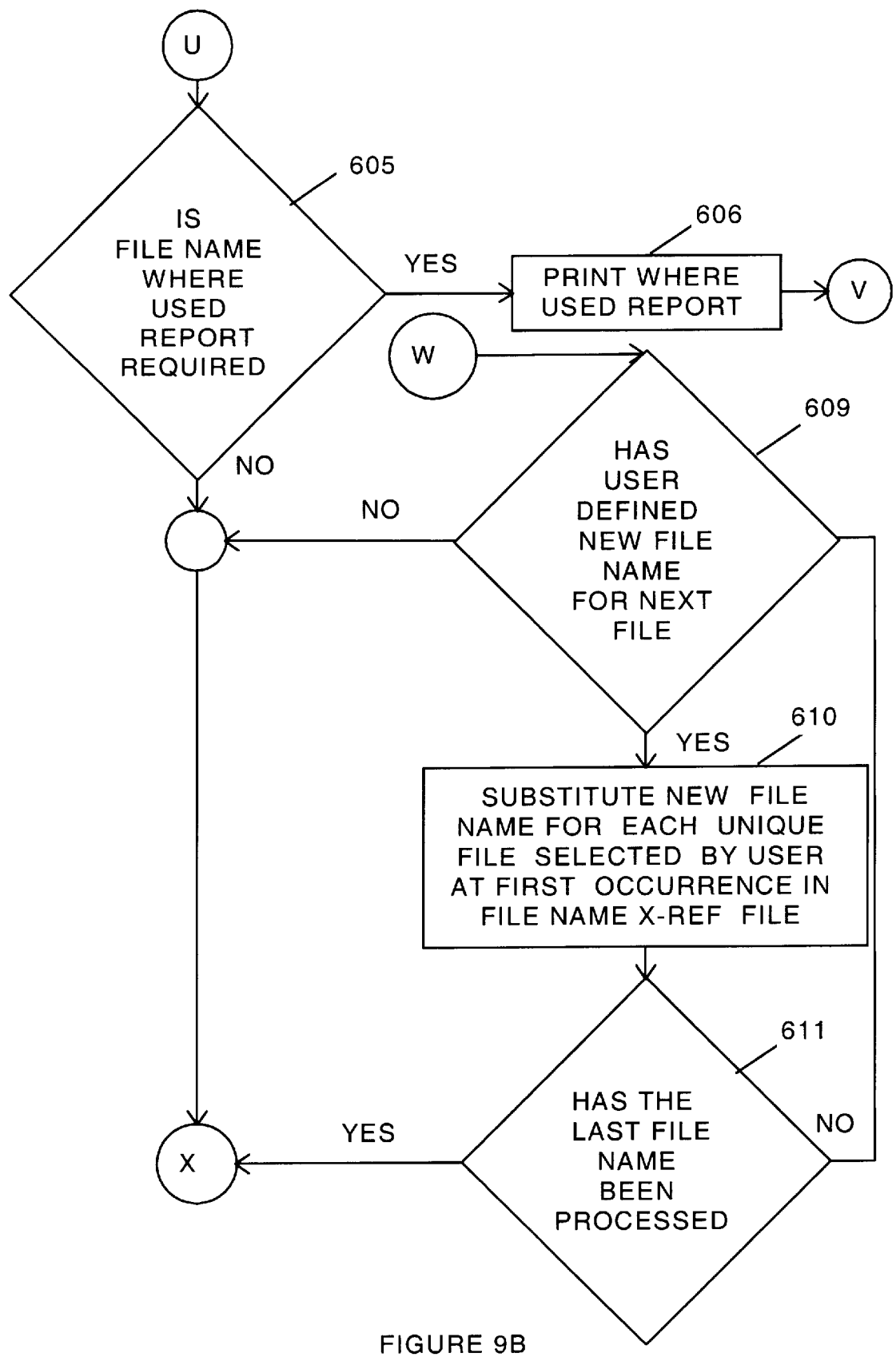

With reference to FIG. 9B, a File Where Used Report for logical file names, may be selected for display or print by the user. A File Where Used Report is a report of the contents of the File Name Cross Reference File with information sorted by physical location. This permits the user to evaluate which of the various logical file name references refer to the same physical file. If the user indicates that such a report is required, step 605, the system prints out a report, step 606. The user may then examine the report and define new logical names for selected physical files. On review of the File Name Where Used Report the user may enter search information in a Parse Table, FIG. 9C. If such information is entered, step 607, the system searches for files matching the Parse Table, step 608. The system does not search for files by name for those files which are not selected by the Parse Table. If the user defines a new logical name, step 609, the new name is substituted for the first occurrence of each unique file in the File Name Cross Reference File, step 610. Uniqueness is determined by the actual name of the file referred to by the logical file name. Multiple unique logical file names may be selected by the user for change and the user is given the opportunity to change the next physical file name step 611. On processing the last file name, the system goes to the next stage, step 611.

Figure 9D:
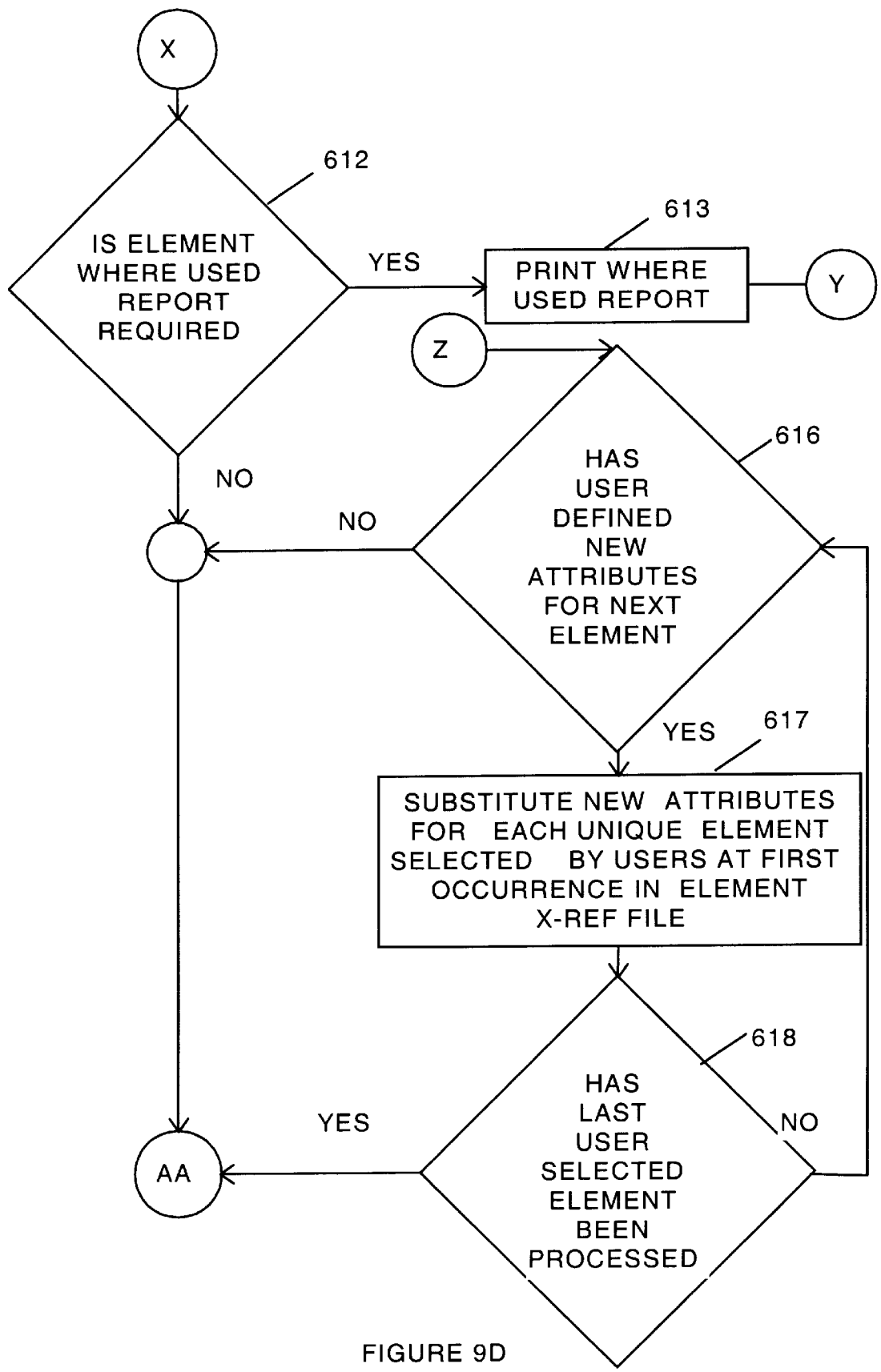
Figure 9E:
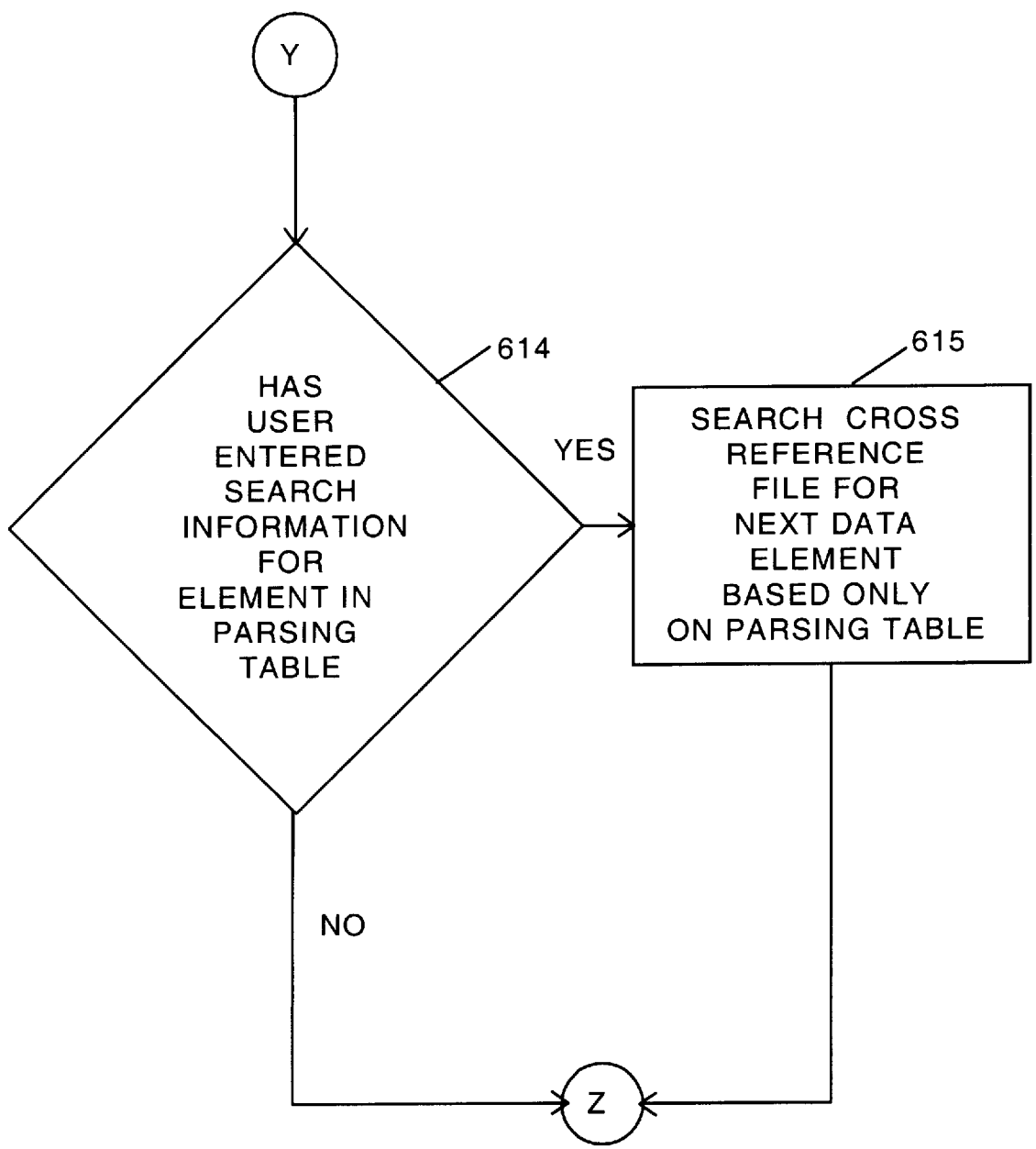

An Element Where Used Report, FIG. 9D, may be selected for print by the user, step 612. An Element Where Used Report is a report of the contents of the Element Cross Reference File with information sorted by physical location. This permits the user to evaluate which of the various data elements are stored in the same physical location. If the user indicates that such a report is required, the system prints out a report, step 613. The user may then examine the report and define new attributes for selected variables. On review of the Element Where Used Report the user may enter search information in Parse Table, step 614, as shown in FIG. 9E. If such information is entered, the system searches the Element Cross Reference File for the data elements which match the Parse Table, step 615. The system does not search for any data elements for which no selection was made by the user. These element definitions may be a change by the name, type or length or any other attribute of the data element. In the case of a six byte date, for example, the user may wish to change the length to eight bytes in order to accommodate a four byte year such as the year 2000. If the user defines a new name or new attributes, step 616, the new data is substituted for the first occurrence of each unique data element in the Element Cross Reference File, step 617. Uniqueness is determined by the physical location of the data element in the virtual memory. Multiple unique data elements may be selected by the user for change and the user is given the opportunity to change the next element name or attributes, step 618. On processing the last file name, the system goes to the next stage, step 618.

Figure 9F:
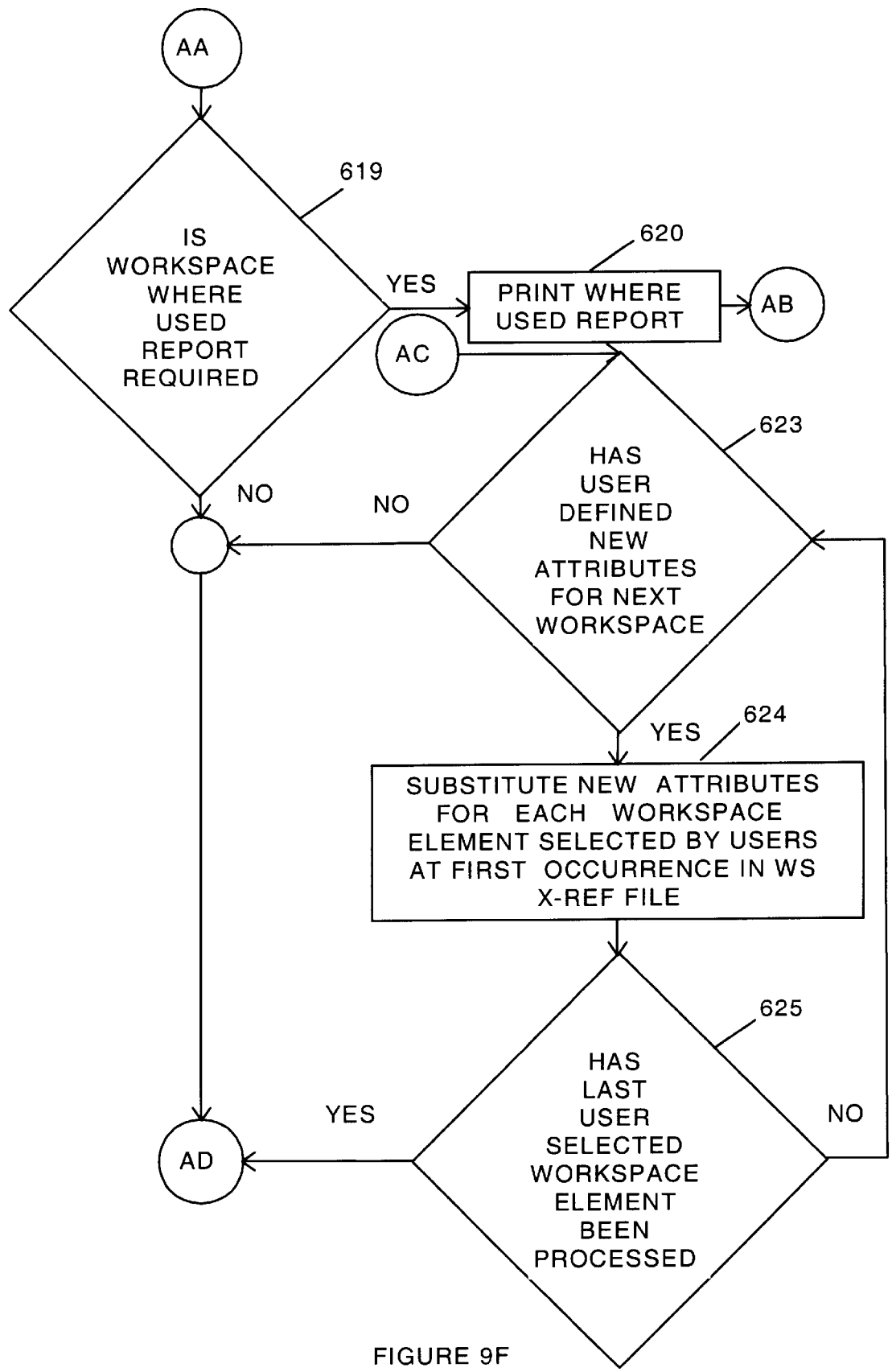

As shown in FIG. 9F, a Work Space Where Used Report for work space information, may be selected for display or print by the user, step 619. A Work Space Where Used Report is a report of the contents of the Work Space Common Occurrence File with information sorted by physical location. This permits the user to evaluate which of the various work space allocation parameters require change. For example, if a data element size is changed, the corresponding size of a work space may also require change.

Figure 9G:
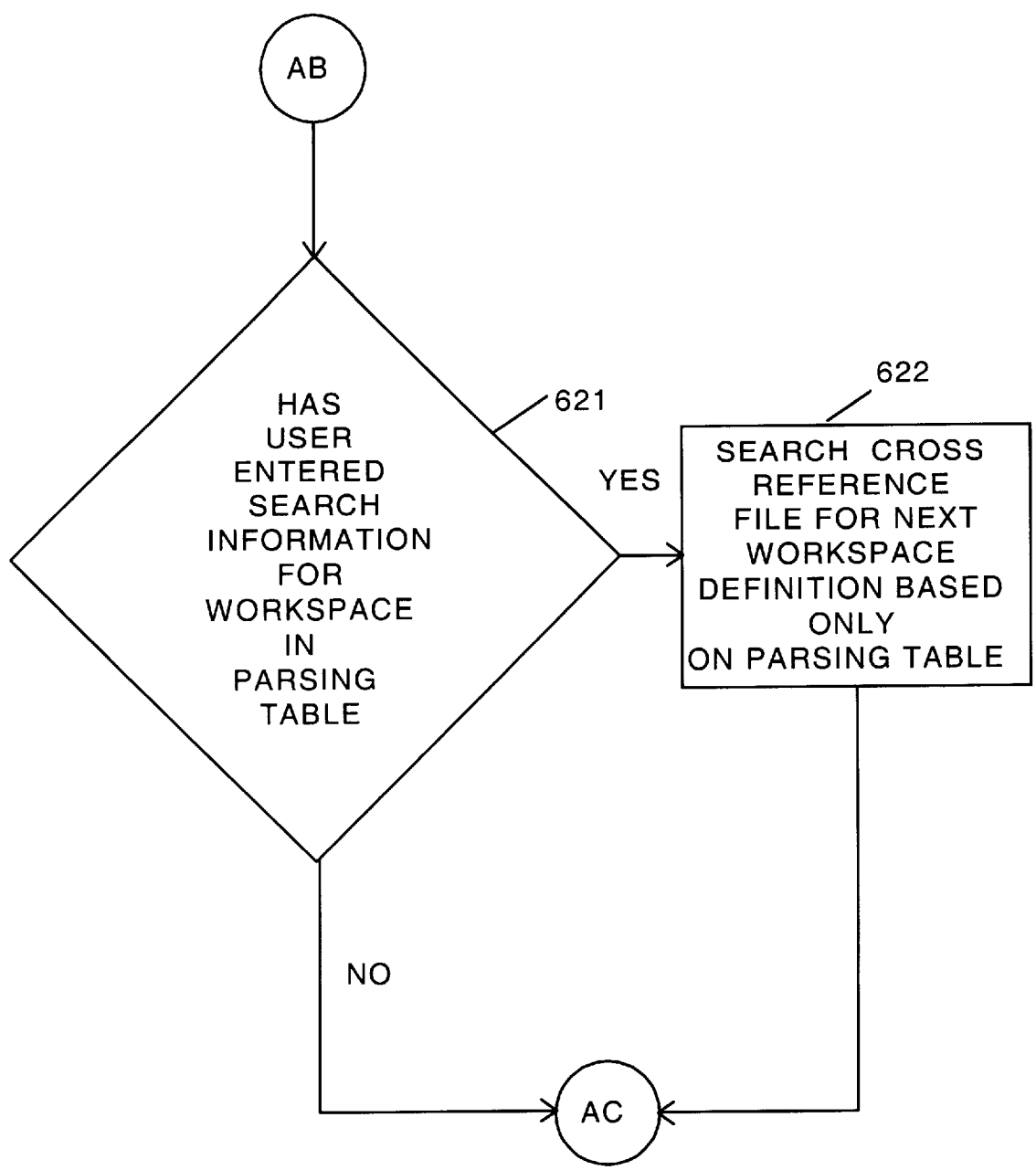

If the user indicates that such a report is required, step 619, the system prints out a report, step 620. The user may then examine the report and define new attributes for selected workspace parameters. On review of the Work Space Where Used Report the user may enter search information in a Parse Table, step 621, as shown in FIG. 9G. If such information is entered, the system searches the Work Space Common Occurrence file for common work spaces which match the Parse Table, step 622. The system does not search for any other Common workspace definitions for any workspace allocations for which no selection was made by the user. The essential difference between searches is that work space is searched by its profile file by names and elements by name or attribute. These new definitions may be a change in the format, type or length or any other attribute of the workspace parameters. If the user defines a new name or new attributes, step 623, the new data is substituted for the first occurrence of each unique work space in the Work Space Common Occurrence File, step 624. Uniqueness is determined by the form of the workspace allocation. Multiple unique workspace definitions may be selected by the user for change and the user is given the opportunity to change the next work space definition, step 625. On processing the last work space definition, the system goes to the next stage, step 625.

Figure 9H:
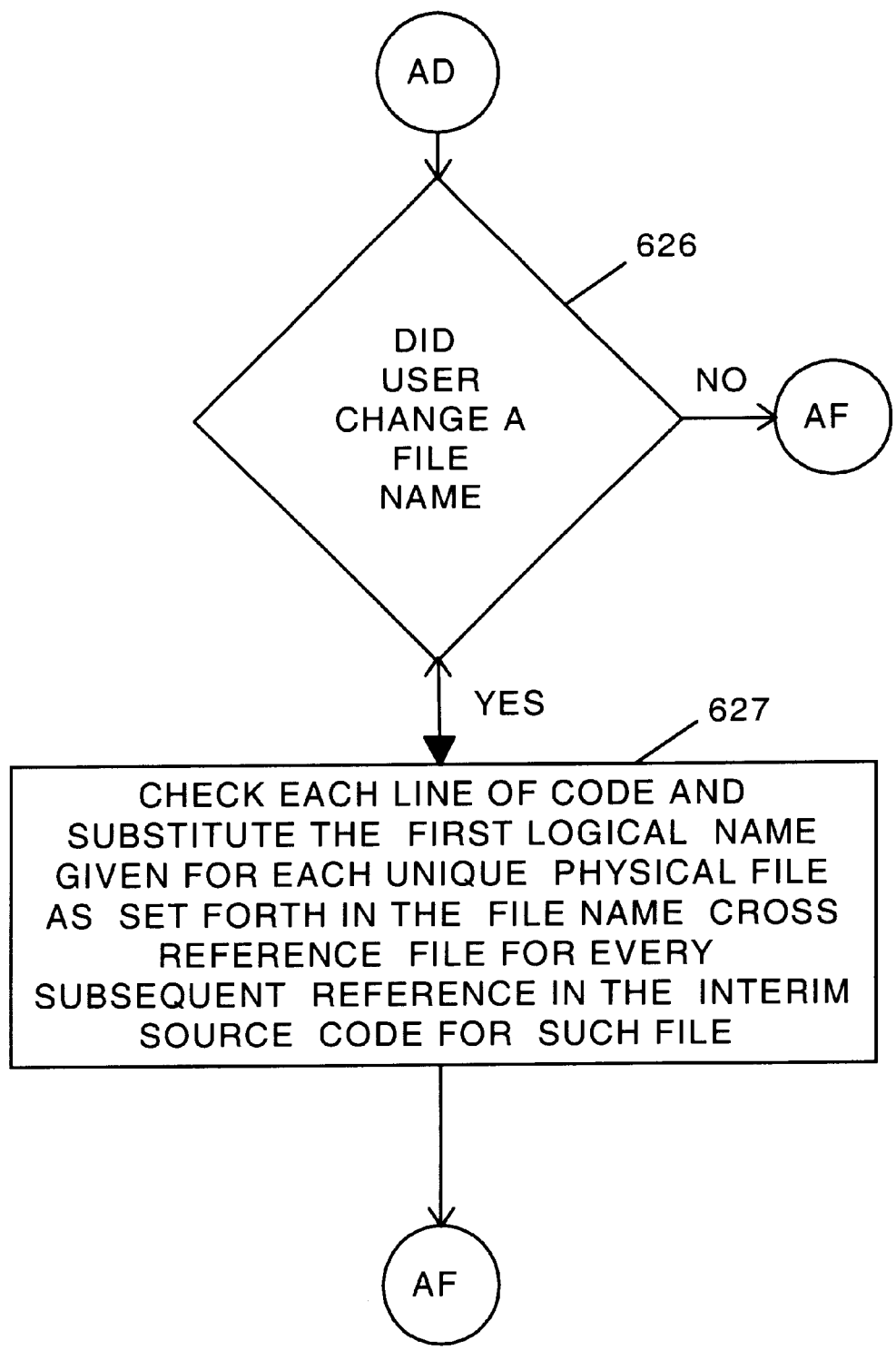
Figure 91:
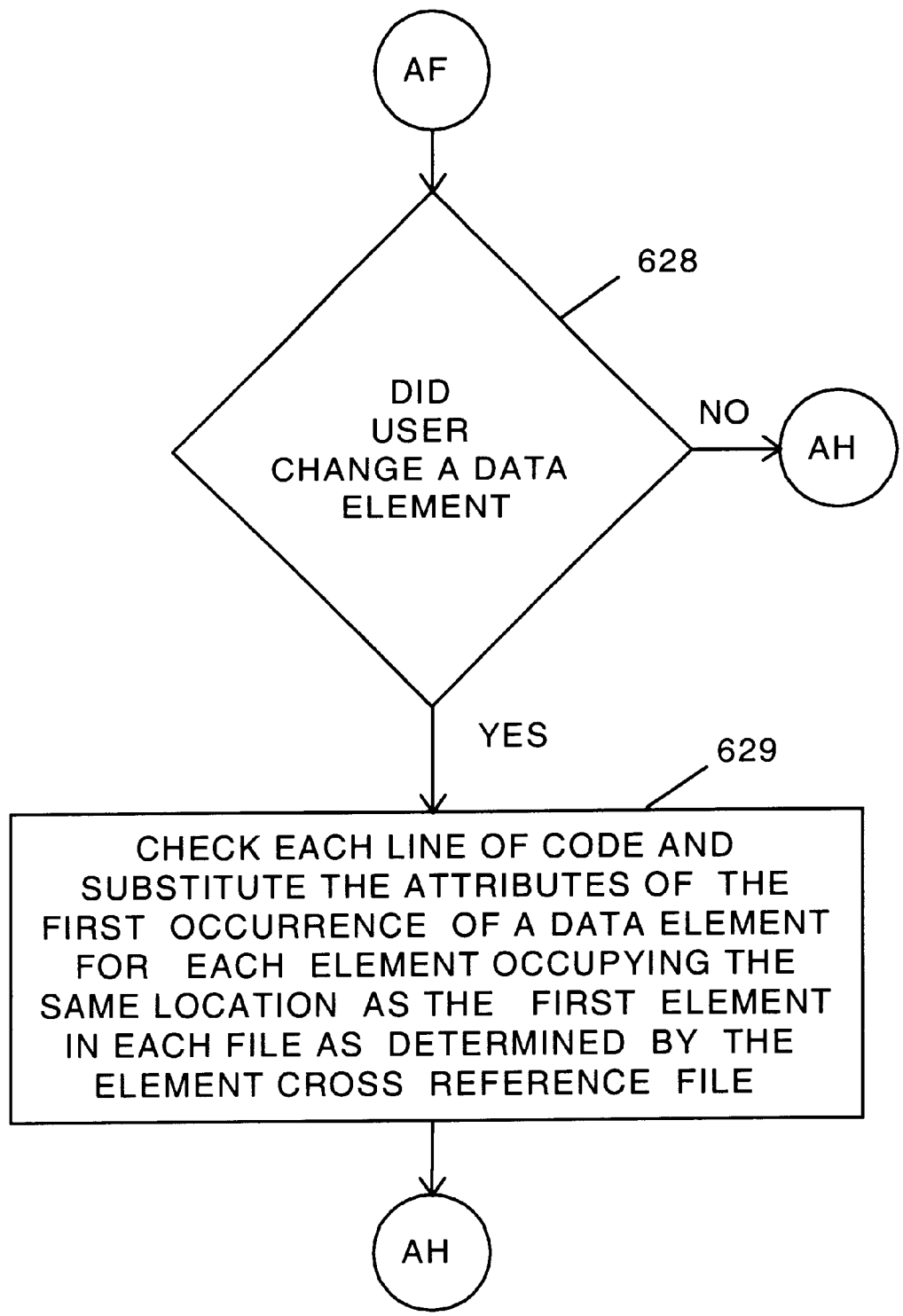

Referring to FIG. 9H, if the user changed a File Name, step 626, the interim source code is checked and each logical file name is compared with the File Name Cross Reference File. Each reference to the same physical file name is changed to the logical name of the first occurrence of the logical file name associated with the same physical file as set forth in the File Name Cross Reference File, step 627, as determined by the system or selected by the user.

If a data element was changed, step 628, the interim source code is again checked and each data element name is compared with the Element Cross Reference File. Each reference to the same element in the same physical location is changed to reference the name and attributes of the first occurrence of the data element as set forth in the Element Cross Reference File, step 629 as determined by the system or selected by the user as shown in FIG. 9I.

Figure 9J:
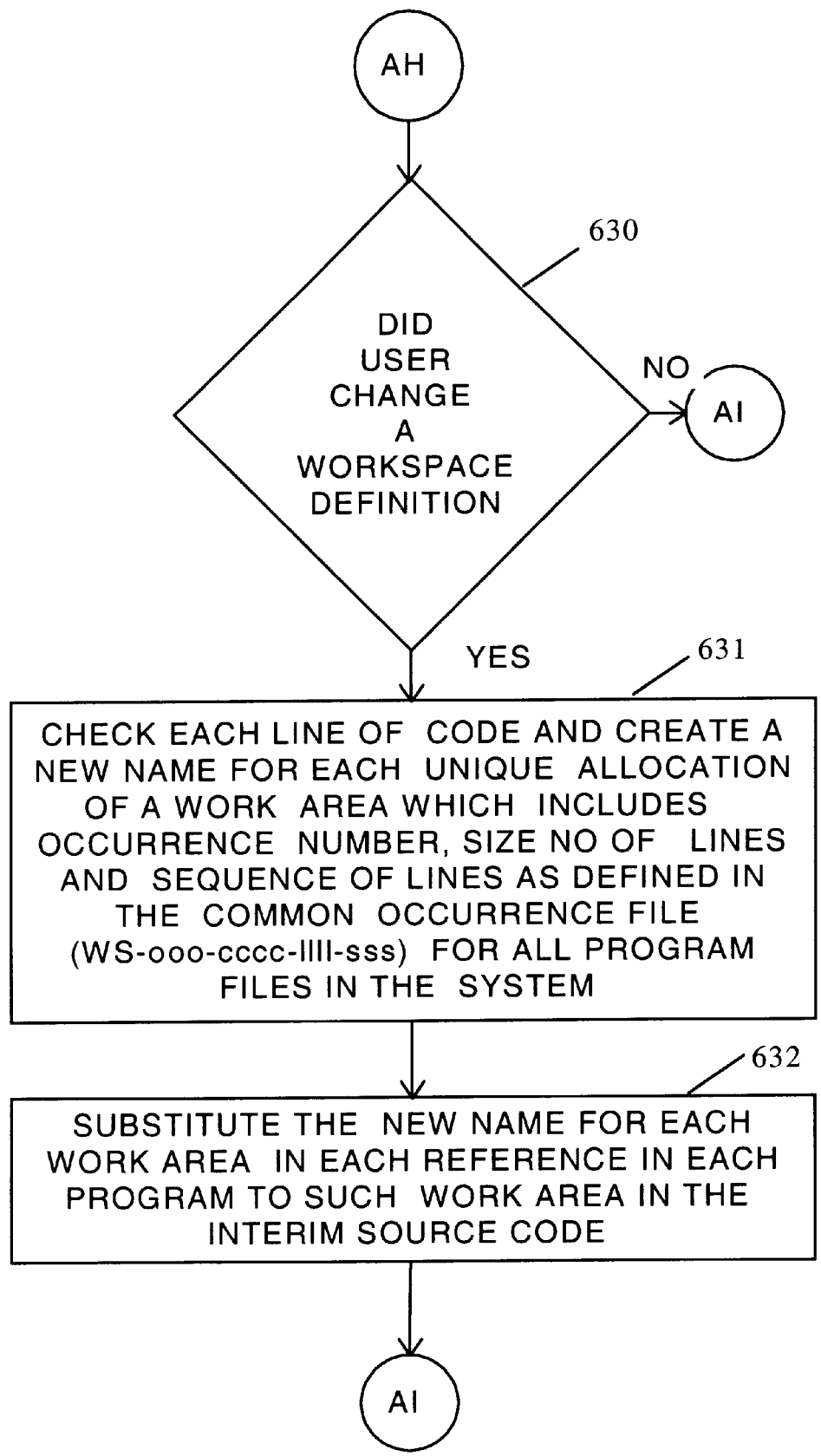

If work space was changed, step 630, the interim source code is again checked and each work space allocation is compared with the Work Space Occurrence File. Each reference to the same work space in the same format is changed to reference the parameters of the first occurrence of the work space definitions as set forth in the Work Space Occurrence File, step 631 as determined by the system or selected by the user, FIG. 9J.

However, the user cannot select a new workspace name. The system creates a new reference name for each unique Work Area, step 632, in the following format: WS-ooo-cccc-llll-sss, where "ooo" is the occurrence number, i.e., the first occurrence of the same work space allocation (ooo=001 and so on), "cccc" is a four digit number representing the size of the work space in characters, "llll" is a four digit number representing the number of lines of work area, and "sss" is a three digit number representing the sequence of lines of workspace allocated. That is, the order of identical work space allocations defined in sequence. The information required regarding the format of the Work Area is derived from the Work Space Common Occurrence file which defines each such area. The maximum sequence number is an indication of the largest number of work space allocations in any program sequence. Certain programs may overlap in all or part of the Work Area allocations. This means that if program 1 uses work space allocated in sequence 001 through 006, and program 2 uses workspace allocated in sequence 001 through 003, each program will utilize the same physical space in sequence 001 through 003. Program 1 of course uses additional space 004 through 006. Since the programs run at different times this use of the same work area does not create any conflict, but simplifies the code with standard definitions with equivalent work space used by different programs. The name created is substituted for each reference allocating the work area in sequence within each program step 633. This means that each work space name has the attributes of the work space built into the name and makes future maintenance less confusing.

Figure 9K:
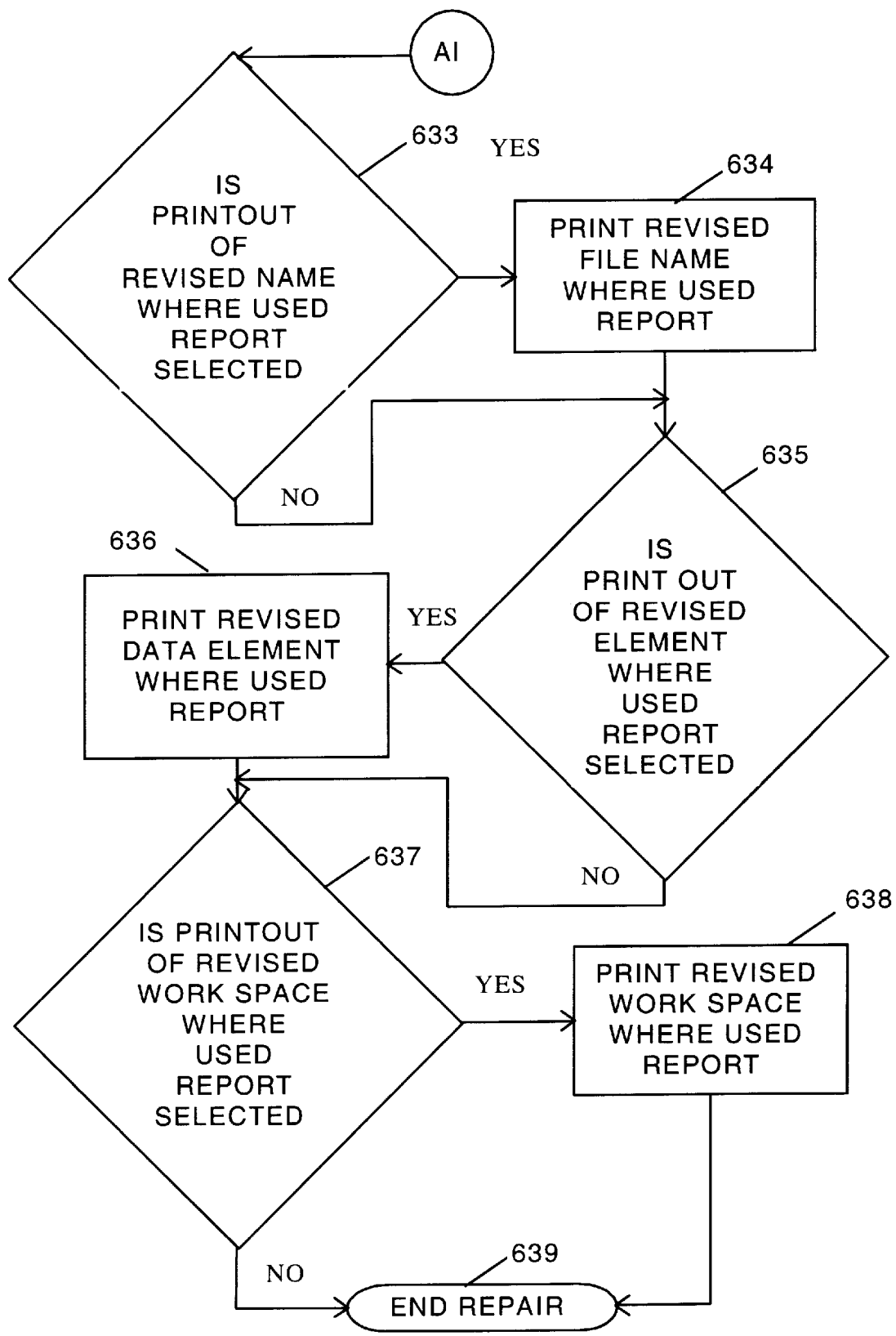

The user is provided an option to reprint the File Name Where Used Report for the revised file names, step 634, FIG. 9K. On an affirmative selection, the revised File Name Where Used Report is printed, step 635.

In FIG. 9K, the user is then provided an option to reprint the Element Where Used Report for the revised data element names and attributes, step 636. On an affirmative selection, the revised Element Where Used Report is printed, step 637.

The user is also provided an option to reprint the Work Space Common Occurrence Report for the revised workspace allocations, step 638. On an affirmative selection, the revised Work Space Common Occurrence Report is printed, step 639, and Repair Phase ends, step 640.

Figure 10A:
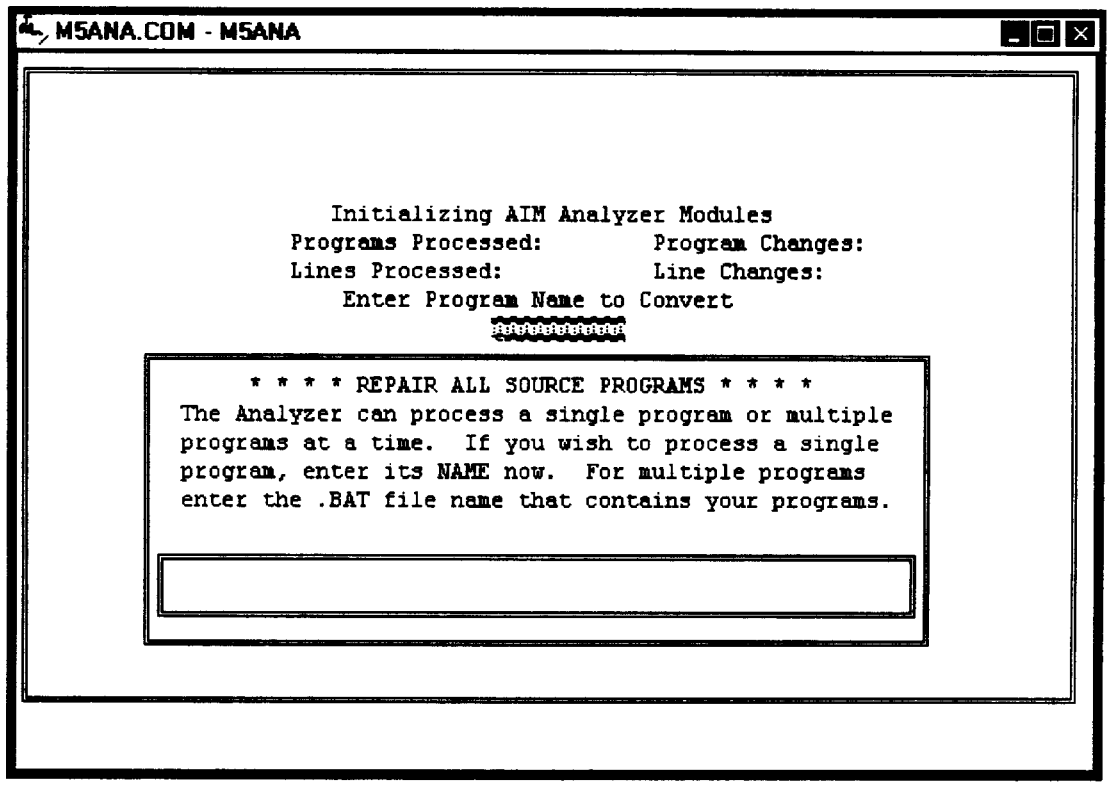
FIGS. 10A through 10C are user screens for the manual repair.
Figure 10B:
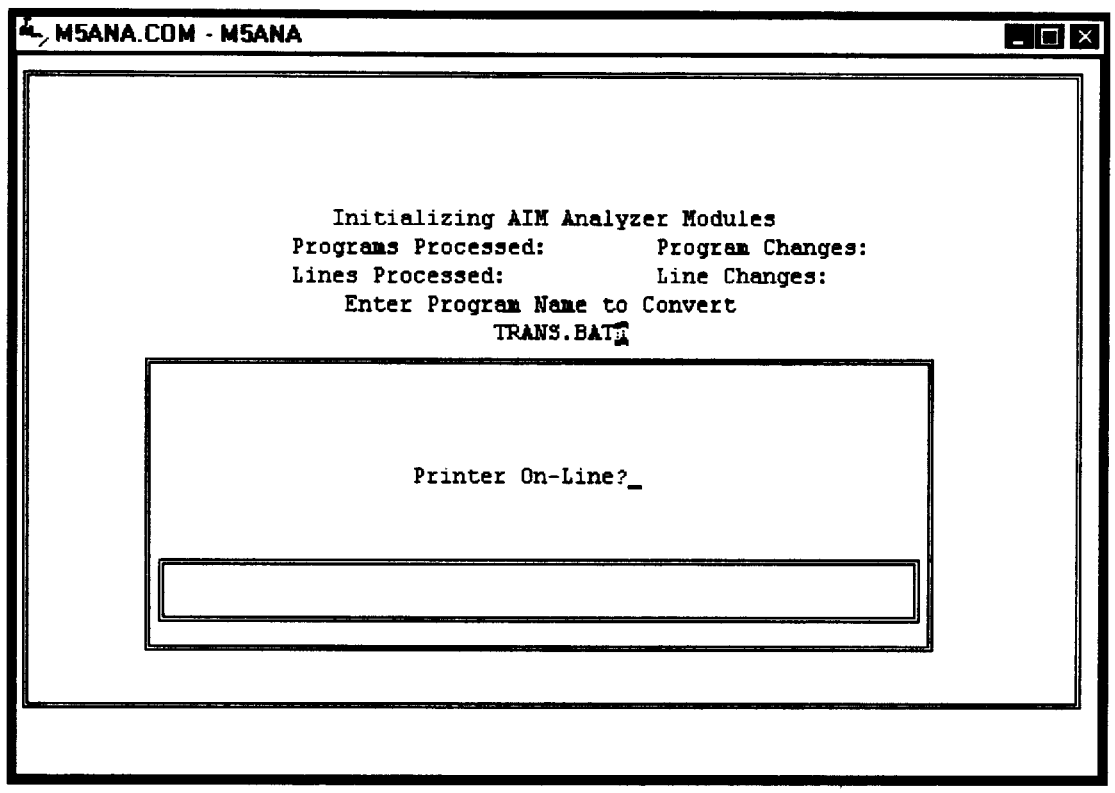
Figure 10C:
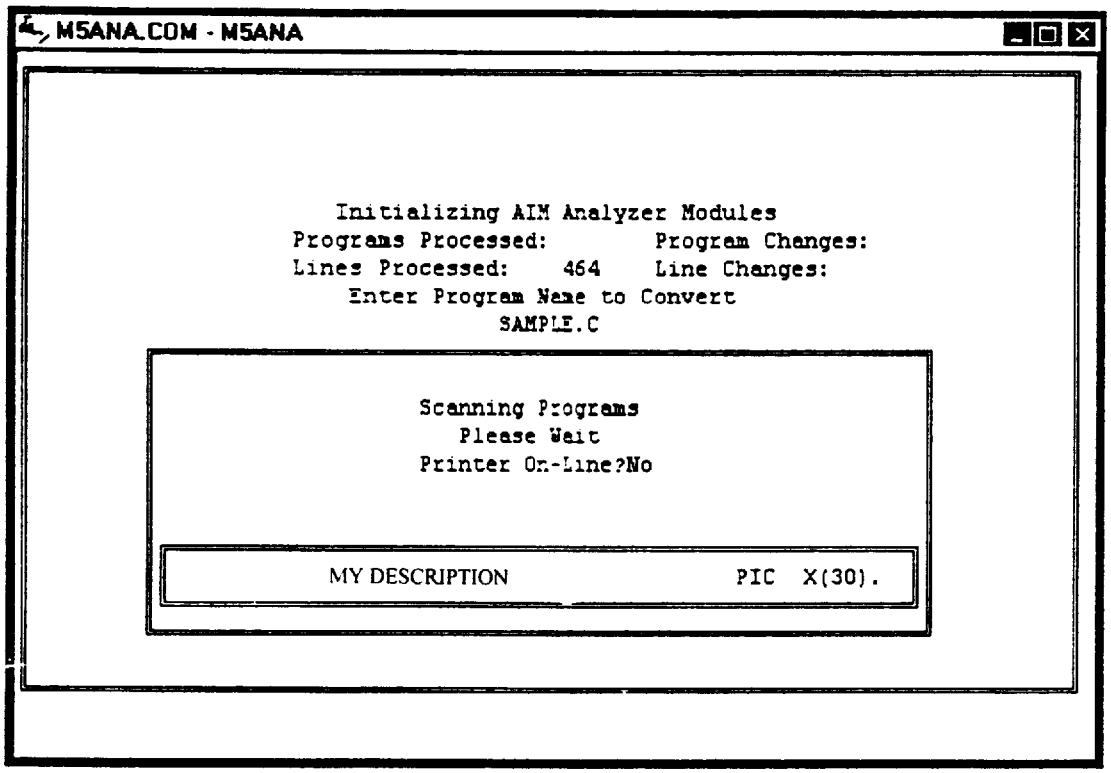

FIG. 10A illustrates the screen presented to the user when the Repair Option is selected in Option 3 and the user is prompted to enter the program name for conversion. As in the Analyzer, either a name or a .BAT file of names may be entered. The program ensures that the printer is on-line so that the various Where Used Reports may be generated, FIG. 10B, and the system commences scanning the programs. A parse table, parses out the various file name and data elements selected by the user and to be individually changed by the user. The process is essentially the same as the Analyzer section but only selects for change those items entered by the user. The user is presented with a screen requesting the name of the program or the .BAT file of the programs to be repaired. The parse table may include a date definition because all the users wishes to do is expand the date field length. Screen 10B ensures that the printer is on line so that an audit trail of corrections may be printed. FIG. 10C shows the user that the system is scanning the various files for the parse table elements. In this particular example, the name of the element is MY DESCRIPTION and it is any character of length (30).

Figure 11:
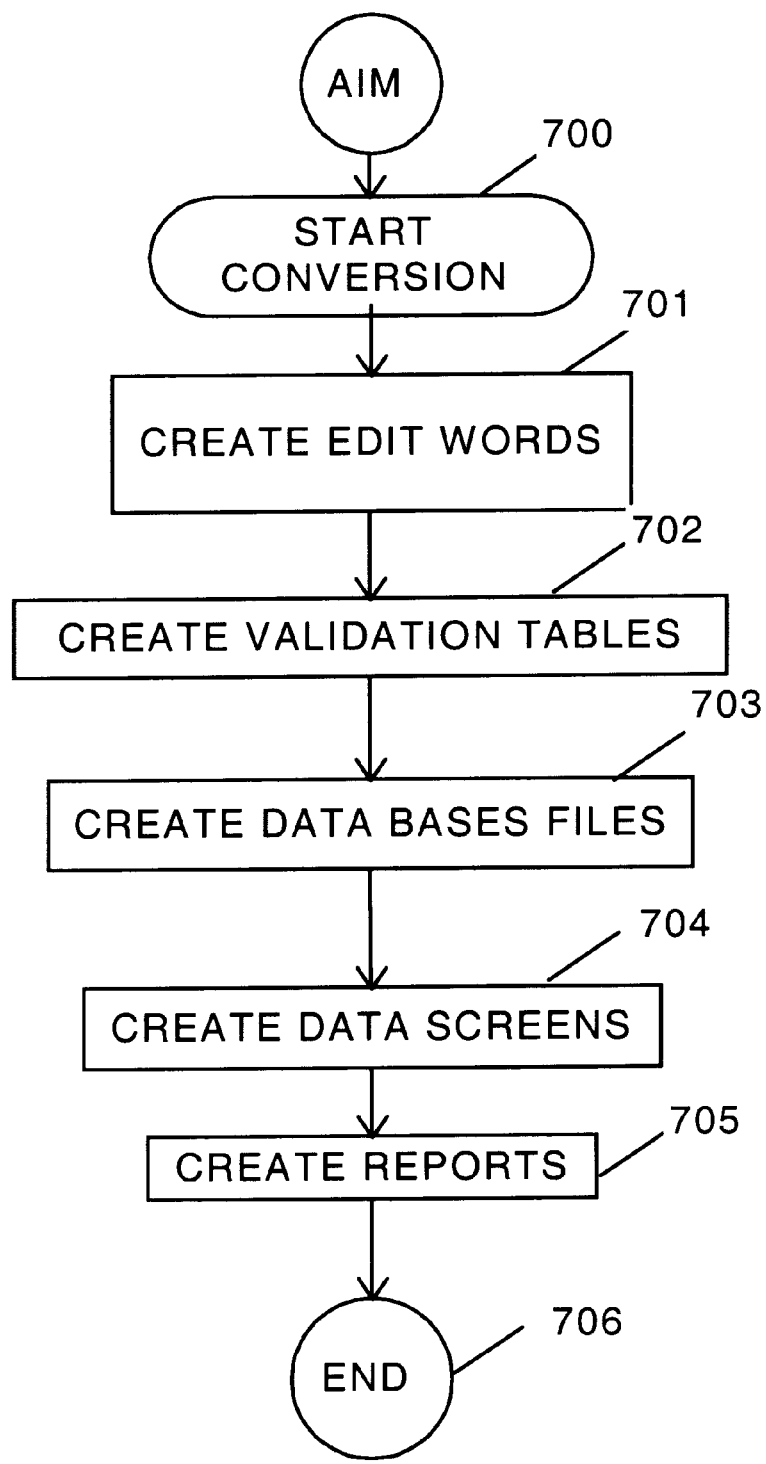
FIGS. 11 is a flow chart of the Conversion option.

FIG. 11, illustrates the AIM conversion routine, step 700. The Conversion creates new edit words, step 701, a validation table, step 702, new data base files, step 703, new data screens, step 704 and report forms, step 705 and the conversion ends.

Figure 12A:
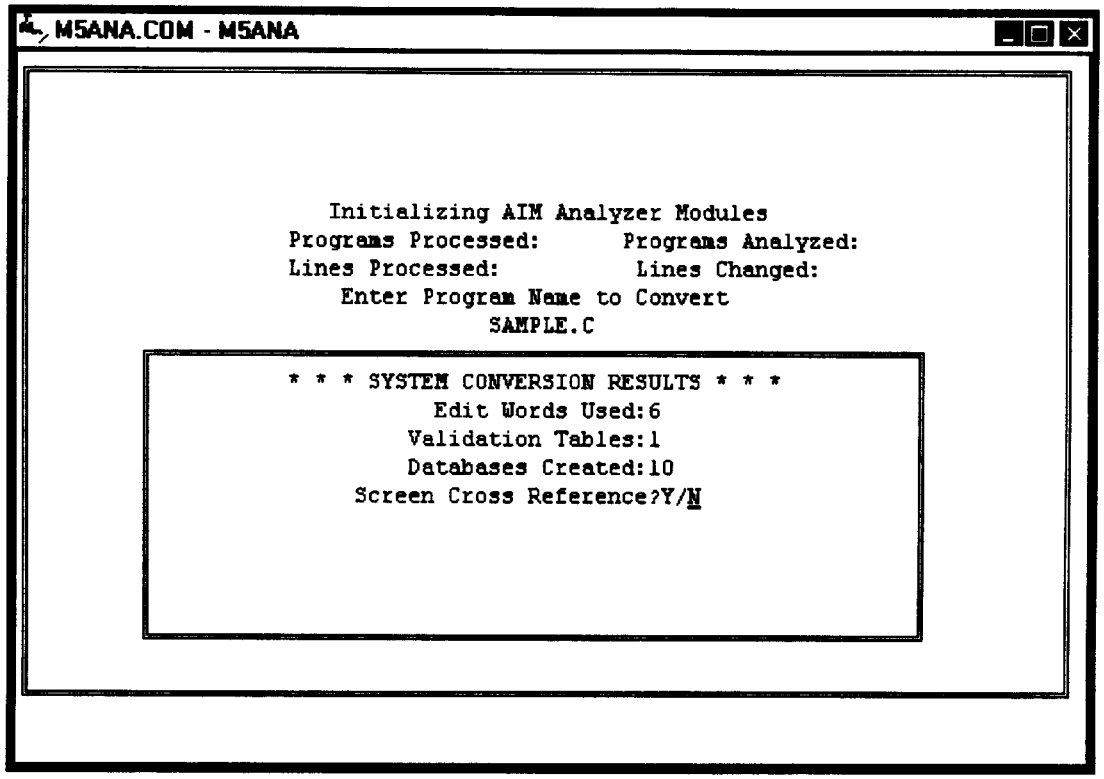
FIGS. 12A through 12B are user screens for the conversion option.
Figure 12B:
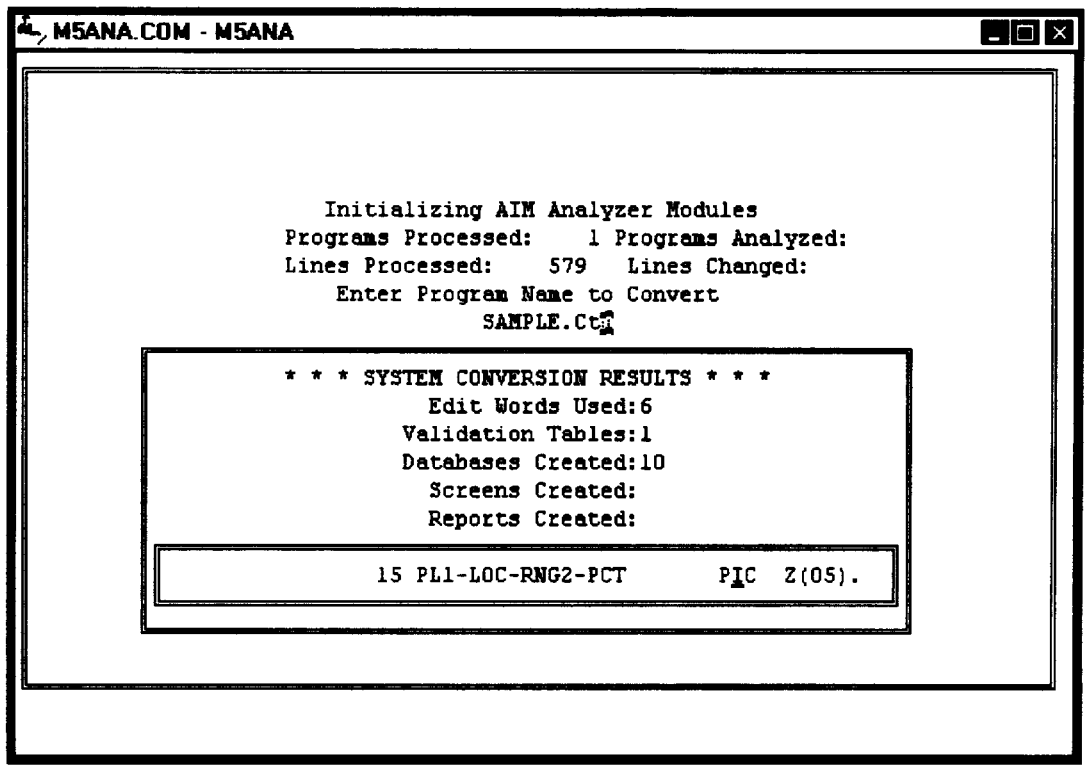

The screen of FIG. 12A demonstrates the conversion to the automated information management system specifications for a codeless environment. On completion of such conversion, FIG. 12B advises the user of the number of edit words used, validation tables required, data bases created, screens created and reports created.

Figure 13:
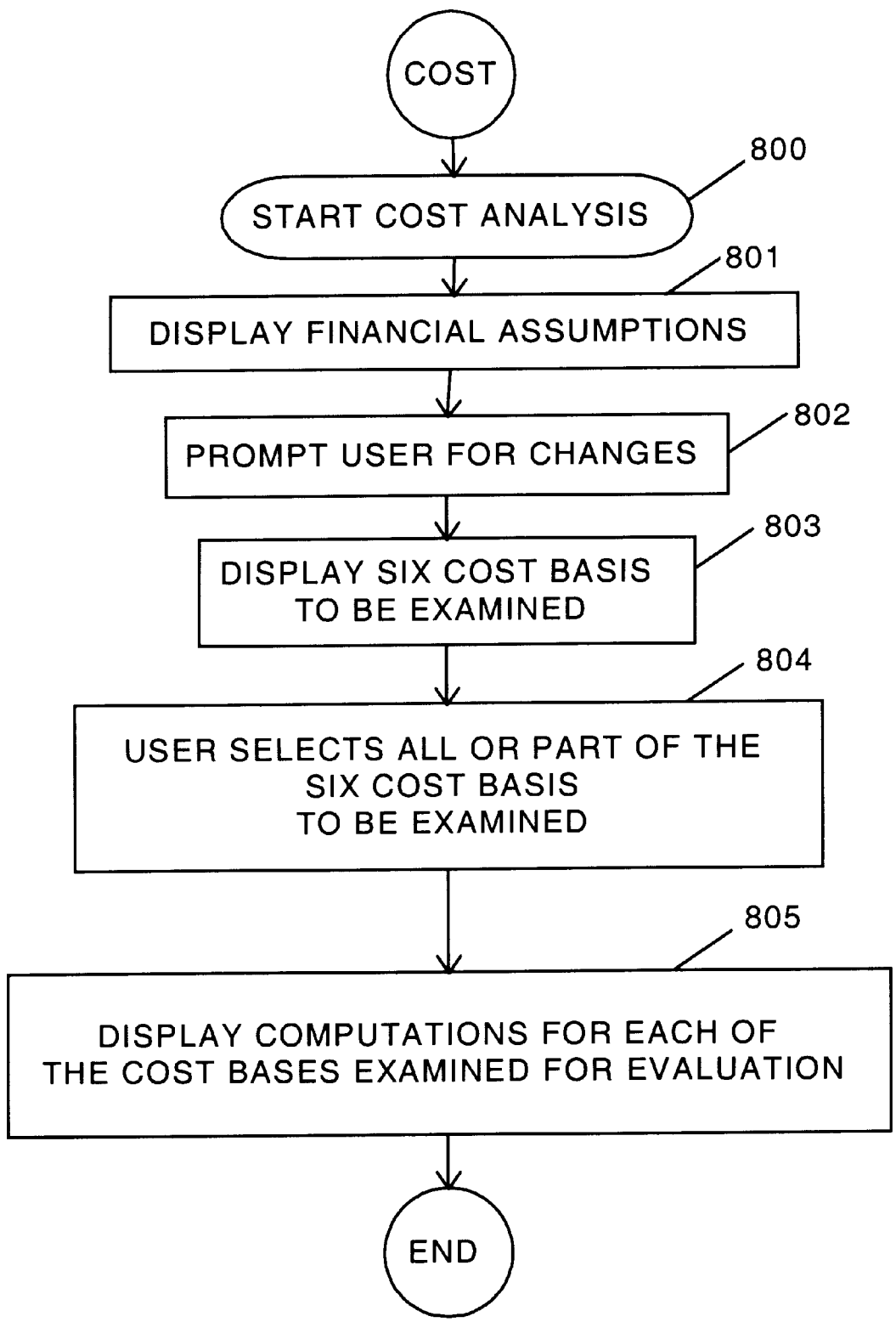
FIGS. 13 is a flow chart of the cost analysis function.

FIG. 13, illustrates the cost analysis option. The cost analysis option is initiated on selection by the user, step 800. The cost analysis option displays financial assumptions to the user for evaluation, step 801 and prompts the user for changes, step 802. The cost analysis option then displays six cost basis for examination, step 804, and the user may select all or any part thereof for analysis, step 804. The system then computes the various cost elements and displays the cost estimates for a variety of repair options, step 805.

Figure 14A:
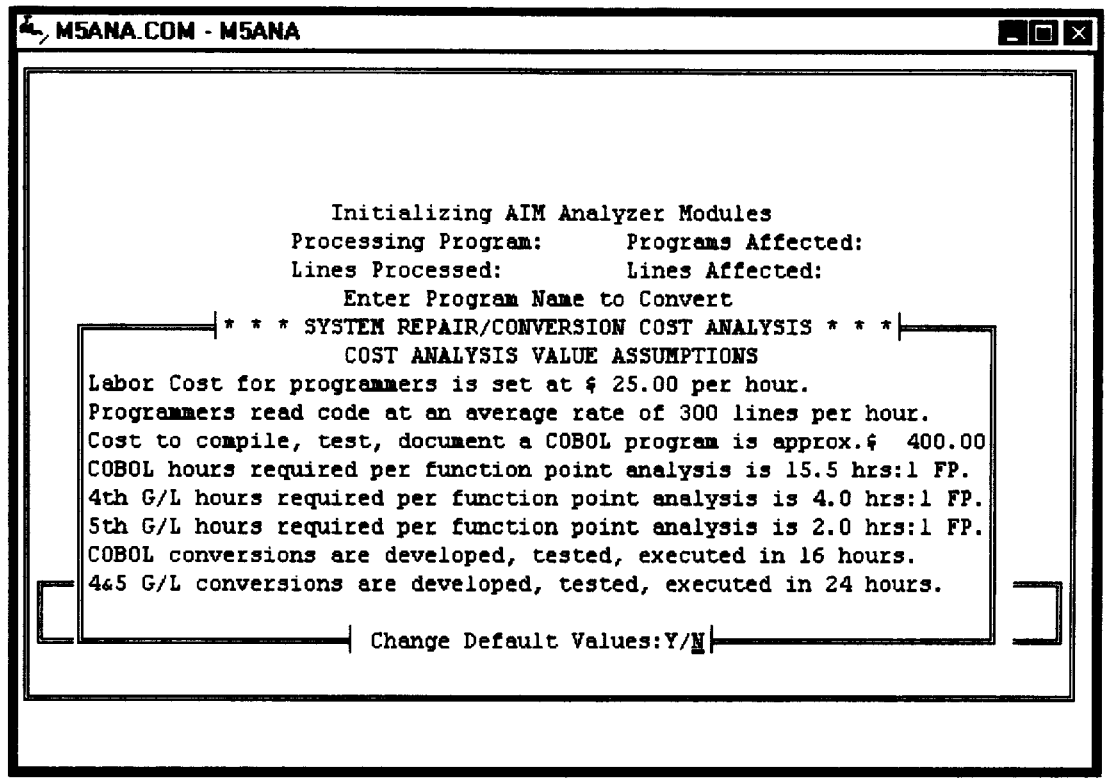
FIGS. 14A through 14C are user screens for the cost analysis function.
Figure 14B:
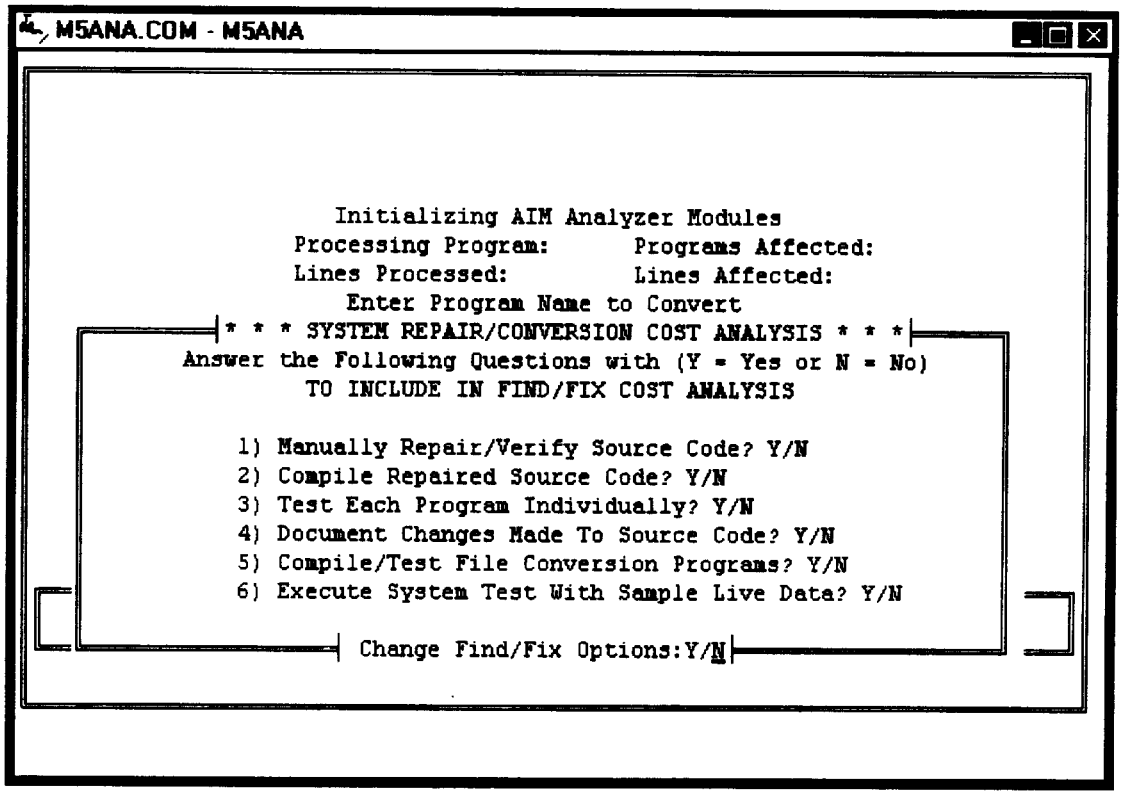
Figure 14C:
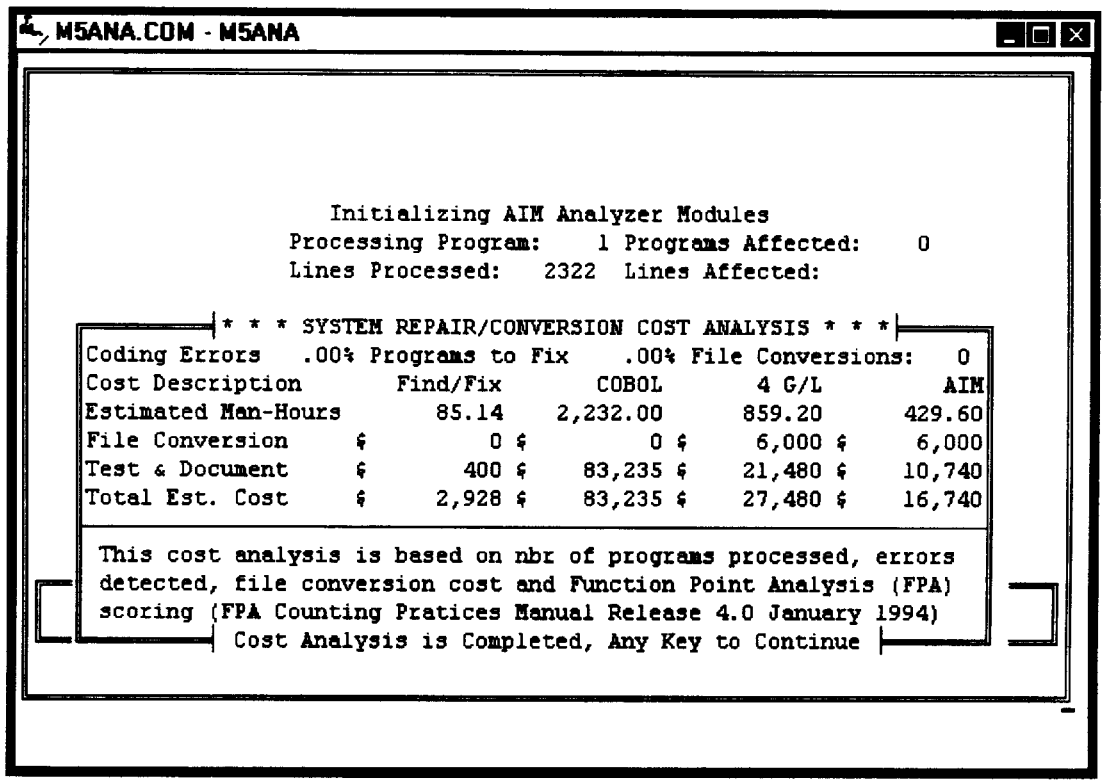

The screen of FIG. 14A presents the assumptions used on selection of the Cost Analysis option. The screen of FIG. 14B permits the user to elect which element of cost should be included in the cost analysis for examination. The user may select all or none of the six cost basis parameters. FIG. 14C is a screen which illustrates for the user the total cost for the parameters selected for four repair/conversion techniques. These are Manual Find and Fix options of the instant invention, Cobol reprogramming, or reprogramming in another 4th generation language, and using the instant invention. In this case, one (1) program was analyzed, and (2322) lines of code evaluated.

FIG. 15A and B, show the data base structure for I/O elements and common I/O file structure used in the intervention. Most of these definitions will be readily apparent to those skilled in the art. However, a few of these data base elements will be described in more detail.

For FIG. 15A the Data Base number is the sequential number of 'E' records. The element edit is the format of element for display. Parse Type is A(automatic) or P(pause) parseid is the position of a record in the Parse Table.

For FIG. 15B a system assignment is the physical location on disk where the file is stored. (The record name is the level 01, 05, 10, etc. Record size is in characters. The table type is either standard definition or omitted). The assigned data base number is the sequential number of 'D' records.

For FIG. 16A, W1 contains a record for every level of instruction. Value, if any, is a sub-profile picture and any default values.

For FIG. 16B, W2 is a summary record using W1. Occurrence is the number of occurrences of the code in a program. Sequential number is always 001 and is used to compare to 01 level. Sub level is the top level of the work area, i.e., 77, 01, etc. For FIGS. 16C and 16D the names of the fields illustrate the nature of the stored contents.

For FIGS. 17A through 17D, the names are descriptive of the contents. The term (Function Number) indicates a sequential number assigned to the common function. The (Sequential Number) is the number indicating the order of the instruction found in the block.

For FIG. 18, the term partial parse word is the sub-string to be searched in a string.

FIG. 19 is a flow chart of the REPORT OPTION of Option 2 of FIG. 8A.

Further advantages and uses for this invention will be recognized by those skilled in the arts. The instant invention is contemplated to embrace such other uses and features and is not intended to be limited strictly to the preferred embodiment disclosed.

Having thus described the invention what is claimed is:

1. An optimization system recorded on a computer readable medium for optimizing a computer software system comprising:
 a. a conversion routine which reads all existing source code files related to said computer software system and writes each of the instructions of said existing source code files as corresponding source code instructions in corresponding interim source code files on said computer readable medium;
 b. a vertical synchronization system for processing said interim source code files and constructing a data structure for each data element referenced in each source code instruction of each of said interim source code files, said vertical synchronization system comprising:
  i. a cross reference routine which analyzes the source code instructions of said interim source code files and creates a data structure for a plurality of references to elements used in any of the source code instructions of the interim source code files, which data structure comprises at least the element name, length, and location, and identifies each of said source code instructions of said interim source code files that references each such element;
  ii. a scan routine which scans all of the source code instructions of the interim source code files and changes the attributes of selected elements referenced in the source code instructions of the interim source code files to a selected attribute; and
  iii. a standardization routine which assigns at least one attribute for each referenced element at a specific location;
 c. a horizontal synchronization system for scanning said source code instructions of said interim source code files and converting each of said source code instructions into a standard syntax;
 d. a sequential synchronization system for scanning said all of said source code instructions of said interim program source code files and identifying all source code instruction sequences of said source code instructions which are common to other source code instruction sequences in any of said interim source code;
 e. an interim source code modification system for scanning all of the source code instructions of said interim source code files and replacing said identified common instruction sequences in the interim source code files with a reference to a library for accessing said common instruction sequences in said library; and
 f. a restoring system which writes the interim source code files as modified to the existing source code files;
wherein said selected attribute may be selected interactively by an operator of the optimization system based on an output display from said optimization system.

2. An optimization system as described in claim 1 wherein said display is a printed report.

3. An optimization system as described in claim 1 wherein said display is a formatted screen display generated by said optimization system.

4. An optimization system as described in claim 1 wherein said horizontal synchronization system comprises:
 a. a syntax scan routine which scans all of the source code instructions of said interim source code files and changes all source code instructions to a common syntax.

5. An optimization system as described in claim 1 wherein said sequential synchronization system further comprises:
 a. a library scan routine which scans all of the source code instructions of the interim source code files and selects said common instruction segments of such code for storage as a library common function and stores such common function in said library.

6. An optimization system as described in claim 5 wherein said interim source code modification system further comprises:
 a. a replacement routine which removes each of the common instruction segments stored in said library from the interim source code from the source code instructions of said interim source code files; and
 b. a substitution routine which substitutes a call instruction to the common function stored in said library, in each location in the source code instructions of the interim source code files from which said common instruction segments have been removed.

7. An optimization system as described in claim 1 wherein said interim source code modification system further comprises:
 a. a routine which reads all of the instructions of each of the interim source code files and removes all common instruction sequences from the interim source code files and inserts a call to the library to use designated ones of the common instruction segments designated by the call which are stored in the library.

8. A computer program product comprising:
 a. a computer usable medium having computer readable program code embodied in said medium for causing a computer to optimize source code instructions in a plurality of source code files; and wherein said computer readable program code further comprises:
  i. a conversion routine which causes said computer to read the source code instructions of at least one source code file stored on computer medium and to convert said source code file into at least one interim source code file;
  ii. a vertical synchronization system which causes said computer to process all of the source code instructions said interim source code file and to construct an element data structure of elements related to each of said instructions of said source code file which uses any of said elements;
  iii. a horizontal synchronization system which causes said computer to scan each source code-instruction of said interim source code file, to convert selected named data elements to a common data element name and to convert each source code instruction of said interim source code file into a common syntax;
  iv. a sequential synchronization system which causes said computer to scan all of the source code instructions of said source file and to identify all source code instruction segments which are common to other instruction segments of said program source code file;

v. a source code modification system which causes said computer to scan all of said source code instructions of said source code file and to replace common source code instruction segments identified by said sequential synchronization system in the interim source code files with a library reference for accessing said common instruction segments in said library;

wherein said vertical synchronization system comprises:

a cross reference routine which analyzes the source code instructions of said source code file and creates said data structure for every individual element used in any of the source code instructions of the interim source code, which data structure comprises at least the element name, length, and location of the information represented by said element name, and identifies each of said source code instructions that references each such location; and a standardization routine which assigns a unique selected name for each element at a specific location;

wherein said element name may be selected interactively by an operator of the system.

9. A computer program product as described in claim 1 wherein said horizontal synchronization system further comprises:

a. a name scan routine which scans all of the source code instructions in the interim source code file and changes all data element name references which refer to data at the same location to the selected name;

b. a syntax scan routine which scans all of the source code instructions in the source code file and changes all source code instructions which perform the same function to a common syntax.

10. A computer program product as described in claim 8 wherein said sequential synchronization system further comprises:

a. a library scan routine which scans all of the source code instruction of the interim source code and selects source code instruction segments of such code for common library functions and stores such instruction segments in a library common function file.

11. A computer program product as described in claim 8 wherein said source code modification system further comprises:

a. a routine which reads all of the source code instructions of the interim source program file and which removes all common source code instruction segments from the source code file and inserts calls to a library common function file to use the instruction segments designated by the calls which are stored in the library common function file.

12. In a computer system, a method of optimizing a computer software system stored on computer readable medium comprising the steps of:

a. running a conversion routine which reads all source code instructions from all source code files of said software system and writes said source code instructions as interim source code instructions into at least one interim source code file on computer readable medium;

b. running a vertical synchronization system for processing said interim source code instructions and constructing a data structure related to a plurality of source code instructions of the interim source code instructions in said interim source code file;

c. running a horizontal synchronization system for scanning said interim source code and converting each instruction in said interim source code into a standard syntax;

d. scanning the source code instructions of the interim source code file and determining if any instruction segments are common to other instruction segments in said interim program source code instructions;

e. scanning the source code instructions of said interim source code files and replacing instruction segments determined to be common in the interim source code files with a library reference for accessing said common instruction segments;

f. converting the interim source code files from the standard syntax to the syntax of the source code files;

g. replacing the source code files with the converted interim source code files;

h. analyzing said interim source code files and creating a data structure for a plurality of references to elements used in any of the source code instructions in said interim source code files, which data structure comprises at least the element name, length, and location, and identifies each instruction that references each such element;

i. scanning the interim source code files and changing the attributes of said elements referenced to selected attributes;

j. assigning the same one of said attributes to each referenced element at a common location in said interim source code files;

k. displaying said attributes on a display;

l. selecting said at least one element; and m. interactively changing said attribute related to said element.

13. A method as described in claim 1 further comprising the following step:

a. displaying said element and at least one of its attributes in a printed report.

14. A method as described in claim 1 further comprising the following step:

a. displaying said element in a screen display generated by said computer system.

15. A method as described in claim 1 further comprising the following steps:

a. scanning the interim source code files, and b. changing the source code instructions in said interim source code files to a predetermined syntax.

16. A method as described in claim 1 further comprising the following steps:

a. scanning all of the interim source code files;

b. selecting segments of the source code instructions of the interim source code files for storage in a library common function file, and c. storing said selected segments of the interim source code files in said library common function file.

17. A method as described in claim 16 further comprising the following steps:

a. removing each segment stored in said library common function file from the interim source code files; and b. substituting a call instruction to the instruction segment stored in said library common function file, in each location from which said instruction segment was removed.

18. A method as described in claim 12 further comprising the following step:

a. reading all of the interim source code files in the interim source code file;

b. removing all common instruction segments from the interim source code files file; and c. inserting calls to the library common function file to use the segments designated by the call which are stored in said library common function file.

19. A method of analyzing a computer software system stored on a computer usable medium and for optimization of said software system wherein said method comprises the following steps:

a. reading source code from all source code files stored on said computer readable medium;

b. converting said source code into an interim source code in a standard syntax;

c. storing said interim source code into interim source code files;

d. constructing a data structure for elements related to specific instructions of said interim source code files which use said elements;

e. scanning each related specific source code instruction in said interim source code files;

f. converting each the name of each element in the same physical location to a common element name;

g. scanning all of said interim source code files for common source code instruction segments;

h. evaluating if any source code instruction segments are common to other instruction segments of said interim source code files;

i. replacing the common source code instruction segments with a library reference for accessing said instruction segment in a library;

j. converting all of the modified interim source code to the syntax of the source code;

k. analyzing said interim source code files;

l. creating said data structure for each element used in any of the interim source code files, which data structure comprises at least the element name, length, and location;

m. identifying each source code instruction of said interim source code files that references each such location; and n. assigning a common name for each element at the same location.

20. A method as described in claim 1 wherein said steps further comprise selecting common element names interactively for selected elements.

21. A method as described in claim 20 further comprising the following steps:

a. scanning all of the interim source code files in said interim source code files; and b. changing all names of selected elements to the common element name selected.

22. A method as described in claim 20 further comprising the following steps:

a. scanning all of the interim source code in the interim source code files;

b. selecting source code instruction segments of the interim source code for inclusion as a common library functions; and c. storing such selected instruction segments in a library common function file.

23. A method as described in claim 22 further comprising the following steps:

a. reading all of the interim source code files;

b. removing all common source code instruction segments from all of interim source code files; and c. inserting call source code instructions where common instruction segments were removed to call the library common function file to use the segments designated by the call instruction which are stored in the library common function file.

24. A computer program product as described in claim 8 wherein said element is selected from the group consisting of:

a. data elements;

b. name elements; and c. workspace elements.

25. An optimization system as described in claim 1 wherein said attribute is the element name.

* * * * *